(12) United States Patent
Rotem et al.

(10) Patent No.: US 11,731,291 B2
(45) Date of Patent: *Aug. 22, 2023

(54) EXTENDED-FRAME PORTABLE VACUUM GRIPPER

(71) Applicant: Nemo Power Tools, Ltd., Hong Kong (HK)

(72) Inventors: Nimrod Rotem, Hong Kong (HK); Oleg Joukov, Shaar Efraim (IL); Eduard Tsfasman, Shaar Efraim (IL)

(73) Assignee: Nemo Power Tools, Ltd., Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,037

(22) Filed: Dec. 8, 2021

(65) Prior Publication Data
US 2022/0288795 A1 Sep. 15, 2022

Related U.S. Application Data

(63) Continuation-in-part of application No. 16/769,107, filed as application No. PCT/IL2019/050502 on May 5, 2019, now Pat. No. 11,413,727.

(30) Foreign Application Priority Data

May 8, 2018 (IL) .......................... 259216

(51) Int. Cl.
*B25J 15/06* (2006.01)
(52) U.S. Cl.
CPC ................ *B25J 15/0616* (2013.01)

(58) Field of Classification Search
CPC ... B25B 11/007; B66C 1/0231; B66C 1/0256; B66C 1/0287
See application file for complete search history.

(56) References Cited

U.S. PATENT DOCUMENTS

| 1,036,586 A | 8/1912 | Dove |
| 1,125,752 A | 1/1915 | Smith |

(Continued)

FOREIGN PATENT DOCUMENTS

| BE | 1001645 A6 | 1/1990 |
| CN | 201147927 | 12/1899 |

(Continued)

*Primary Examiner* — Stephen A Vu
(74) *Attorney, Agent, or Firm* — Anthony Kandare; KandareIP, LLC

(57) ABSTRACT

An extended frame portable vacuum grip device is provided having a rigid unitary support frame with elongated base and peripheral support wall that can define an open chamber at a face of the device for vacuum grip connections. A plurality of corresponding components can be combined to form independent vacuum grip regions within the open chamber extending along the length of the support frame. A plurality of ports can be defined through the base along its length that can each operatively connect with a corresponding pump. A plurality of closed-loop gaskets can each mate with corresponding portions of the base and support wall within the open chamber to act as vacuum seal members and define independent vacuum grip regions. A corresponding support frame for each gasket can help retain the independent arrangement and enhance seal actions of the gasket. The grip device can include structural reinforcements for reducing applied stresses.

20 Claims, 45 Drawing Sheets

(56) References Cited

U.S. PATENT DOCUMENTS

| | | | |
|---|---|---|---|
| 1,514,036 A | 11/1924 | Debaecker | |
| 2,172,199 A | 9/1939 | Haworth | |
| 2,233,350 A | 2/1941 | Nelson | |
| 2,475,073 A | 7/1949 | Billner | |
| 2,578,020 A | 12/1951 | Sandberg | |
| 2,920,916 A | 1/1960 | Pagdin | |
| 3,181,027 A | 4/1965 | Geer | |
| 3,240,525 A * | 3/1966 | Wood | B65G 49/061 294/185 |
| 3,506,297 A | 4/1970 | Creskoff | |
| 3,724,659 A | 4/1973 | Buhrer | |
| 3,915,241 A | 10/1975 | Bieri | |
| 4,685,714 A | 8/1987 | Hoke | |
| 4,852,926 A | 8/1989 | Littell | |
| 5,681,022 A * | 10/1997 | Rankin | F16B 47/00 248/362 |
| 5,795,001 A * | 8/1998 | Burke | B65G 49/061 294/185 |
| 6,039,371 A * | 3/2000 | Smith | E04F 21/22 294/8.6 |
| 6,244,778 B1 | 6/2001 | Chesbrough | |
| 6,279,976 B1 | 8/2001 | Ball | |
| 6,296,426 B1 | 10/2001 | King et al. | |
| 6,341,808 B1 | 1/2002 | Baan et al. | |
| 6,413,022 B1 | 7/2002 | Sarh | |
| 6,502,877 B2 | 1/2003 | Schick et al. | |
| 7,004,521 B2 * | 2/2006 | Ishii | B25B 11/007 294/187 |
| 7,216,403 B2 | 5/2007 | Decker | |
| 7,222,901 B2 | 5/2007 | Gebauer et al. | |
| 7,267,512 B1 | 9/2007 | Mueller | |
| 7,404,536 B2 | 7/2008 | Kalb | |
| 7,712,807 B2 | 5/2010 | Perlman et al. | |
| 7,963,578 B2 | 6/2011 | Wells et al. | |
| 8,096,537 B2 | 1/2012 | Browne et al. | |
| 8,104,809 B1 * | 1/2012 | Mayhugh | B25B 11/007 248/205.8 |
| 8,534,633 B2 | 9/2013 | Tell | |
| 9,108,319 B2 | 8/2015 | Kniss et al. | |
| 9,215,962 B2 | 12/2015 | Qian | |
| 10,383,492 B2 | 8/2019 | Abramson et al. | |
| 11,413,727 B2 * | 8/2022 | Rotem | B66C 1/0256 |

FOREIGN PATENT DOCUMENTS

| | | |
|---|---|---|
| CN | 205555846 U | 9/2016 |
| DE | 3724659 A1 | 2/1989 |
| FR | 1036586 A | 9/1953 |
| GB | 1036586 A | 7/1966 |
| WO | 2001021357 A1 | 3/2001 |
| WO | 2017215163 A1 | 12/2017 |

* cited by examiner

FIG. 2B
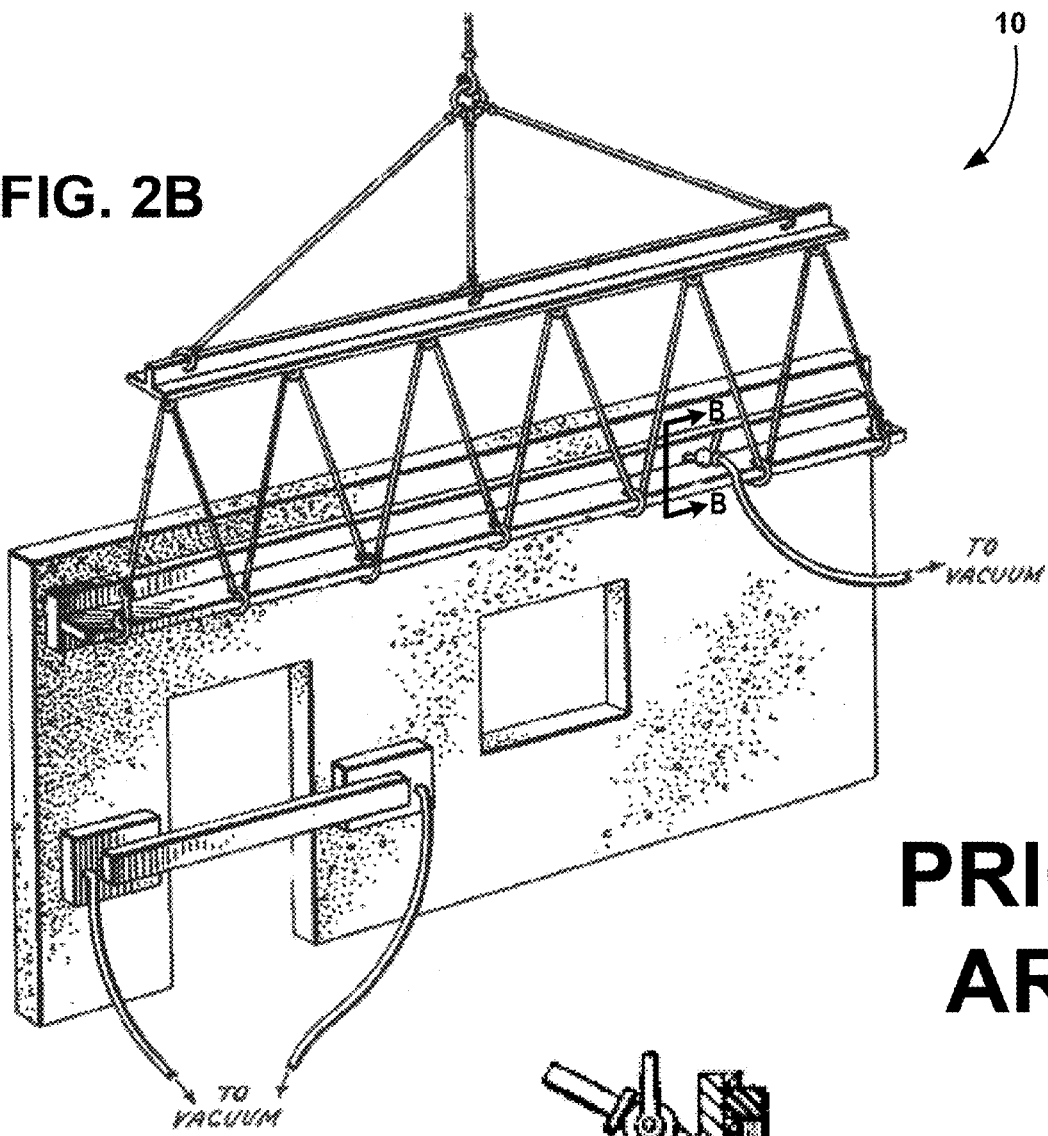
PRIOR ART
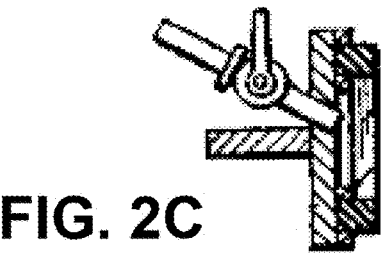
FIG. 2C
FIG. 2D
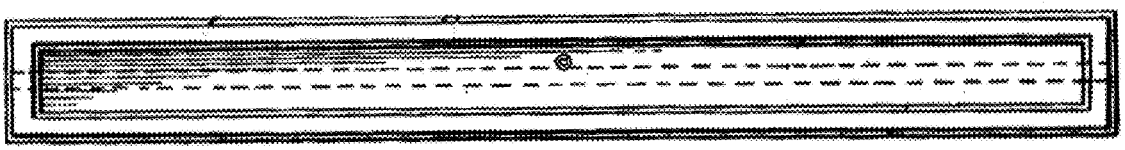

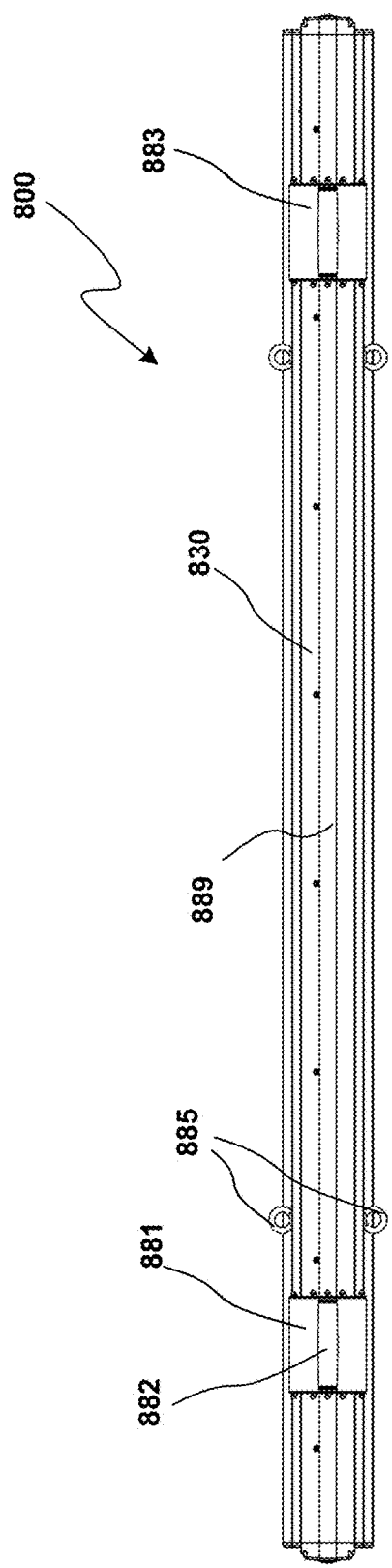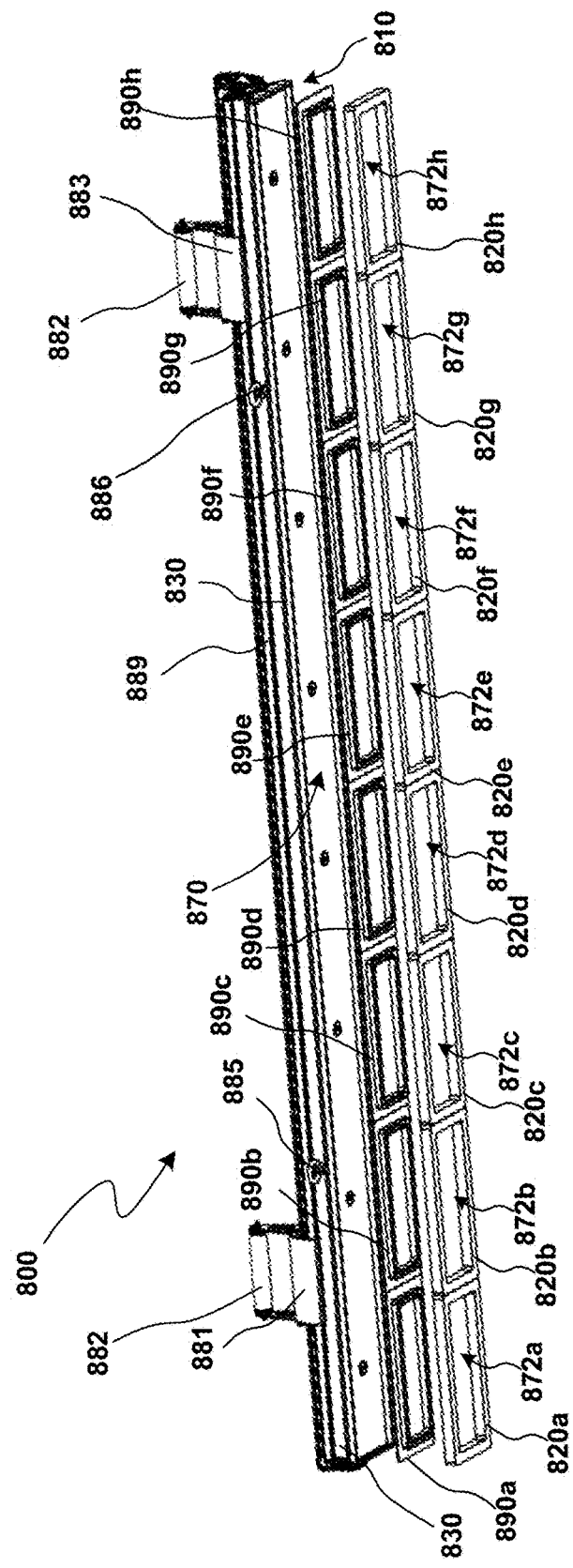

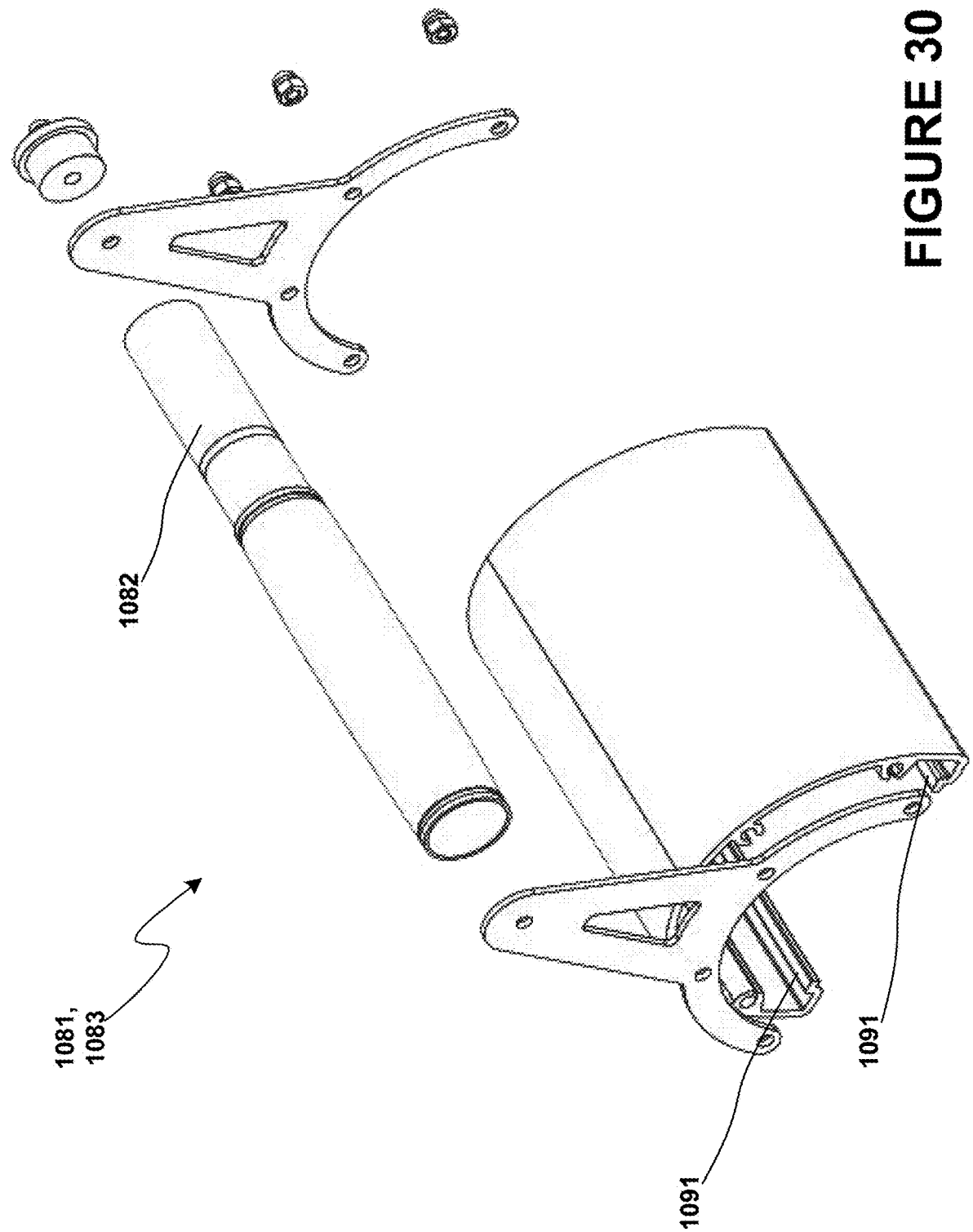

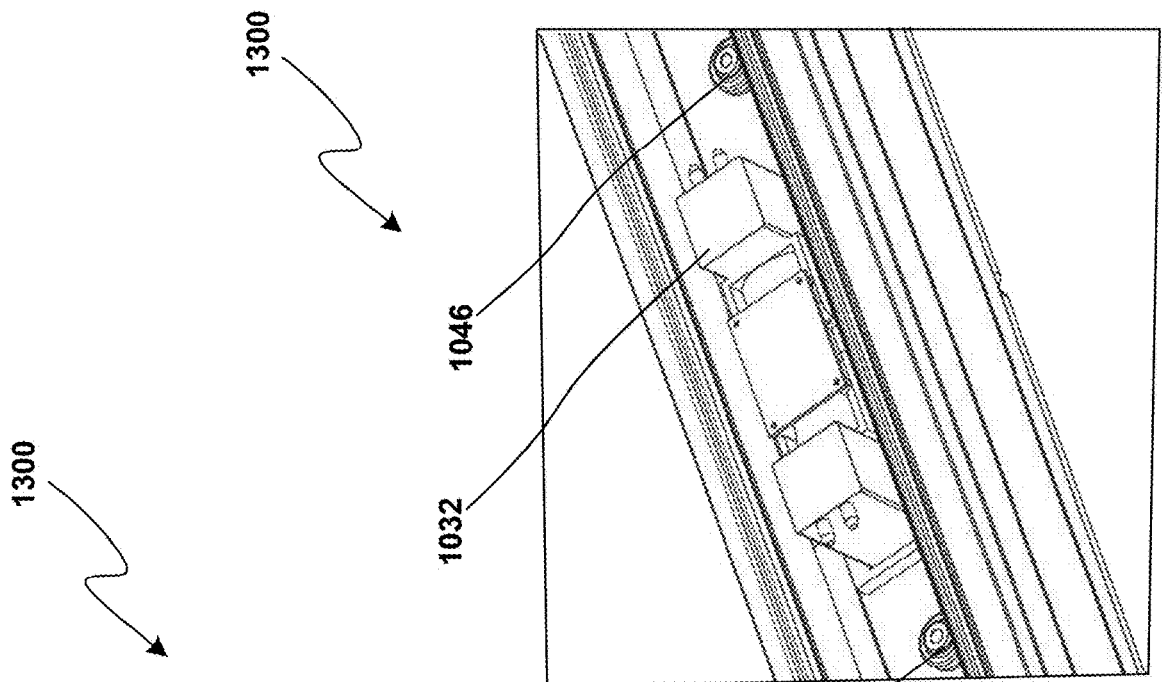
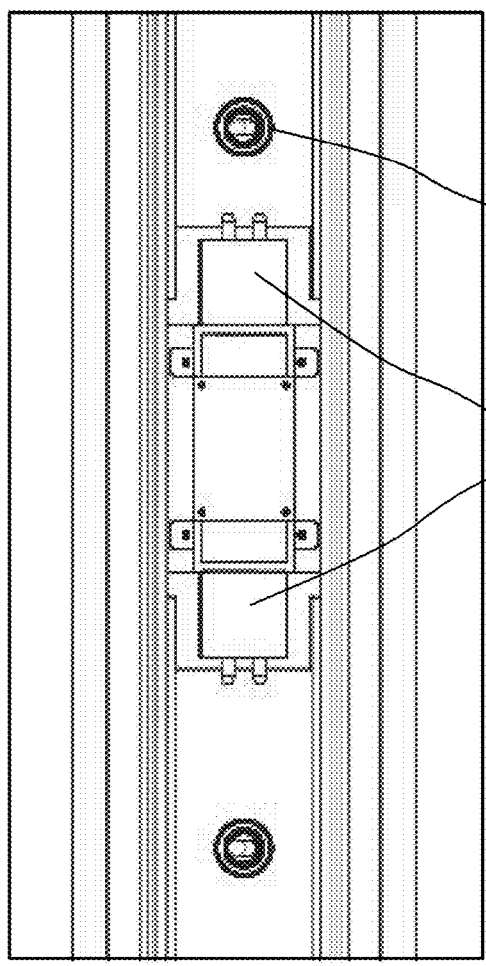
FIGURE 39
FIGURE 40

EXTENDED-FRAME PORTABLE VACUUM GRIPPER

CROSS-REFERENCE TO RELATED APPLICATIONS

This application is a Continuation-in-Part of co-pending U.S. patent application Ser. No. 16/769,107 filed Jun. 2, 2020; which is a National Stage entry of international patent application no. PCT/IL2019/050502 filed on Jan. 5, 2019; which claims priority to foreign Israeli patent application no. 259216 filed on May 8, 2018; the entire contents of each of which are incorporated herein by reference.

BACKGROUND

Aspects, features, and concepts described herein relate to material handling systems, tools and devices, and more particularly to gripping devices. More particularly, the subject matter described herein relates to grippers for gripping object surfaces and, in particular, to vacuum grippers. Further, the present disclosure relates to extended-frame portable vacuum grippers and low stress-inducing grippers.

Handheld or portable vacuum material handling or gripping devices are known and increasingly being used in industry and home use for gripping, handling, and moving wide ranges and types of objects. Conventional vacuum-based gripping devices historically rely upon suction-cup based arrangements and designs, which is still the case for many portable and handheld type gripping devices, as well as various industrial implementations. As an example, FIGS. 1A to 1C show several views of a handheld, battery powered vacuum device for handling articles, which is shown and further described in U.S. Pat. No. 5,795,001 filed Dec. 18, 1996. As discussed in the '001 patent, early versions of portable vacuum devices suffered drawbacks related to low power and loss of suction during use, for which the '001 patent provided improvements. Portable and handheld vacuum devices can provide advantages related to portability and maneuverability, as well as expanding their applications and use along with continuing improvements for gripping strength and lift reliability.

Even though development and usage of portable vacuum gripper devices has greatly increased in recent years and become more commonplace, there remains a need for effective extended-length versions of portable lifts for gripping flat sheet materials and other objects benefitting from at least a pair of control handles or attachment locations and operable as handheld devices or portable power tools, as well as for low stress-inducing grippers. Significant improvements for lifting strength and usage have occurred in recent years, which have expanded their usage for a wide range of applications that can be challenging to perform using handheld devices and control interfaces. For example, ranges of object weights that can be lifted using such devices have greatly increased over recent years, which can be challenging for a user to manage, lift or handle using a handheld grip device even if within operation limits for the device.

Improvements have been pursued for increasing ranges of object sizes and types that can be lifted. Multiple conventional vacuum grip devices have been used in combination for lifting sheet materials, which suffer drawbacks for inducing undesirable stresses in the sheet material and often damage the flat sheet material or other object being lifted. Further, conventional vacuum grip devices include one or more structural framework connections attaching multiple vacuum grip devices, which frameworks connect with rear portions of the grippers opposite from the contact surfaces used for lifting extended length sheet materials. These arrangements nonetheless induce undesirable stresses in the sheet material due to the discrete contacts being connected via spaced apart frameworks disposed apart from the contact surfaces.

FIG. 2A, for example, shows a conventional lifting assembly described in U.S. Pat. No. 4,685,714 issued Aug. 11, 1987 to Thomas Hoke, in which shows a hollow load beam with a longitudinal slot along its bottom that connects cross arms. The cross arms form a framework with the hollow load beam and connects together multiple vacuum pads. Each of the vacuum pads are arranged to connect with an extended flat material and operate as a single lifting assembly to lift the material. As shown in FIG. 2A, the lifting assembly framework is spaced apart from the vacuum pad contact surfaces, and each vacuum pad contact surface is arranged for being attached to the material to be lifted at spaced apart discrete locations along the surface. The arrangement of FIG. 2A and similar conventional arrangements inherently induce various stresses along the extended material attached thereto when lifting the same, such as based on the discrete connection arrangement and framework spaced apart from the surface of the extended material surface.

Extended surface area lifting device solutions for reducing applied stresses have been provided, which can reduce applied stresses compared with point-attachment, offset-frame types of conventional lift connections. Nonetheless, conventional extended frame, reduced stress, vacuum lift solutions have significant drawbacks and limitations that limit their effectiveness and usage. Further, such conventional solutions have been provided having specialized designs for particular material connections and/or lift operations, such as refinements for industrial tool arrangements and operations. As such, conventional extended frame solutions provide specialized arrangements and designs tailored for connecting with certain object types and for addressing specific industry needs, which suffer drawbacks related to their specialized designs, custom uses, and lack of flexibility and portability.

For example, FIGS. 2B to 2D show conventional extended surface material handling apparatus solutions having customized industrial uses for industrial lift operations that rely on a hoist attached to the material handling connection device for lift operations, as well as for lifting related industrial objects, which is described in U.S. Pat. No. 2,475,073 issued Sep. 8, 1944 to K. P. Biller. In particular, the material handling apparatus arrangements of FIGS. 2B to 2D are designed for connecting an industrial hoist with flat surfaces of prefabricated concrete walls for lifting the same without excessive stresses. As can be seen in FIG. 2D, a hollow elongate frame is provided having a sealing contact surface at an open face that can span an extended length of slab surface area. A beam reinforcement structure at an opposite side from the face is attached to the lifting hoist, and a nipple connection into the hollow frame connects with an industrial vacuum source for sealing the face against the slab surface contact area.

The frame arrangement shown in FIG. 2D depicts a single extended frame device custom tailored for firmly holding a beam reinforcement across a continuous wall structure during hoist lift operations as shown in FIG. 2B, in which the frame and frame face extend the length of the device. FIG. 2C along with FIG. 2B depicts another custom-tailored extended frame device formed from a pair of small, spaced-apart frame devices, which are attached to each other via a beam connector extending from rear portions of each frame opposite from the faces without maintaining a frame or other rigid support connection between the faces of each frame device similar to conventional, discrete contact point, vacuum lift devices described above. These and related conventional lift solutions suffer from significant limitations based on their custom designs and intended uses, as well as other significant drawbacks, such as lack of independent or portable vacuum sources and inability to maintain lift connections or readily adapt to unexpected material variables, such as openings or other discontinuities along the lift surface that can break suction and lift connections along a full connection length of an extended single frame lift device.

Thus, a need exists for overcoming drawbacks and limitations of conventional portable lifting devices and systems including reducing risks for inducing stresses and/or damaging flat sheet material or other object being lifted while maintaining benefits and advantages provided by portable, easily maneuverable portable grip devices and systems.

SUMMARY

This summary introduces certain aspects of the embodiments described herein to provide a basic understanding. This summary is not an extensive overview of the inventive subject matter, and it is not intended to identify key or critical elements or to delineate the scope of the inventive subject matter.

According to aspects and features of inventive subject matter described herein, an extended frame portable vacuum grip device includes a rigid support frame defining an open chamber, which can include: an impermeable elongate base having a vacuum grip side, an opposite support side, a width, and an extended length that is larger than the width, the base defining at least one port therethrough; and an impermeable support wall connected to a perimeter of the base and extending around the base, the support wall protruding a first distance from the base in a vacuum grip direction away from the support side, the support wall having an inner side and an opposite outer side, the inner side and the vacuum grip side of the base defining the open chamber of the support frame. The device also includes at least one closed-loop gasket coupled with the elongate base, the at least one port, and the support wall together defining a vacuum grip region configured to form a seal with a surface of a lift object.

The at least one closed-loop gasket can include: a base surface connected to the base at the vacuum grip side, the gasket protruding from the base in the vacuum grip direction a second distance greater than the support wall first distance; a contact surface at an opposite end from the base surface; an inner wall between the base surface and the contact surface forming a closed-loop and defining a hollow space therein; and an outer wall between the base surface and the contact surface, the outer wall adjacent to the support wall and engaging the inner side thereof for the first distance. The device also includes at least one air extraction pump operatively connected with the at least one closed-loop gasket, the hollow space therein, and the at least one port. The device also includes where the at least one closed-loop gasket, the hollow space therein, the inner side of the support wall, the at least one port, and the at least one pump form at least one independently operable vacuum grip region integrated within the open chamber of the extended support frame.

Implementations can include one or more of the following features. The extended frame portable grip vacuum device can include at least one brace connected to the base portion at the vacuum grip side, the at least one brace can include: a brace base connected to the vacuum grip side of the base; and a brace wall protruding a third distance from the brace base, the third distance less than the second distance of the corresponding closed-loop gasket. The brace wall can be made of a material that is less rigid than the support frame and the brace wall can be more rigid than the at least one gasket. The brace wall can be positioned with respect to the gasket inner wall at one of an adjacent position adjacent to the gasket inner wall for firmly supporting the gasket between the brace wall on an inboard side of the gasket and the inner side of the support wall portion on an outboard side of the gasket and/or a spaced-apart position spaced apart from the gasket inner wall in an inboard direction. The brace wall can be a first brace wall disposed at the adjacent position, and the at least one brace can include a second brace wall disposed at the spaced-apart position. The second brace wall can be free of contact with the at least one gasket. The second brace wall can be made of a material that is less rigid than the support frame and the second brace wall can be more rigid than the at least one gasket. Further, the at least one brace can be replaceable, and the at least one gasket can be replaceable for customizing grip features. In addition, the device can include a force balancing structure including first and second lift offsets and a stress reduction frame that can define a neutral plane at the first height distance H1 for receiving lift forces through the first and the second lift interfaces along the neutral plane, and the stress reduction frame can be configured to resist compressive forces responsive to tensile forces applied to the elongate base when lifting an object.

According to aspects and features of inventive subject matter described herein, an extended frame portable vacuum grip device includes a rigid support frame defining an open chamber, which can include: an impermeable elongate base having a vacuum grip side, an opposite support side, a width, and an extended length that is larger than the width, the base defining a plurality of ports therethrough spaced apart along the length of the base; and an impermeable support wall connected to a perimeter of the base and extending around the base, the support wall protruding a first distance from the base in a vacuum grip direction away from the support side, the support wall having an inner side and an opposite outer side, the inner side and the vacuum grip side of the base defining the open chamber. The extended frame portable vacuum grip device can further include a plurality of closed-loop gaskets each coupled with a corresponding portion of the elongate base, a corresponding port of the plurality of ports, and a corresponding portion of the support wall, which together can define a vacuum grip region each configured to form a seal with a surface of a lift object. Each closed-loop gasket can include: a base surface connected to the corresponding base portion at the vacuum grip side, each gasket protruding from the base in the vacuum grip direction a second distance greater than the support wall first distance; a contact surface at an opposite end from the base surface; an inner wall between the base surface and the contact surface forming a closed-loop and defining a hollow space therein; and an outer wall between the base surface and the contact surface, the outer wall adjacent to the corresponding support wall portion and engaging the inner side thereof for the first distance. The device can also include a plurality of air extraction pumps each operatively connected with a corresponding one of the closed-loop gaskets, the hollow space therein, and the corresponding port for independent operation of each vacuum grip region. As such, the device can include where a plurality of independently operable vacuum grip regions integrated within the open chamber along a length of the extended support frame.

Implementations can include one or more of the following features. The rigid support frame of the device can be formed as a unitary frame. Further, the extended frame portable vacuum grip device can include: a plurality of braces each corresponding with one of the plurality of closed-loop gaskets, each brace connected to the corresponding base portion at the vacuum grip side, in which each brace can include: a brace base connected to the vacuum grip side of the corresponding base portion; and a brace wall protruding a third distance from the brace base, the third distance less than the second distance of the corresponding closed-loop gasket. For each brace of the plurality of braces: the brace wall can be positioned with respect to the corresponding gasket inner wall at one of: an adjacent position adjacent to the corresponding gasket inner wall for firmly supporting the gasket between the brace wall on an inboard side of the gasket and the inner side of the corresponding support wall portion on an outboard side of the gasket; and/or a spaced-apart position spaced apart from the gasket inner wall in an inboard direction. Each of the plurality of braces can be made from a material which is more rigid than that of the corresponding closed-loop gasket and less rigid than that of the support wall. Moreover, each of the plurality of braces can be removable for optional use for the corresponding vacuum grip region, and/or can be replaceable with an alternative brace arrangement for customizing performance of the corresponding vacuum grip region. Similarly, each of the plurality of closed-loop gaskets can be replaceable with an alternative closed-loop gasket arrangement for customizing performance of the vacuum grip region.

In addition, the extended frame portable vacuum lift device can include first and second lift offsets and a stress reduction frame that define a neutral plane at the first height distance H1 for receiving lift forces through the first and the second lift interfaces along the neutral plane, and the stress reduction frame can be configured to resist and offset bending and compressive forces transferred to and between the first and the second extensions when tensile and bending forces are applied to the elongate base when lifting an object. Also, the rigid support frame can be formed as a unitary frame, and the first and the second lift offsets and the first and the second lift interfaces can be integrally formed with the unitary support frame. Alternatively, the stress reduction frame can be formed in whole or in part as a unitary frame separate from the rigid support frame. In addition, the device can include a force balancing structure including first and second lift offsets and a stress reduction frame that can define a neutral plane at the first height distance H1 for receiving lift forces through the first and the second lift interfaces along the neutral plane, and the stress reduction frame can be configured to resist compressive forces responsive to tensile forces applied to the elongate base when lifting an object.

In some implementations, the rigid support frame can be formed as an aluminum extrusion defining the open chamber; the stress reduction frame can be formed as an aluminum extrusion; and a brace thereof can be shaped as a peaked cover. Moreover, the stress reduction frame and the peaked cover can define a hollow enclosure for retaining the plurality of pumps along the length of the base. In some implementations, the first lift interface and the second lift interface can include a pair of handles located at an opposite side of the grip device from the base, and each of the pair of handles can be centered across a width of the rigid support frame and attached to the rigid support frame at opposite sides of the frame and proximate the neutral plane for preventing inducement of torsional stresses when lifting an object.

Other extended frame portable vacuum grip device related subject matter and stress reduction frame and extended control handle connections for portable grip device related technologies, related systems, and components, and/or methods according to embodiments will be or become apparent to one with skill in the art upon review of the following drawings and detailed description. It is intended that all such additional devices, related components, systems, and/or methods included within this description be within the scope of this disclosure.

BRIEF DESCRIPTION OF THE DRAWINGS

FIGS. 2B to 2D show perspective and feature views of conventional extended length connection devices for lifting prefabricated concrete slabs via a hoist as described in U.S. Pat. No. 2,475,073 issued Sep. 8, 1944 to K. P. Biller.

FIG. 15 is a top view of the example device of FIG. 13 shown without an example object attached to the contact surface.

FIG. 16 is a partially exploded perspective view from the lower contact surface side of the example device of FIG. 13 shown without an example object attached to the contact surface.

FIG. 30 shows an exploded view of the adjustable handle of FIG. 29.

FIG. 39 is a top view of the set of pump pairs and corresponding grip regions of FIG. 37, and FIG. 40 is a close top perspective view of the set of pump pairs.

DETAILED DESCRIPTION

Figure 1A:
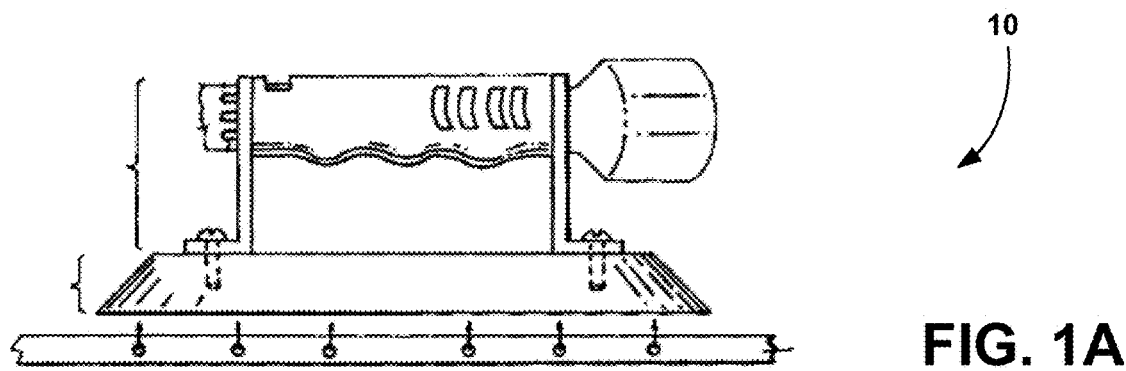
FIG. 1A is a side plan view during typical use of a PRIOR ART portable vacuum device having a conventional suction cup style gripper arrangement as described in U.S. Pat. No. 5,795,001 filed Dec. 18, 1996.
Figure 1B:
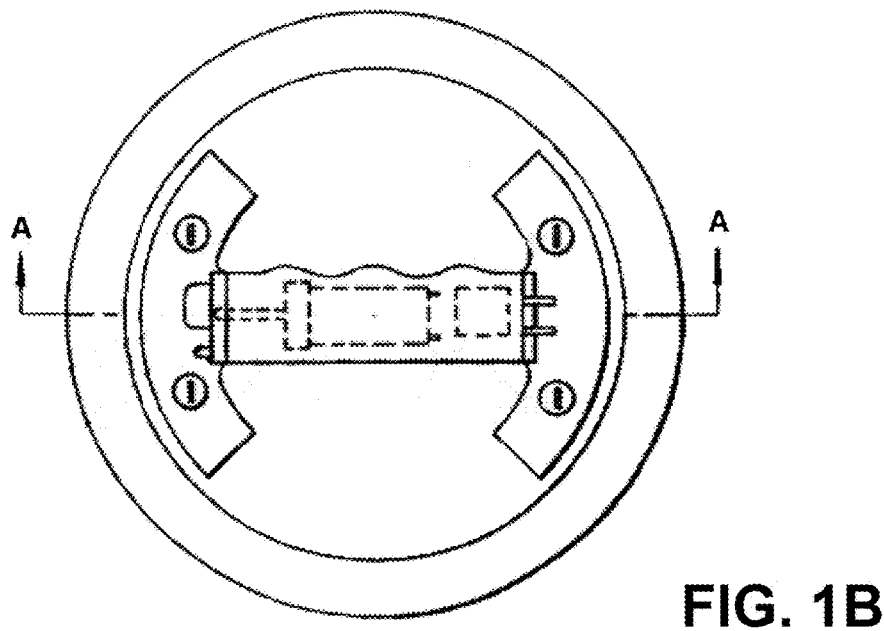
FIG. 1B is a top plan view of the portable vacuum device of FIG. 1A.
Figure 1C:
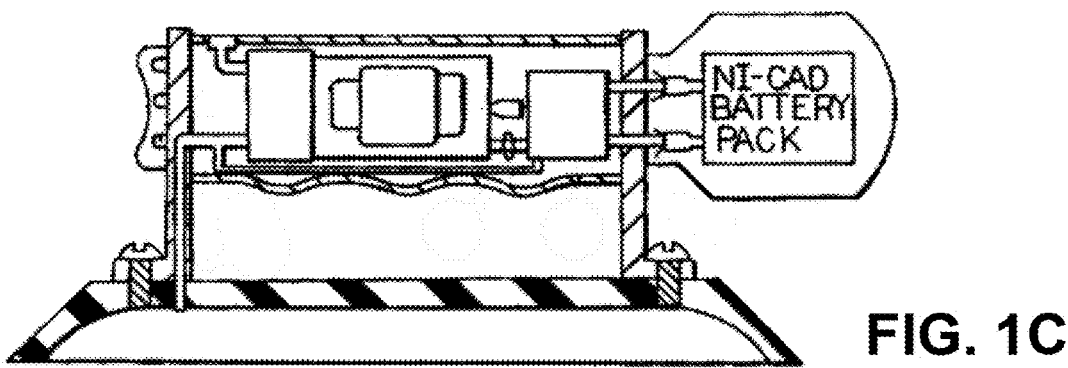
FIG. 1C is a cross-sectional view of the portable vacuum device of FIG. 1A according to Line A-A shown in FIG. 1B.
Figure 2A:
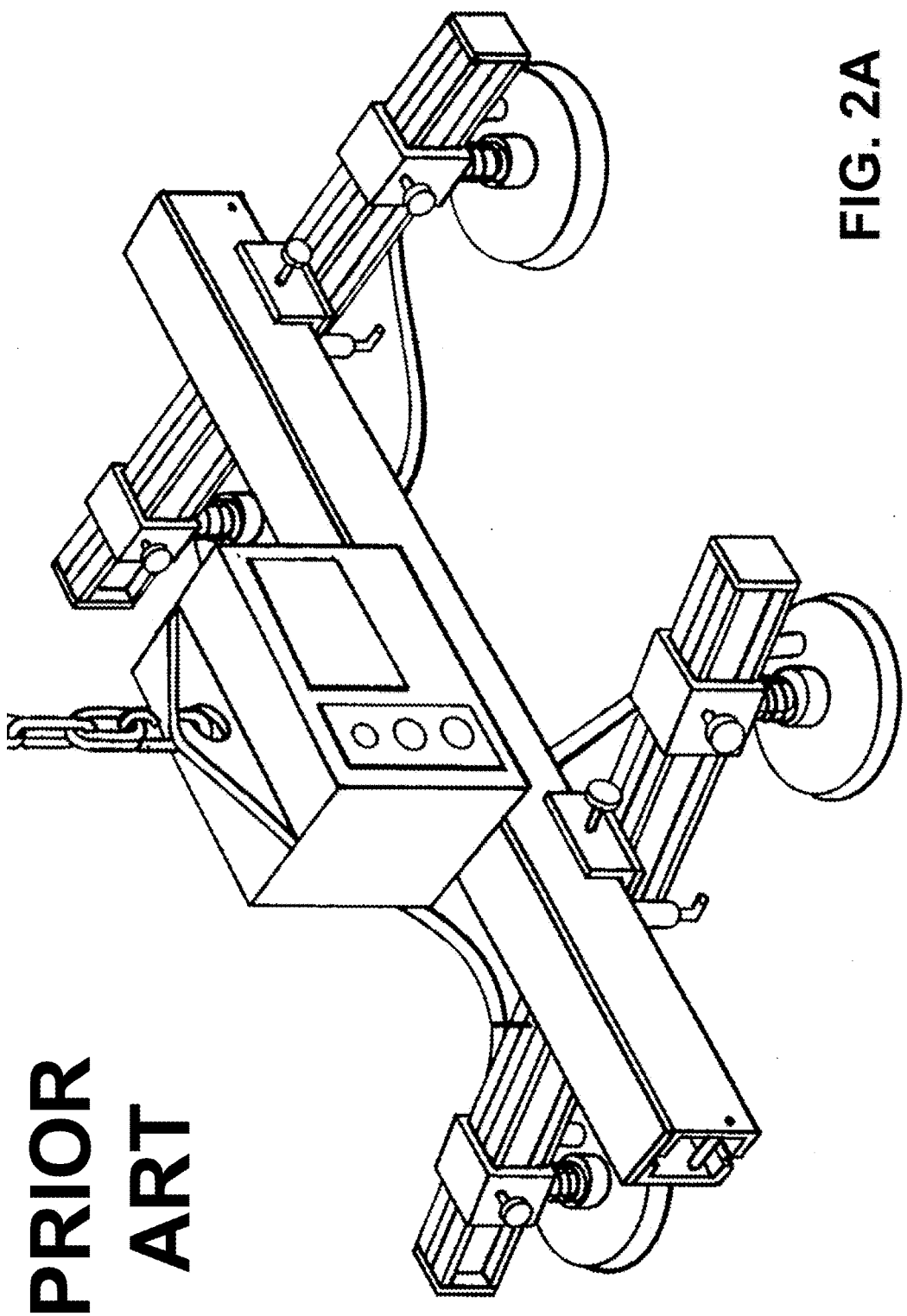
FIG. 2A is a perspective view of a conventional lifting assembly described in U.S. Pat. No. 4,685,714 issued Aug. 11, 1987 to Thomas Hoke.

For the purposes of promoting an understanding of the aspects, features and principles pertaining to the invention and configurations discussed herein, reference will now be made to the example configurations and arrangements illustrated in the drawings along with language describing the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification can, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which can or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments can be combined in whole or in part one with another as the claims and/or art can direct, either directly or indirectly, implicitly, or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

As used herein, the term "about" when used in connection with a referenced numeric indication means the referenced numeric indication plus or minus up to 10 percent of that referenced numeric indication. For example, the language "about 50" covers the range of 45 to 55. Similarly, the language "about 5" covers the range of 4.5 to 5.5.

As used in this specification and the appended claims, the words "top," "above," and "upward" refer to elevation directions away from the ground level of an exercise device in its typical or intended usage orientation at or towards a higher elevation, and the words "bottom," "below," "base" and "downward" refer to elevation directions at or towards the ground level of an exercise device at a lower elevation in its typical usage orientation. Thus, for example, the top of a control handle attached to a portable vacuum grip device that is farthest from the ground level of the grip device gripping a tile to be carried would be the vertical distal end of the combined structure, and the end opposite the vertical distal end (i.e., the base of the grip device interfacing with the tile surface) would be the base or bottom of the combination.

Further, specific words chosen to describe one or more embodiments and optional elements, or features are not intended to limit the invention. For example, spatially relative terms—such as "beneath," "below," "lower," "above," "upper," "proximal," "distal," and the like—can be used to describe the relationship of one element or feature to another element or feature as illustrated in the figures. These spatially relative terms are intended to encompass various positions (i.e., translational placements) and orientations (i.e., rotational placements) of a device in use or operation in addition to the position and orientation shown in the figures. For example, if a device in the figures were turned over, elements described as "below", or "beneath" other elements or features would then be "above" or "over" the other elements or features. Thus, the term "below" can encompass both positions and orientations of above and below. A device can be otherwise oriented (e.g., rotated 90 degrees or at other orientations) and the spatially relative descriptors used herein interpreted accordingly. Likewise, descriptions of movement along (translation) and around (rotation) various axes include various spatial device positions and orientations.

Similarly, geometric terms, such as "parallel," "perpendicular," "round," "curvilinear," "articulated" or "square," are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

In addition, the singular forms "a," "an," and "the" are intended to include the plural forms as well, unless the context indicates otherwise. The terms "comprises," "includes," "has," and the like specify the presence of stated features, steps, operations, elements, components, etc., but do not preclude the presence or addition of one or more other features, steps, operations, elements, components, or groups.

Unless indicated otherwise, the terms exercise apparatus, device, equipment, systems, and variants thereof, can be interchangeably used.

In this specification, the applicant can refer to an existing device including a gripper, a grip device, an electric tool, a power tool, a portable tool, a gripping device, grabber device or a grabber. The reader shall note that the distinction is that an existing device for use with aspects and features of a control handle described herein can be already designed prior to consideration for use with a control handle and existing portable electric gripping devices can be on the market. The reader shall interpret minor modifications of the grip device or existing gripper or power tool for attachment and use with a control handle as still part of the combination with the control handle and still within the spirit of the scope of the subject matter disclosed.

As used herein, a "readily-attachable" or "quick-connect" control handle refers to a control handle configured for quick and secure attachment without the use of tools with corresponding interface connectors of a portable electric tool or grip device for maneuvering and otherwise controlling the attached device using the control handle.

Figure 3A:
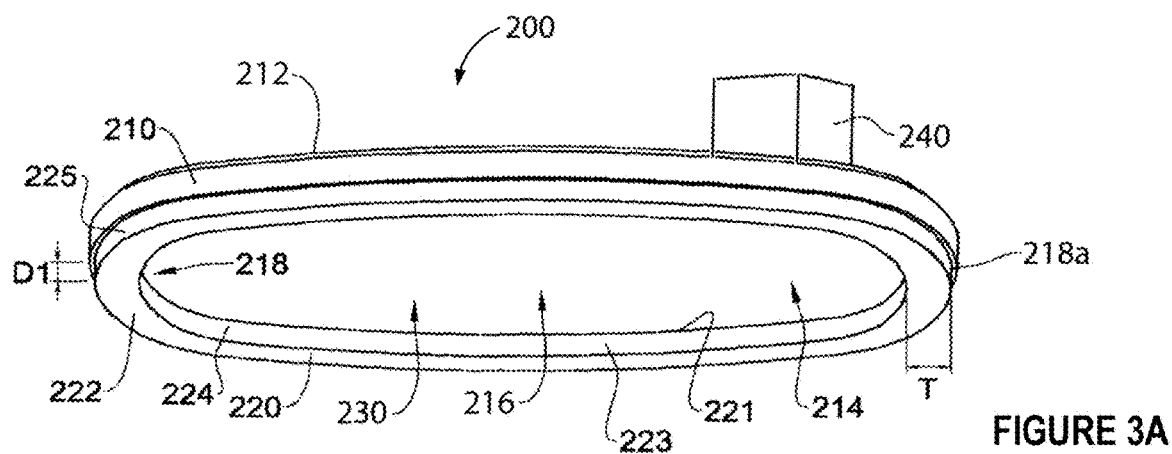
FIG. 3A shows a bottom perspective view of a vacuum gripper according to one example of the presently disclosed subject matter.

According to one example, as schematically shown in FIG. 3A, a vacuum gripper 200 can include a rigid base element 210 having a first side 212 and a second side 214 opposite to the first side 212, a width and a length greater than its width. The second side 214 has a central area 216 and a periphery 218 surrounding the central area 216. The periphery 218, which is seen only partially, is bounded by a peripheral rim 218a radially spaced thereby from the central area. The vacuum gripper 200 can further a loop-shaped vacuum seal element 220 attached with an attachment surface 221 thereof to the periphery 218 along a peripheral support area 218b (not seen). The loop-shaped vacuum seal element 220 can further include a protruding portion 223 which is free of contact with the base element 210 and which protruding from the second side 214 of the base element 210 in a direction away from the first side 212 of the base element 210 to a predetermined distance D1.

The protruding portion 223 of the vacuum seal element 220 can include a contact surface 222 configured to be brought into at least a partial contact with an object surface.

The vacuum seal element 220 can also include an inner encircling surface 224 oriented transversely to and extending from the contact surface 222 and facing towards the central area 216 so as to define therewith a chamber 230 along the protruding portion 223. The vacuum seal element 220 also includes an outer encircling surface 225 oriented transversely to and extending from the contact surface 222 and facing away from the central area 216 and the chamber 230, the peripheral rim 218a of the second side of the base element protruding outwardly from the outer encircling surface.

Thus, the contact surface 222 and the attachment surface 221 of the vacuum seal element both extend between the inner and outer encircling surfaces 224 and 225. As can be understood from FIG. 3A, in this example the contact surface 222 is co extensive with the attachment surface 221 along the periphery of the second side of the base element. As further seen in FIG. 3A, the predetermined distance D, to which the protruding portion 223 protrudes from the second side of the rigid base element, does not exceed a thickness T of the protruding portion between the inner and outer encircling surfaces. More particularly, the thickness T of the protruding portion is greater than the predetermined distance D1.

The vacuum seal element 220 is elastically deformable at least at its contact surface 222 to enable the contact surface 222 to conform to an object surface when pressed thereagainst. The vacuum gripper 200 further comprises an air extraction means 240 mounted to the first side 212 of the base element 210 so as to be in fluid communication with the chamber 230 through the base element 210. The air extraction means 240 is configured to continuously extract air from the chamber to cause the contact surface 222 to be urged towards and thereby grip an object surface when pressed thereagainst.

Figure 3B:
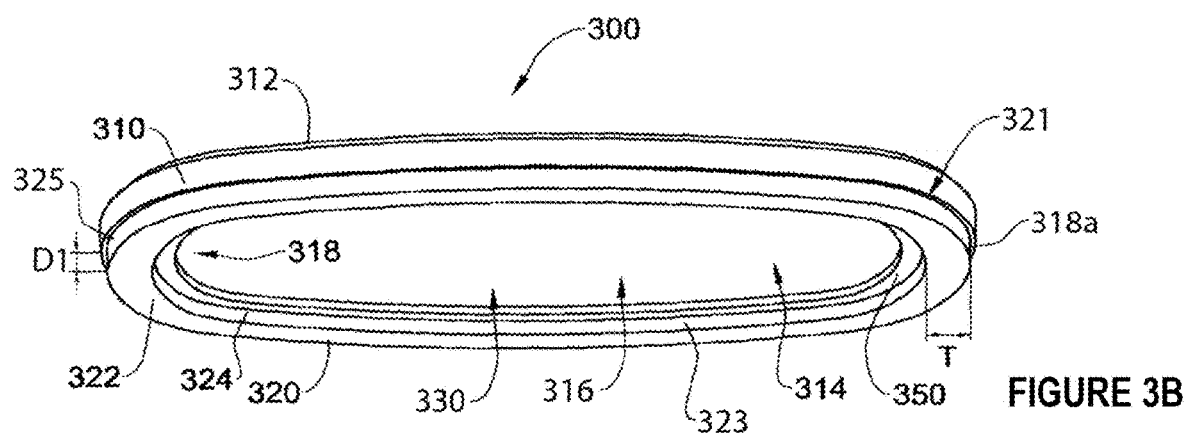
FIG. 3B shows a bottom perspective view of a vacuum gripper according to a second example of the presently disclosed subject matter.

According to a further example, as shown in FIG. 3B, a vacuum gripper 300 comprises a rigid base element 310 having a first side 312 and a second side 314 opposite to the first side 312. The second side 314 has a central area 316 and a periphery 318 surrounding the central area 316 and bounded by a peripheral rim 318a. The vacuum gripper 300 further comprises a loop-shaped vacuum seal element 320 attached to the periphery of the second side 314 of the base element 310 with an attachment surface 321 thereof along a peripheral support area 318b (not seen).

The loop-shaped vacuum seal element 320 comprises a protruding portion 323 free of contact with the base element 310 protruding from the second side 314 of the base element 310 in a direction away from the first side 312 of the base element 310 to a predetermined distance D1. The protruding portion 323 of the vacuum seal element 320 comprises a contact surface 322 configured to be brought into at least a partial contact with an object surface. The vacuum seal element 320 also comprises an inner encircling surface 324 oriented transversely to and extending from the contact surface 322 and at least partially facing towards the central area 316 so as to define therewith a chamber 330 along the protruding portion 323. The vacuum seal element 320 also comprises an outer encircling surface 325 oriented transversely to and extending from the contact surface 322 and facing away from the central area 316 and the chamber 330, the peripheral rim 318a of the second side of the base element protruding outwardly from the outer encircling surface. Thus, the contact surface 322 and the attachment surface 321 of the vacuum seal element both extend between the inner and outer encircling surfaces 324 and 325. As can be understood from FIG. 3B, the contact surface 322 is co-extensive with the attachment surface 321 along the periphery of the second side of the base element.

As further seen in FIG. 3B, the predetermined distance D1, to which the protruding portion 323 protrudes from the second side of the rigid base element, does not exceed a thickness T of the protruding portion between the inner and outer encircling surfaces. More particularly, the thickness T of the protruding portion is greater than the predetermined distance D1. The vacuum seal element 320 is elastically deformable at least at its contact surface 322 to enable the contact surface 322 to conform to an object surface when pressed thereagainst. The vacuum gripper 300 further comprises a bracing structure 350 attached to the peripheral support area 318b (not seen) of the second side 314 of the base element 310 and protruding therefrom in a direction away from the first side 312 of the base element to a lesser extent than that of the vacuum seal element 320. The bracing structure 350 is made of a material which is more rigid than that of the vacuum seal element 320. The bracing structure 350 extends at least along a part of the vacuum seal element 320.

Figure 3C:
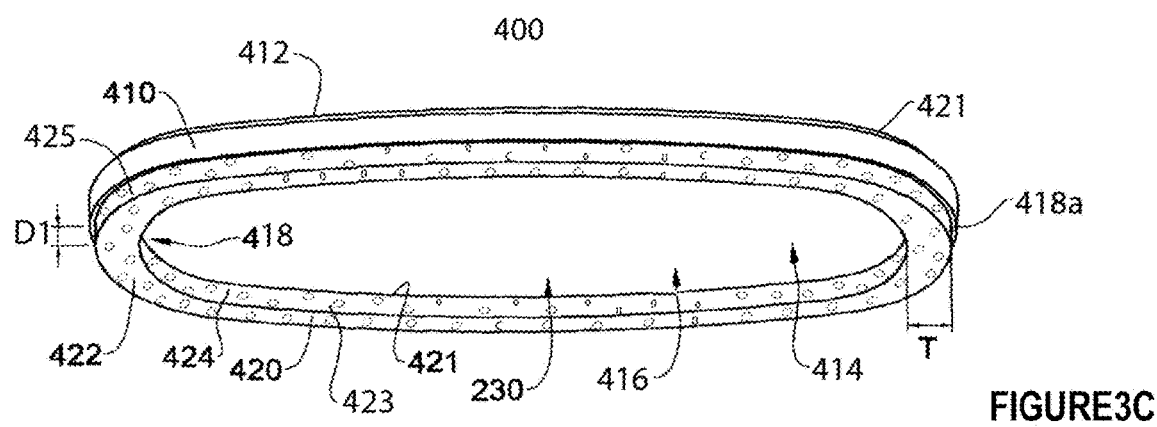
FIG. 3C shows a bottom perspective view of a vacuum gripper according to a still further example of the presently disclosed subject matter.

According to a still further example, as shown in FIG. 3C, a vacuum gripper 400 comprises a rigid base element 410 having a first side 412 and a second side 414 opposite to the first side 412. The second side 414 has a central area 416 and a periphery 418 surrounding the central area 416 and bounded by a peripheral rim 418a radially spaced thereby from the central area. The vacuum gripper 400 further comprises a loop-shaped vacuum seal element 420 attached to the peripheral support area 418b of the second side 414 of the base element 310 with an attachment surface 421 thereof at a peripheral support area 418b (not seen).

As can be seen in FIG. 3C, the loop-shaped vacuum seal element 420 is attached to the second side 414 of the base element 410. The loop-shaped vacuum seal element 420 comprises a protruding portion 423 free of contact with the base element protruding from the second side 414 of the base element 410 in a direction away from the first side 412 of the base element 410 to a predetermined distance D1. The protruding portion 423 of the vacuum seal element 420 comprises a contact surface 422 configured to be brought into at least a partial contact with an object surface. The vacuum seal element 420 also comprises an inner encircling surface 424 oriented transversely to and extending from the contact surface 422 and at least partially facing towards the central area 416 so as to define therewith a chamber 430 along the protruding portion 423. The vacuum seal element 420 also comprises an outer encircling surface 425 oriented transversely to and extending from the contact surface 422 and facing away from the central area 416 and the chamber 430, the peripheral rim 418a of the second side of the base element protruding outwardly from the outer encircling surface. Thus, the contact surface 422 and the attachment surface 421 of the vacuum seal element both extend between the inner and outer encircling surfaces 424 and 425. As can be understood from FIG. 3C, the contact surface 422 is co-extensive with the attachment surface 421 along the periphery of the second side of the base element.

As further seen in FIG. 3C, the predetermined distance D1, to which the protruding portion 323 protrudes from the second side of the rigid base element, does not exceed a thickness T of the protruding portion between the inner and outer encircling surfaces. More particularly, the thickness T of the protruding portion is greater than the predetermined distance D1. The vacuum seal element 420 is elastically deformable at least at its contact surface 422 to enable the contact surface 422 to conform to an object surface when pressed thereagainst. The vacuum seal 420 element can include a closed-cell foam material. An exemplary closed-cell foam material can be formed, for example, from Styrene, 1,3-butadiene polymer, also known as: Benzene, ethenyl, polymer with 1,3-butadiene; Butadiene-styrene latex; Butadiene-styrene resin; Poly(styrene-co-butadiene), 5% styrene; Styrene, 1,3-butadiene polymer; Styrene-Butadiene copolymer; Styrene-butadiene copolymers; and having the following properties: CAS (Chemical Abstract Service) Registry Number: 9003-55-8; Molecular Formula: C12H14; Molecular Weight: 158.243; Density: 1.04 g/mL at 25° C.; Solubility: solvents with solubility parameters between 7.7 and 9.4: soluble Form: slab/chunk; Stability: Stable. Combustible. Incompatible with strong oxidizing agents; Breaking strength (MPa): 24.5~26.5; Elongation at break (%): 800~1000 Rebound rate (%): 50~80; Compression ratio 100° C. 70 h (%): 2~40; Maximum use temperature (c): 150; Embrittlement temperature (c): −35~−42; and Expansion ratio (%): gasoline 10~45; benzene 100~300; acetone 15~50; ethanol 5~20.

Such a material may be formed or manufactured into a closed-cell foam using the manufacturing method of SBR foaming, and the production method of finished products can be by die-cutting. Any other suitable materials can be used instead or additionally, i.e., materials having properties with comparable properties such as one or more of, but not limited to, Breaking strength, Elongation at break, Compression ratio, Rebound rate and Hermeticity. In each of the above examples, the first and second sides of the rigid base element define therebetween a thickness of the rigid base element along its central axis.

In each of the above examples, the loop-shaped vacuum seal element is so mounted to second side of the rigid base element that as can be seen in FIGS. 3A, 3B and 3C, they can be considered as having the following features: the protruding portion of the vacuum seal element is disposed within a lateral boundary defined by the peripheral rim of the second side of the rigid base element; the protruding portion is disposed closer to the chamber than the peripheral rim of the second side of the rigid element to the central area; and the contact surface of the protruding portion and the attachment surface of the attachment surface are substantially co-extensive in the radial direction.

Each of the above examples can additionally include any of the features from others of these examples, and can additionally or alternatively include any of the features described below in relation to a further example of the presently disclosed subject matter. For example, the second and third examples can also include air extractor means as set out in the first example, and the air extractor means can be a pump or impeller, and can operate in a steady or variable manner.

Alternatively or additionally, each of the first and third examples can include a bracing structure as set out in the second example. Further, in any of the examples, the bracing structure can be made of a material which is less rigid than that of the base element, can have a loop shape, can be disposed either closer to the central area of the second side than to the peripheral rim thereof, or closer to the peripheral rim of the second side than to the central area thereof, and/or can comprise at least one of rubber, silicone and closed-cell foam.

Alternatively or additionally, the vacuum seal element of the vacuum gripper of each of the first and second examples can comprise a closed-cell foam material. Alternatively or additionally, it can comprise a silicon and/or rubber material.

Alternatively or additionally, any of the first to third examples be a portable or hand-held vacuum gripper, the air extraction means can further comprise a power source, which can comprise a battery pack, at least one of the power source and the pump or impeller can be disposed on the first side of the base element, the vacuum gripper can comprise a handle for holding the vacuum gripper, and/or at least one of the power source and the pump or impeller can be at least partially housed in the handle. In the vacuum grippers 200, 300 and 400, their vacuum seal elements can be attached to the peripheral area of the second side of their rigid base elements directly or indirectly in any suitable manner.

Figure 4:
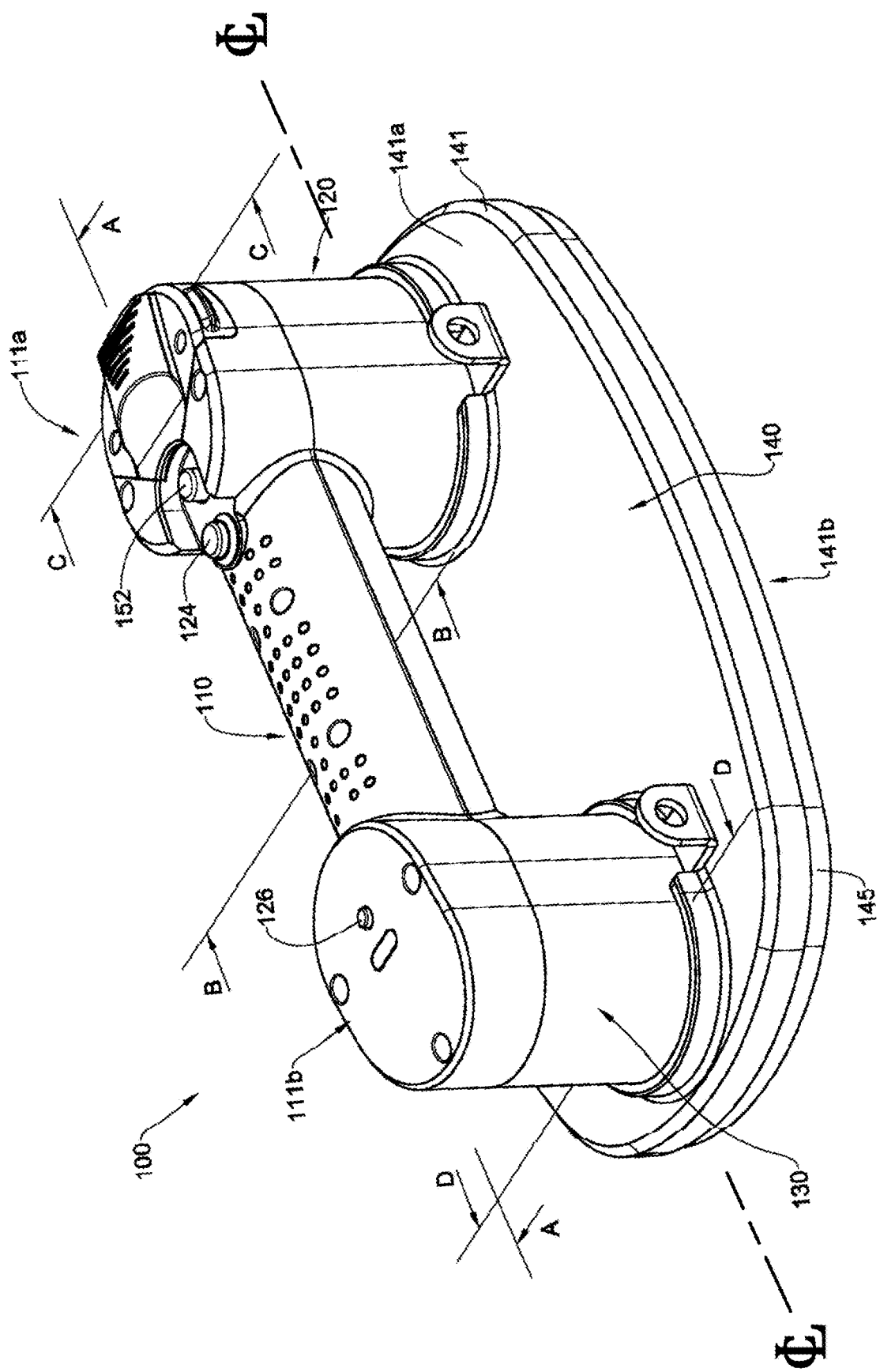
FIG. 4 shows a top perspective view of a vacuum gripper according to a still further example of the presently disclosed subject matter.

FIG. 4 shows a still further example of a vacuum gripper, a vacuum gripper 100. The vacuum gripper 100 comprises a handle portion 110, a power supply portion 120 (see also FIG. 5), a pump portion 130 (see also FIG. 5) and a base portion 140. The handle portion 110 has a first end 111a and a second end 111b, by which the handle portion 110 is connected or mounted to the base portion 140.

The base portion 140 as seen in FIG. 4 comprises a rigid base element 141 having a first side 141a and a second side 141b opposite to the first side, and a vacuum seal element 145 held thereby. The first side of 141a of the base element 141 is the same as a first side 140a of the base portion 140. The handle portion, power supply portion and pump portion are disposed on the first side 141a of the rigid base element 141, and can be mounted thereto either directly or via each other. For example, the power supply portion and the pump portion can be mounted to the first side 141a of the base element 141 via the handle portion 110. Such mounting avoids disconnection of components due to any vibrations caused when a pump of the pump portion is in operation. Handle portion 110 can be a single piece or can comprise multiple pieces. If the handle portion comprises multiple pieces, it can be hollow and so it can be possible to house various components within the handle. Such housings can be joined by screws, bolts, adhesives or snap-fitting arrangements, for example.

The handle can be connected along a single surface or at multiple surfaces to the base portion. The handle can have a wider palm-gripping portion and a narrower finger-gripping portion to allow easy grasping of the handle. Alternatively, the handle can comprise a hole or aperture when connected to the base portion, to allow a hand to grasp around the handle easily. The handle can take an elongate shape for easy grasping. For ease of grasping, the handle can be provided with a textured surface, in the form of protrusions and/or recesses, for improved friction with a user's hand.

Figure 6:
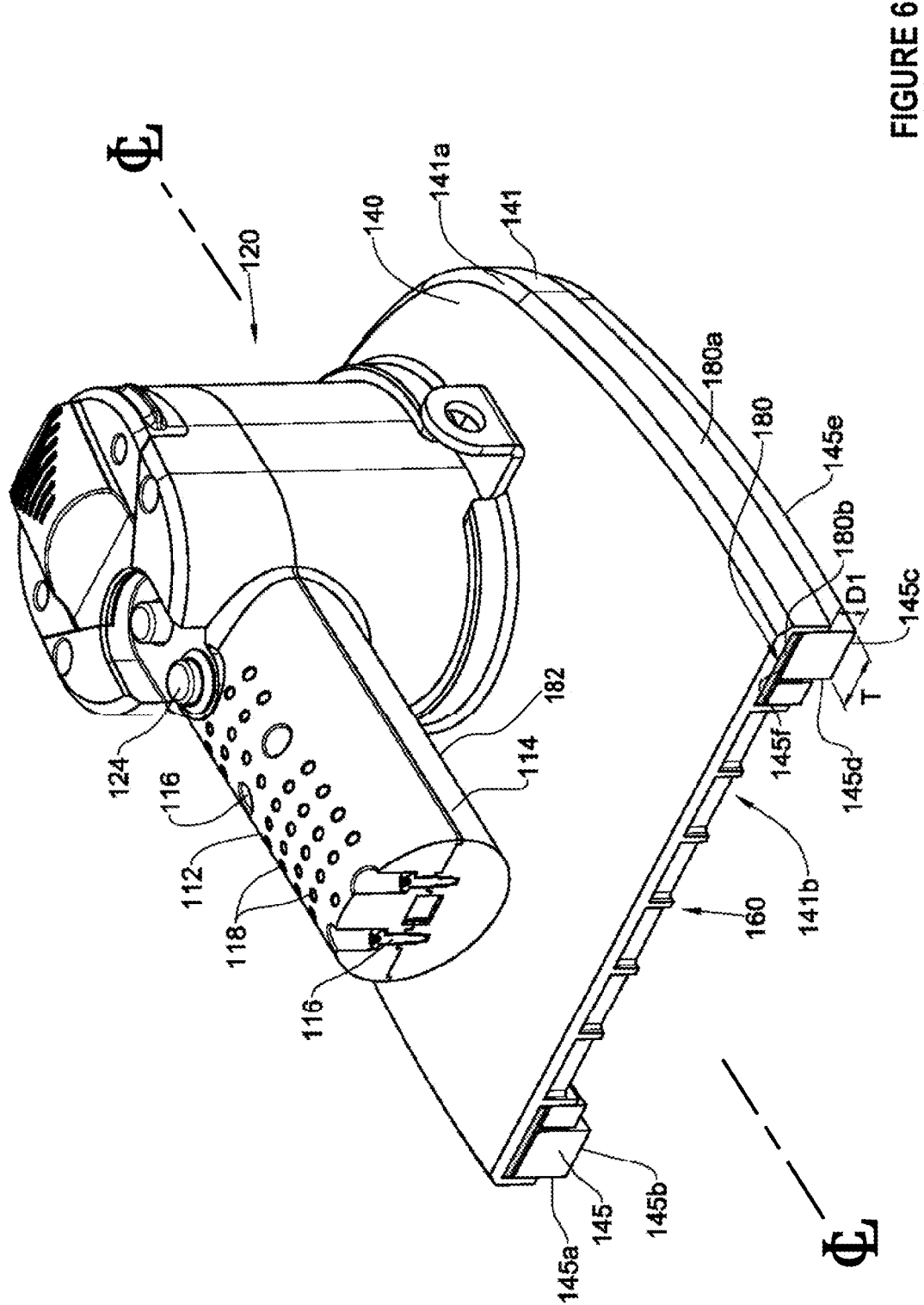
FIG. 6 shows a perspective view of the vacuum gripper shown in FIG. 4, being cut-away along a plane B-B in FIG. 4.

As shown specifically in the vacuum gripper 100, as seen in FIG. 6, the handle portion 110 comprises an upper housing 112 and a lower housing 114, which are joined together by at least one screw or bolt 116. The upper and lower housings 112, 114 are arranged in this example to form an elongate shape, easily capable of being gripped by a user's hand. In order to provide improved grip in the hand of user, the surface of the upper and lower housings 112, 114 are provided with multiple recesses 118 (see FIG. 6) arranged in rows and columns.

The power supply portion and the pump portion can be provided separately from the handle portion or can be provided within the handle portion. For example, arrangements are envisioned, whereby the power supply portion and the pump portion are arranged at the same or opposite ends of the handle portion, or one or both are not at either end but rather in the middle of the handle portion. Alternatively, one or both of the power supply portion and the pump portion can be provided within an end of the handle portion, and extending further into the handle portion away from that end.

Figure 5:
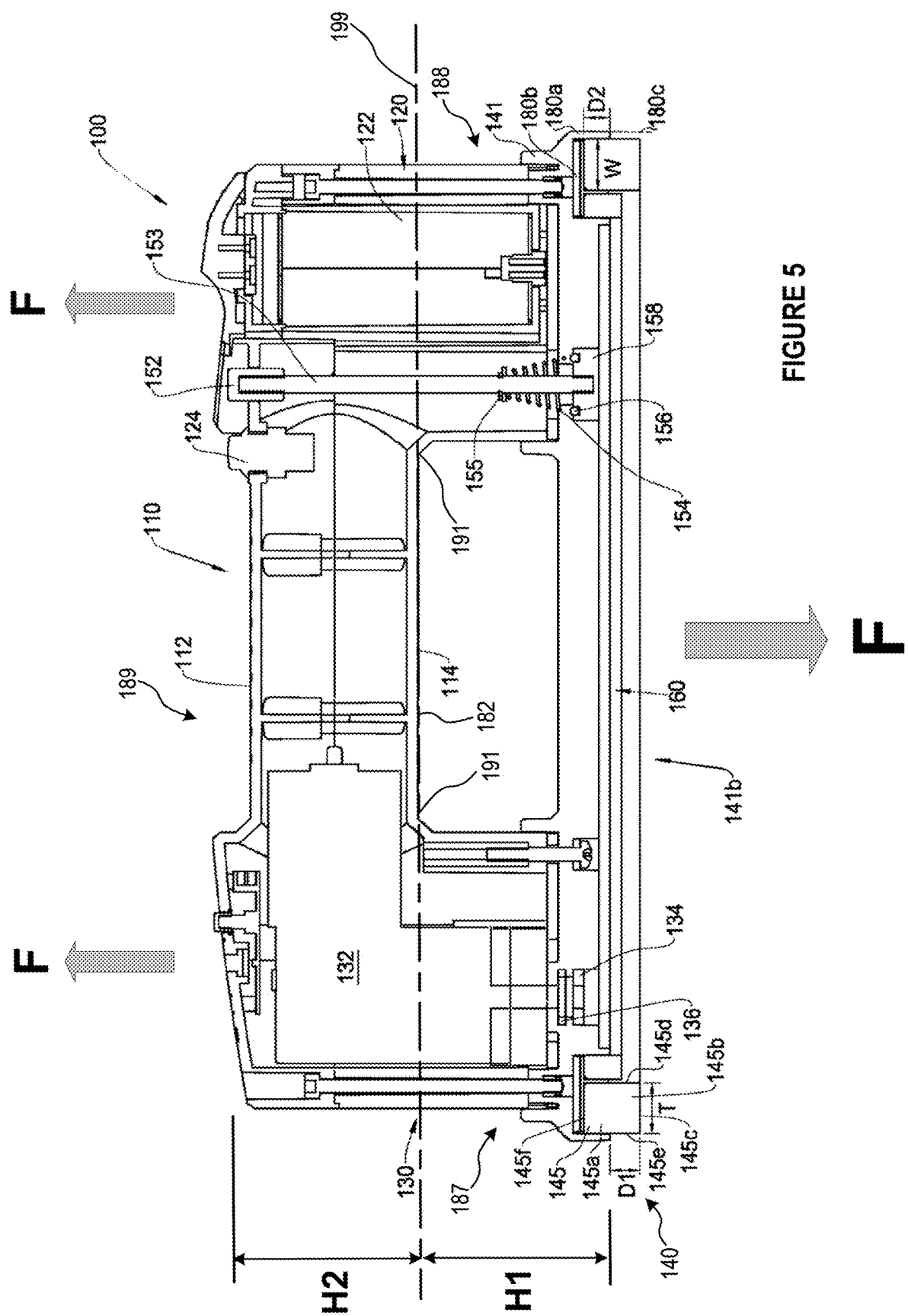
FIG. 5 shows a cross-sectional view of the vacuum gripper shown in FIG. 4, taken along a plane A-A in FIG. 4.

In the vacuum gripper as shown in FIG. 5, the power supply portion 120 is arranged at and within the first end 111a of the handle portion 110 and the pump portion 130 is arranged within the second end 111b of the handle portion 110, which is the opposite end of the handle portion 110 from the first end 111a. The pump portion 130 extends further from the second end 111b into the handle portion 110.

The power supply portion is for supplying power to the pump portion, and can be a battery pack. The power supply portion can be electrically connected to the pump portion through the handle, or outside of the handle, for example, along the first surface of the base portion to which the handle is mounted. In the former case, the electrical connection has greater structural integrity as it can be protected from environmental damage.

Figure 7:
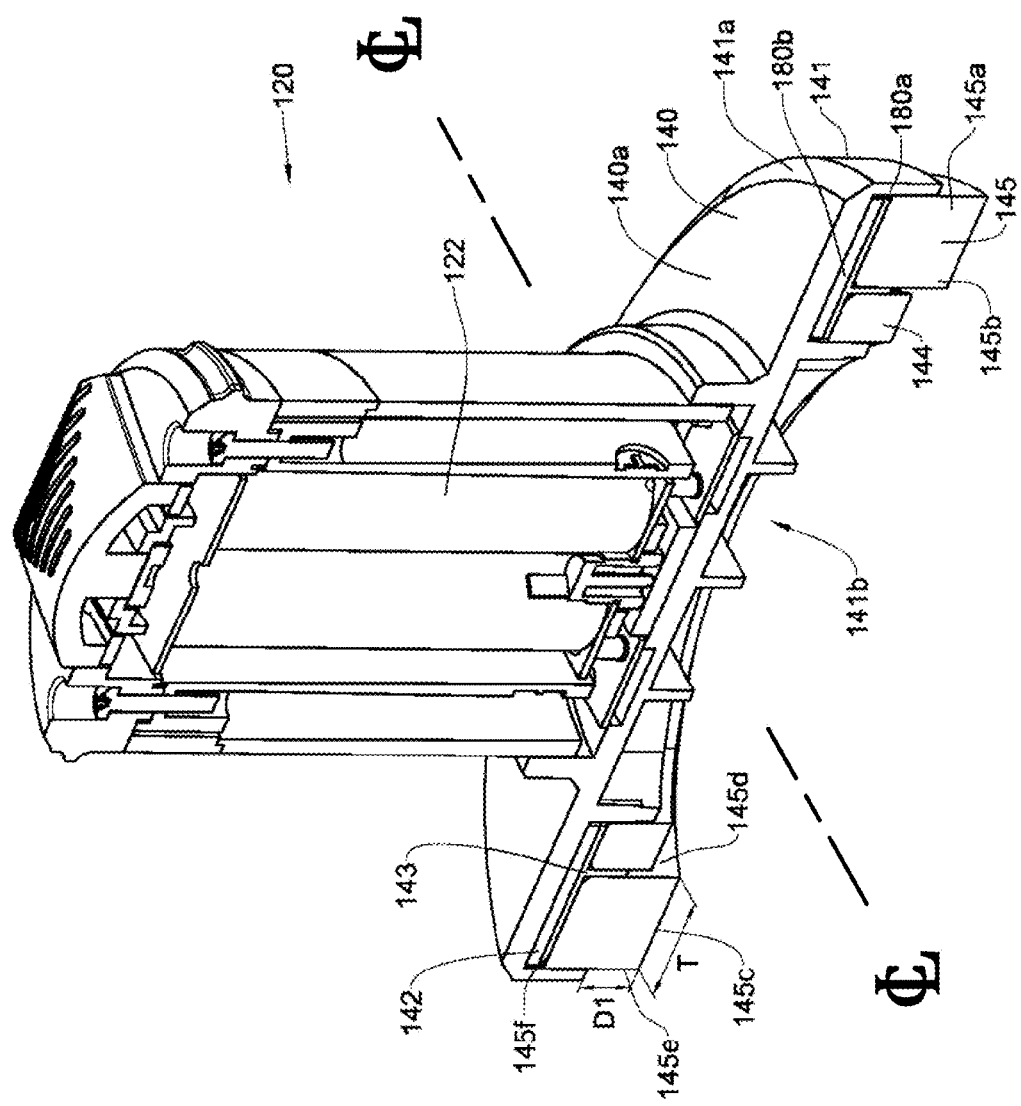
FIG. 7 shows a perspective view of the vacuum gripper shown in FIG. 4, being cut-away along a plane C-C in FIG. 4.

As shown in more detail in FIGS. 5 and 7, the power supply portion 120 comprises a battery or battery pack 122, arranged to supply power to the pump portion 130 of the vacuum gripper 100. The battery pack 122 is electrically connected through the handle portion 110, to the pump portion 130, in order to supply power to the pump portion 130.

Various operating controls can be provided to control the power supplied by the power supply portion to the pump portion. For example various buttons, sliders, control dials for adjusting the power strength, triggers or other devices can be provided. The power operating control can be arranged to remain at the "on" position until a user turns it to "off". This enables the user to retain full functionality of their hands for safely lifting the vacuum gripper. Alternatively, as a safety mechanism, power knob 124 may only be "on" as long as it is depressed by a user, and changes to "of" when released. Such an arrangement ensures safety and power savings when the vacuum gripper is left unattended, and power savings when in use in a situation where no further air extraction is required.

As shown in FIGS. 4, 5 and 6, the battery pack 122 is further electrically connected to a power knob 124 arranged at the first end 111a of the handle portion 110a. The power knob 124 can be actuated by a user to operate, i.e. turn on and off and vary the power supply to, the pump portion 130. In this case, the power knob 124 is a press-release button, i.e. requires being held down and depressed in order to supply power to the pump portion 130. There is also an ON/OFF button 126 (see FIG. 4) at the second end 111b of the handle portion 110, which in the "off" state can allow the battery to be charged, and in the "on" state allows power supply to the pump portion.

Figure 8:
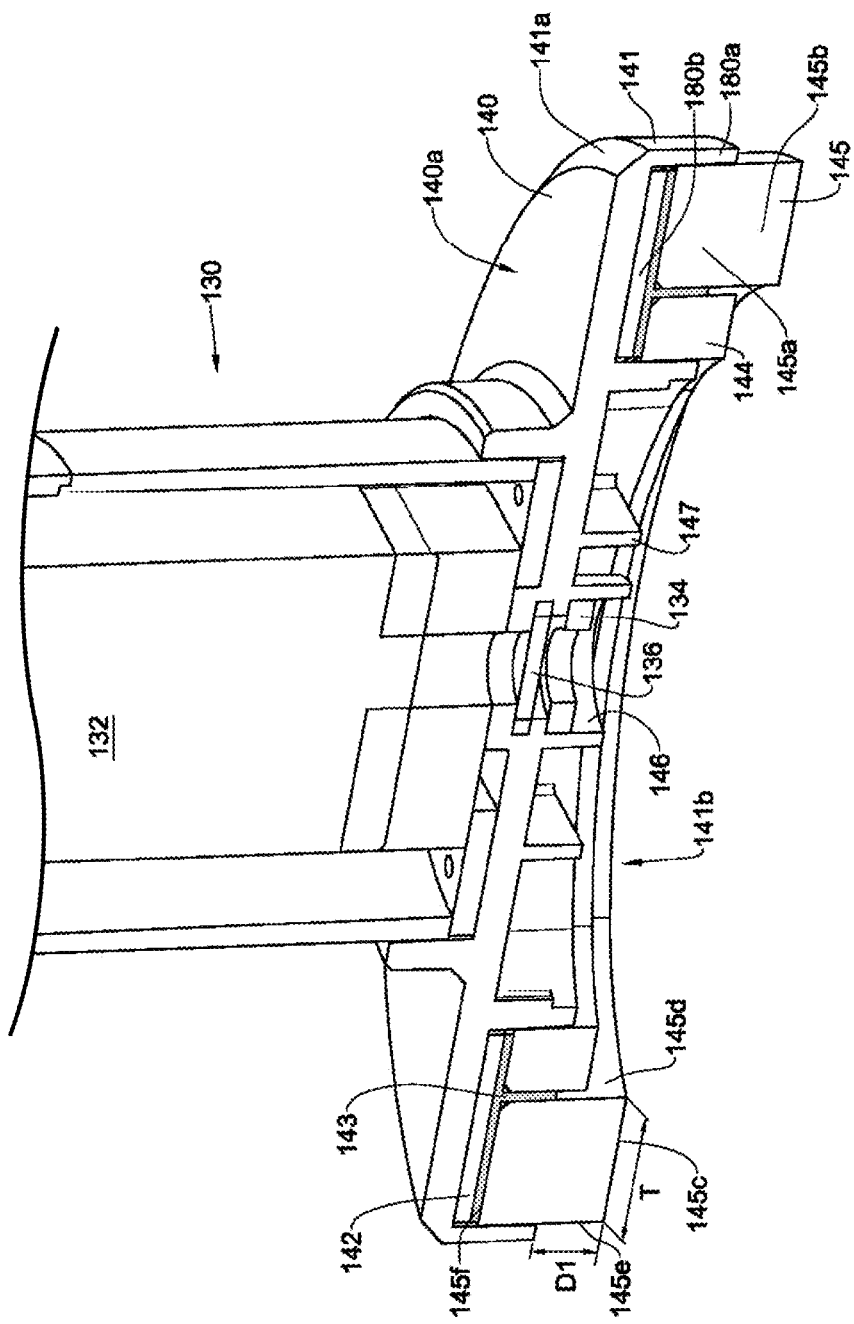
FIG. 8 shows a partial perspective view of the vacuum gripper shown in FIG. 4, being cut-away along a plane D-D in FIG. 4.

The pump portion can comprise a pump, impeller or other air extraction mechanism/device, and as described above can be disposed partly in the handle. The pump is fixedly mounted to the base portion, either directly or via the handle. Such a fixed arrangement provides structural integrity. The pump can comprise a filtering arrangement, such as a filter and filter holder for filtering air passing through the pump to avoid ingress of particulates which could damage the pump, or impair its operation. As shown in FIGS. 5 and 8, the pump portion 130 comprises a pump 132 disposed partly in the second end 111b of the handle portion 110, and partly continuing into the handle portion 110, extending partly through the handle portion 110 in a direction towards the first end 111a. The pump 132 is a vacuum pump, i.e. arranged to extract air as will be described further below.

The end of the pump 132 disposed towards the first end 111a of the handle portion 110 is electrically connected to, and powered by, the battery pack 122 of the power supply portion 120. An opposite end of the pump 132 is disposed in the second end 111b of the handle portion 110, separated from the base portion 140 by means of a filter holder 134 arranged to contain a filter 136. The filter 136 is arranged to prevent ingress of particles to the pump 132 during pump operation as air is drawn into and through the pump 132 via the filter 136.

The filter holder 134 and filter 136 are fluidly connected in a sealed manner to a hole 146 passing through the base element 141 from the first side 141a of the base element 141 to the second side 141b of the base element 141.

As further shown in FIG. 5, the handle portion 110 includes a grip handle 182 having an underside lift surface that receives lift forces from the user's grip and transmits the lift forces to a plurality of lift interfaces 191 integrated with the handle portion. The lift interfaces 191 apply lift forces along a neutral zone 199 in an arrangement that mitigates stresses at the base and contact interface with a lifted object that can be applied as tensile and/or torsional stresses. As shown in FIG. 5, an object being lifted applies a downward reaction force along the contact surface and base portion 140 that is effectively located at the center of the base portion and central area 160. In contrast, the lift interfaces transmit lift forces from the user at opposite ends of the handle portion 110. As such, the base portion in contact with the object is placed in tension, and the opposite extent of the handle portion 110 is placed in compression.

Lifting device 100 includes an integrated stress reduction (ISR) arrangement within the base portion 140 and handle portion 110 that can counteract and mitigate bending and/or torsional stresses at the contact surface interface with an object while lifting. The ISR arrangement includes offsetting a lift interface 184 with a first lift offset 187 and a second lift offset 188 at opposite longitudinal ends of the grip device 100 and grip handle 181. In particular, the lift interface 184 at opposite longitudinal ends of the grip handle 181 are each offset in parallel from an object contact interface at a distal end of the side support wall of the base portion 140 toward the first side 112 by a tension-moment distance, H1. The handle portion 110 continues to extend from the lift interface 184 and from the collocated neutral plane 199a by a counter-compression moment distance, H2, that is equal to the tensile-moment distance H1 and projects on the first side 112 away from the base portion 140.

The handle portion 110 extends between the first and second lift offsets 187, 188 in a longitudinal direction parallel with the base portion 140 to form a stress reduction frame 189 that counteracts compression forces. As such, the stress reduction frame 189 counteracts and minimizes tension forces exerted at base portion 140 by counteracting and structurally resisting corresponding compression forces and moments along the stress reduction frame 189. Further, as can be seen in FIG. 6, grip handle 182 is centered across the width of the vacuum grip device 100 and base portion 140, which balances lateral forces applied to the base portion 140 and the object being lifted across the width of the grip device 100. As such, tensile and/or torsional stresses that can be applied to the base portion 140 and an object being lifted are countered and minimized through the integrated force balancing structure of the vacuum lifting device 100.

As can be seen in FIGS. 5-8, the first and second sides of the rigid base element define therebetween a thickness of the rigid base element along its central axis, and the second side 141b of the base element has a central area 160 and a periphery 180 surrounding the central area 160 and bounded by a peripheral rim 180a radially spaced thereby from the central area. The vacuum seal element 145 is attached at an attachment portion 145a thereof to a peripheral support area 180b constituting a part of the periphery 180 of the second side of the base element 141, and the attachment portion 145a has an attachment surface 145f in contact with peripheral support area.

The vacuum seal element 145 further comprises a protruding portion 145b free of contact with the base element and protruding therefrom in a direction away from the first side 141a to a predetermined distance D1. The protruding portion is co-extensive with the attachment portion 145a along the peripheral support areal 80b. The surface of the protruding portion 145b of the vacuum seal element 145 which is distal from the second side 141b is a contact surface 145c for contacting an object surface.

The vacuum seal element 145 further comprises an inner encircling surface 145d oriented transversely to and extending from the contact surface 145c and partially facing towards the central area 160 so as to define therewith a chamber 170 along the protruding portion 423. The vacuum seal element 145 also comprises an outer encircling surface 145e oriented transversely to and extending from the contact surface 145c and facing away from the central area 160 and the chamber 170, the peripheral rim 18a of the second side of the base element protruding outwardly from the outer encircling surface. Thus, the contact surface 145c and the attachment surface 145f of the vacuum seal element both extend between the inner and outer encircling surfaces 145d and 145e, and the contact surface 145c is co-extensive with the attachment surface 145f along the peripheral support area 180b of the second side of the base element.

As seen, the predetermined distance D1, to which the protruding portion 145 a protrudes from the second side of the rigid base element, does not exceed a thickness T of the protruding portion between the inner and outer encircling surfaces. More particularly, the thickness T of the protruding portion is greater than the predetermined distance D1. The vacuum seal element is disposed closer to a peripheral rim 180a of the second side 141b than the central area 160 of the second side 141b, and has a loop shape. By loop shape, what is meant is that the vacuum seal element sealingly encircles the chamber 170. The loop-shape can be an annulus, i.e. circular, or can comprise any other shaped circuitous structure, i.e. a closed boundary, e.g. an elliptical shape.

In each of the above examples, the loop-shaped vacuum seal element is so mounted to second side of the rigid base element that as can be seen in FIGS. 3A, 3B, and 3C, they can be considered as having the following features: the protruding portion of the vacuum seal element is disposed within a lateral boundary defined by the peripheral rim of the second side of the rigid base element; the protruding portion is disposed closer to the chamber than the peripheral rim of the second side of the rigid element to the central area; and the contact surface of the protruding portion and the attachment surface of the attachment surface are substantially co-extensive in the radial direction.

The vacuum seal element 145 with its attachment portion 145 is mounted to the of the peripheral support area 180b of the second side 141b of the rigid base element can be considered as constituting with this area (and any other elements used for such mounting as described in detail below) a vacuum seal assembly, and as can be seen in FIGS. 5-8, this assembly has each of the following features: the protruding portion of the vacuum seal element is disposed within a lateral boundary of the assembly defined by the peripheral rim of the second side of the rigid base element (this boundary is shown in dotted line and designated as 180c in FIG. 5); and the assembly comprises a channel 180d (FIG. 5) receiving the attachment portion 145b and conforming thereto in shape, i.e. the channel has a width corresponding to the thickness of the attachment portion and a depth of the channel corresponding to a height of the attachment portion along its inner and outer encircling surfaces (these width and depth are designated in FIG. 5 as W and D2 respectively); in this particular example the width exceeds the depth.

The base portion 140 can comprise further structural components e.g. at the second side of the rigid element, such as a seal structure element for giving support to the vacuum seal element 145, a leakage seal element for ensuring a seal between the base element 141 and the seal structure element, and a bracing structure for providing structural integrity to the vacuum seal element 145. In the particular example as shown in the exploded view of FIG. 9, and as visible in the cross sections shown in FIGS. 7 and 8, the base portion 140 has a generally elliptical shape and comprises, apart from the rigid base element 141 and the vacuum seal element 145, also a leakage seal element 142, a seal structure element 143, and a bracing structure 144. The rigid base element 141 provides a supportive structure, and the ends 111a, 111b of the handle portion 110 are attached to the first side 141a of the base element 141 in the manner described above. Additionally, at least some of the components of the power supply portion 120 and the pump portion 130 can be securely fixed to the base element 141, to avoid disconnection of components due to any vibrations caused when the pump 132 is in operation.

The base element can be formed by injection molding or casting, and can comprise a polymer, plastic or a metal. The base element can be provided at its underside with a number of ribs to provide more strength and structure to the base element which will be put under high loads when a vacuum is formed adjacent thereto, as will be described in more detail below. The base element can also comprise a number of holes passing therethrough in order to allow passage of bolts or other fixing members which can provide a secure mounting connection between the base element and the ends of the handle portion, the pump portion and/or the power supply portion. The arrangement of ribs will vary depending on the particular arrangement of components, connections, and the dimensions of each structural member.

Figure 9:
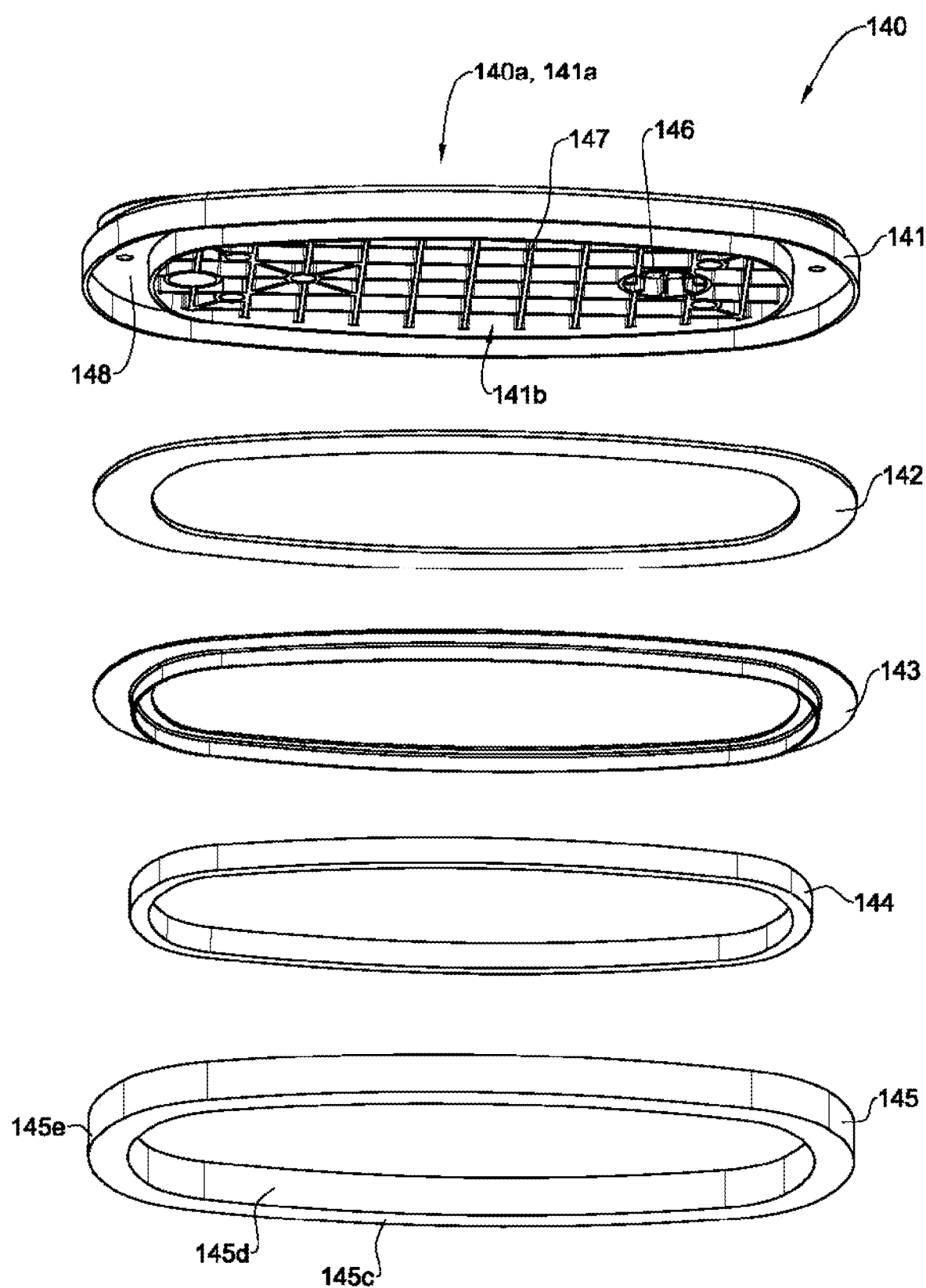
FIG. 9 shows an exploded perspective view of components of a base portion of the vacuum gripper shown in FIG. 4.

As shown in the example, as depicted in FIG. 9, various ribs 147 are shown on the second side 141b of the base element 141 and various holes are shown as passing through the base element from the second side 141b to the first side 141a. Various other structural arrangements can be provided to retain and/or support the various components of the base portion. For example, various clips, channels or tracks can be provided on the second side of the base element to securely hold the vacuum seal element and any or all other components of the base portion in place.

As shown in FIG. 9 in this particular example, the base element 141 comprises an elliptical track 148 at its second side 141b, open in a direction away from the first side 141a, having track sides for supporting the various components of the seal. The leakage seal element 142 is disposed entirely within the track 148, between (and adjacent to) the base element 141 and the seal structure element 143, creating a fluid-impervious seal between the base element 141 and the seal structure element 143.

The seal structure element 143 or removable brace 143 comprises an elliptical looped structure having a T-shaped radial cross-section. The top of the "T-shape" contacts and lies parallel to the leakage seal element 142, while the leg of the "T-shape" extends transverse to the leakage seal element 142. Thus two channels, each having an elliptical loop shape, are formed within the track 148. Each channel is bounded by one of the track sides and one respective side of the leg of the "T-shape". The two channels are open in a direction away from the second side 141b and are concentric, i.e. there is an inner channel and an outer channel. An optional bracing structure 144 is fixed in the inner channel and the vacuum seal element 145 is fixed in the outer channel.

The bracing structure is arranged to prevent over-compression or over deformation of the vacuum seal element. Thus, for example, the bracing structure can be stiffer or more rigid than the vacuum seal element. In other words, the bracing structure comprises a material which is more stiff or rigid, and less easily deformable than the vacuum seal element. Exemplary materials for the bracing structure include, but are not limited to, silicone, rubber, and/or a stiff closed cell foam, while exemplary materials for the vacuum seal element include, but are not limited to, silicone, rubber and/or closed-cell foams. It is to be understood that where similar materials are chosen for each of the bracing structure and the vacuum seal element, a stiffer, more rigid form of the material should be provided for the former and a more deformable, less rigid form of the material should be provided for the latter.

The bracing structure protrudes from the second side of the base element to a lesser extent than the vacuum seal element. The bracing structure can comprise a loop-shape arranged either concentrically within or concentrically outside the vacuum seal element. Alternatively, the bracing structure can comprise one or more extended intermittent supportive elements, such as curved or straight portions extending along the vacuum seal element, or even multiple support pillars spaced along, i.e. extending along, the vacuum seal element, to enable support to be provided at multiple points around and along the loop-shaped vacuum seal element.

In the specific example shown in FIG. 8 for example, the bracing structure 144 and the "T" of the seal structure element or removable brace 143 protrudes by a smaller amount out of the channel than the outer vacuum seal element 145. Therefore, if the contact surface of the vacuum seal element 144 is brought into contact with an object surface, for example a textured panel to be lifted, the vacuum seal element 145 will contact the object surface, and the bracing structure 144 will be spaced apart, i.e. offset, from the object surface. In this manner, the chamber defined by the encircling surface and the second side 141b of the base element 141 becomes enclosed as it is additionally bounded by the object surface.

Upon activation of, i.e. supply of power to, the pump 132 (when the vacuum gripper 100 is switched on by actuating (depressing) the power knob 124 and turning "on" the ON/OFF button 126), air is drawn from chamber via the hole 146 passing through the base element 141, through the filter 136, through the pump 132 and out of the vacuum gripper 100. If the contact surface of the vacuum seal element 144 has been brought into contact with an object surface, the chamber will be enclosed. Consequently, when the pump 132 is activated, the air pressure in the enclosed chamber reduces relative to the ambient air pressure outside of the chamber, so that the vacuum gripper 100 and the object surface are urged closer together.

As this urging force increases with decreasing pressure in the enclosed chamber, the contact surface of the vacuum seal element 145 will begin to deform and compress in such a manner as to bring the vacuum gripper 100 and the object surface closer together, and cause the contact surface of the vacuum seal element 145 to adapt its shape to more closely conform with the texture of the object surface. As the vacuum gripper 100 and the object surface come closer together and are brought into closer conformity with one another, a better seal is created, reducing undesirable ingress of air, via gaps between the vacuum seal element 145 and the object surface, into the enclosed chamber. This creates a more effective vacuum and therefore stronger urging of the vacuum gripper 100 and the object surface towards one another.

Over-compression of the vacuum seal element 145 can be problematic, as it can damage the vacuum seal element 145 by moving from elastic deformation to plastic deformation. Consequently, this could lead to reduced effectiveness of the vacuum seal element 145 and thus less effective grip.

The bracing structure 144 helps to prevent over-compression of the vacuum seal element 145 as follows. As the vacuum gripper 100 and the object surface come closer together, the offset or space between the bracing structure 144 and the object surface, due to the relative protrusion distances of the bracing structure 144 and the contact surface of the vacuum seal element 145 from the second side 141b of the base element 141, is reduced. At a certain compression threshold, at least some of the vacuum seal element 145 or the contact surface thereof will have been compressed to effectively protrude by the same amount as the bracing structure, and so the bracing structure 144 will contact the object surface. Since the bracing structure 144 is less easily deformable than the vacuum seal element 145, the bracing structure will resist and withstand further urging forces caused by the vacuum and thus prevent further significant compression, i.e. over-compression, of the vacuum seal element 145.

An alternative to the above is an arrangement comprising use of only a vacuum seal element, having a material and shape chosen such as to be deformable but to resist over-deformation, allowing the vacuum gripper 100 to conform with the external surface, while avoiding over-compression due to innate material stiffness.

In each case, since the vacuum gripper 100 has a vacuum seal element with a contact surface capable of conforming to an object surface, an effective vacuum can easily be formed and so a smaller, i.e. more energy efficient pump can be used. For example, a pump can have a working voltage of 9-14 V DC, a vacuum degree of 80 kPa, a rated flow of 20 L/min, a rated power of 16 W, and a rated voltage of 12 V DC. Since the pump is smaller and consumes less energy, a smaller power supply is required. Thus both the pump portion 130 and the power supply portion 120 can be small and light, increasing the portability and ease of use of the vacuum gripper, particularly when using the vacuum gripper to support and lift objects which are themselves heavy.

Furthermore, energy efficiency can also be improved by operating the pump in a variable manner, for example by reducing the power supplied to the pump to a level sufficient to maintain the vacuum grip on an object, without unnecessarily reducing the pressure in the chamber to a stronger vacuum. In this way, power savings can be achieved, as the vacuum gripper is more adaptable to different gripping situations.

The vacuum gripper can be used on a variety of surfaces, including smooth and textured surfaces. This is because the deformability of the contact surface of the vacuum seal element 145 of the vacuum gripper 100 allows conformity of the vacuum gripper 100 with the surface of an object to be carried, thereby ensuring a sufficient vacuum can be achieved, even when the external surface can be textured, i.e. it is not a smooth surface. By vacuum, what is meant is that an ultimate pressure in the enclosed chamber is substantially below atmospheric pressure. For example, having a pressure in the range of 50-80 kPa.

The vacuum gripper 100 can be used to pick up, support, hold, place and release items such as boxes, pieces of furniture, panels and other heavy, bulky, fragile or difficult to grip items. When the user desires to release the item from the grip of the vacuum gripper, a simple release mechanism can be provided which causes a gap in one of the surfaces of the enclosed chamber, allowing ingress of air, causing loss of vacuum, loss of grip and separation of the vacuum gripper 100 and the external surface of the item.

Figure 10:
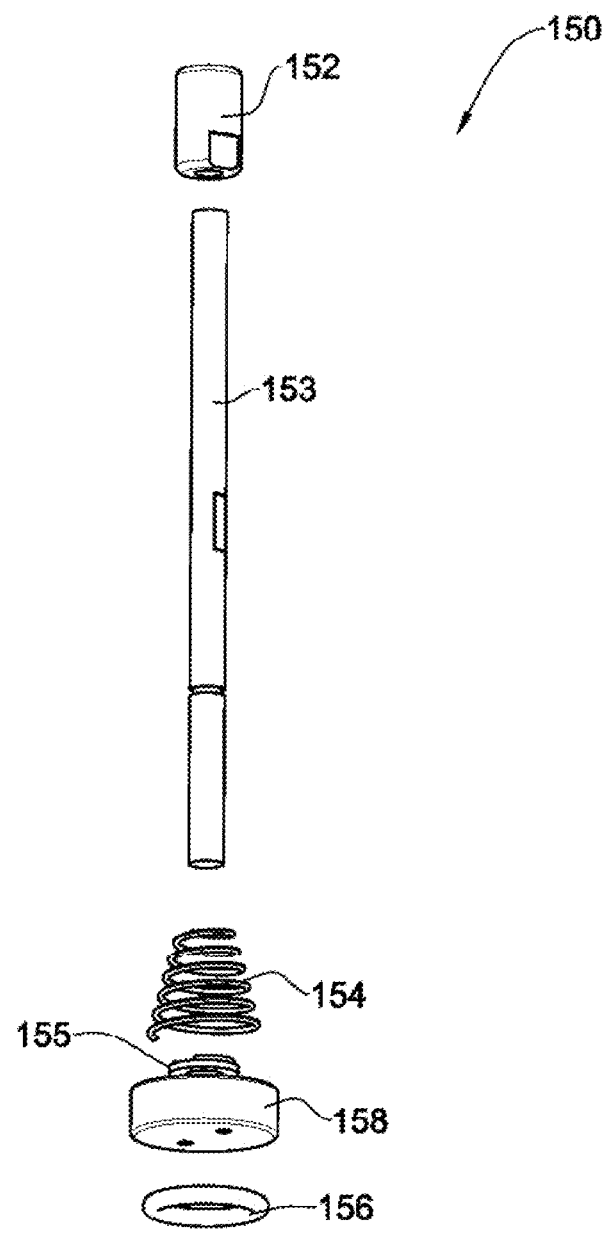
FIG. 10 shows an exploded perspective view of components of a vacuum release mechanism.

In the example shown in FIG. 4 and more specifically in FIGS. 5 and 10, the mechanical release is provided in the form of release mechanism 150, having release button 152 provided at the first end 111a of the handle portion 110. Release button 152 is connected via a shaft 153 to a blocking component 158 located at the second side 141b of the base element 141 via a hole in the base element 141. A surface of the blocking component 158 which faces the second side 141b of the base element 141 comprises an annular channel into which an O-ring or other sealing component is placed. The O-ring or sealing component has a larger diameter than, and surrounds, the outer circumference of the hole in the base element 141 through which the shall 153 passes. A compression spring 154 urges at one end against a circlip 155 on the shaft 153 and at the other against the upper surface of the main base element 141, i.e. against the upper surface 140a of the base portion 140. This causes the blocking component 158 to be biased and pulled upwards and compress the O-ring or sealing component between the blocking element 158 and the second side 141b of the base element 141. This creates an effective airtight seal against air leakage into the enclosed chamber when a vacuum is in place.

In the event that the user wishes to release the gripped item, the user can first release the press-release power knob 124 and/or turning "off" the ON/OFF button 126 to turn off the supply of power to the pump portion 130. This will enable easier release once an attempt to separate the item from the vacuum gripper 100 is made. The user can then depress the release button 152. This urges the shaft 153 downwards against the biasing force of the spring 153 and pushes the blocking element 158 and the O-ring or sealing component away from the underside of the main base element 141, to allow ingress of air into the enclosed chamber. The pressure in the enclosed chamber increases to atmospheric pressure and the vacuum gripper 100 can simply be lifted away and removed from the external surface of the item.

Since both the power button 126 and the release button 152 are conveniently placed next to each other at the first end 111a of the handle portion 110, a user can simply and easily use a single digit, e.g. a thumb or forefinger, to press each button in succession to release the vacuum gripper 100 from the external surface of the item.

Although the above-described examples are in relation to a hand-held vacuum gripper, it is also envisaged that a vacuum gripper can be connected to the end of a robotic arm. In such embodiments, the vacuum gripper may not have a handle portion as described above, and the pump portion can be arranged on the first side of the base element, either directly mounted thereon or mounted at a distance, for example within the robotic arm. The power supply portion may be in the form of stored power, i.e. may be a battery, and/or may be a mains connection via wires or other conductive components passing along and/or through the robot arm.

In such robotic arms, there may not be an on-off knob on the vacuum gripper, but rather, power supply to the vacuum gripper can be remotely controlled by a human or computer operator. The strength of the vacuum provided by the vacuum gripper can be sufficient to enable lifting of an object to which the vacuum gripper is attached.

Figure 11A:
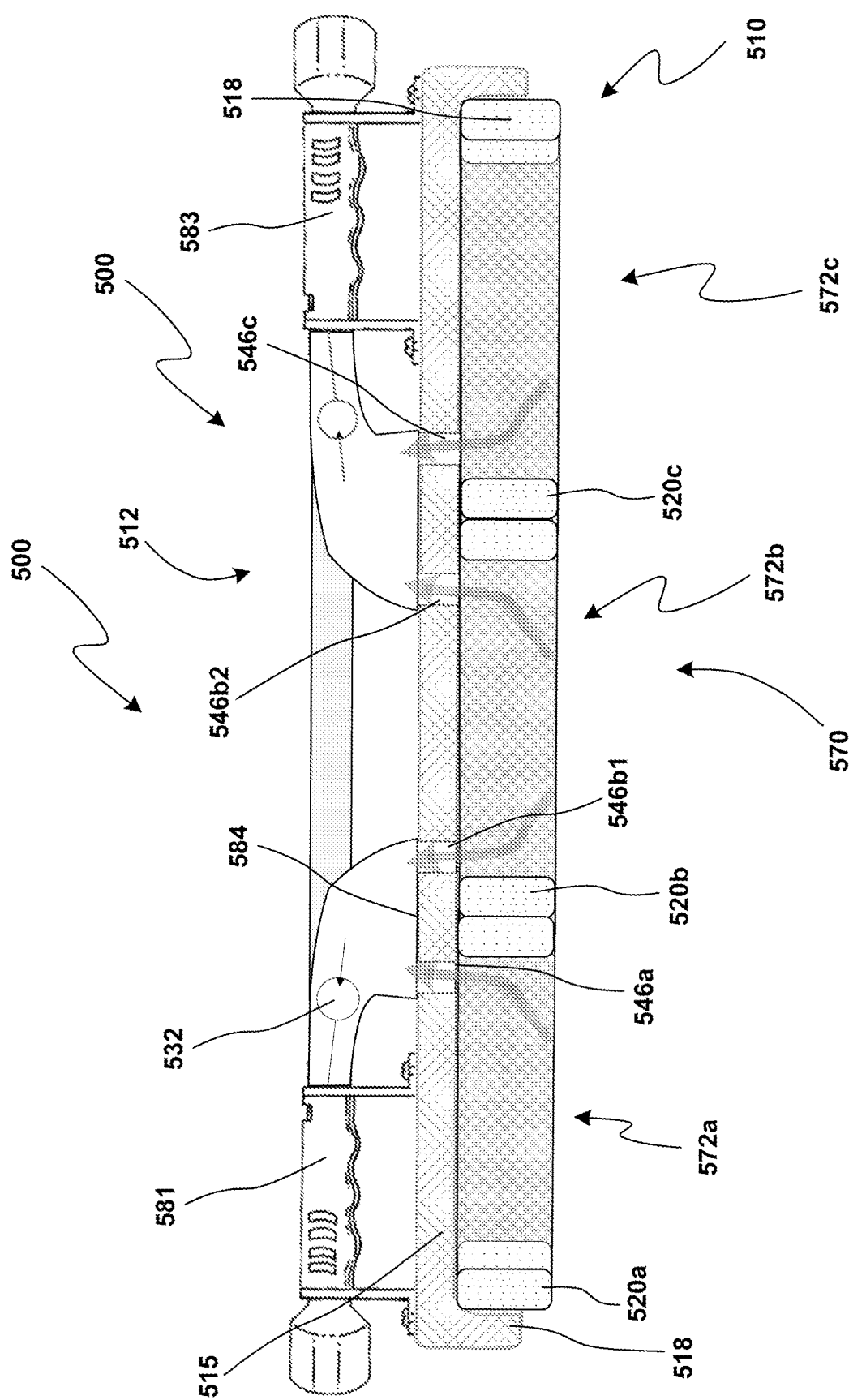
FIGS. 11A and 11C are cross-sectional views of a schematic example arrangement of an extended length portable vacuum grip device according to the presently disclosed subject matter.
Figure 11B:
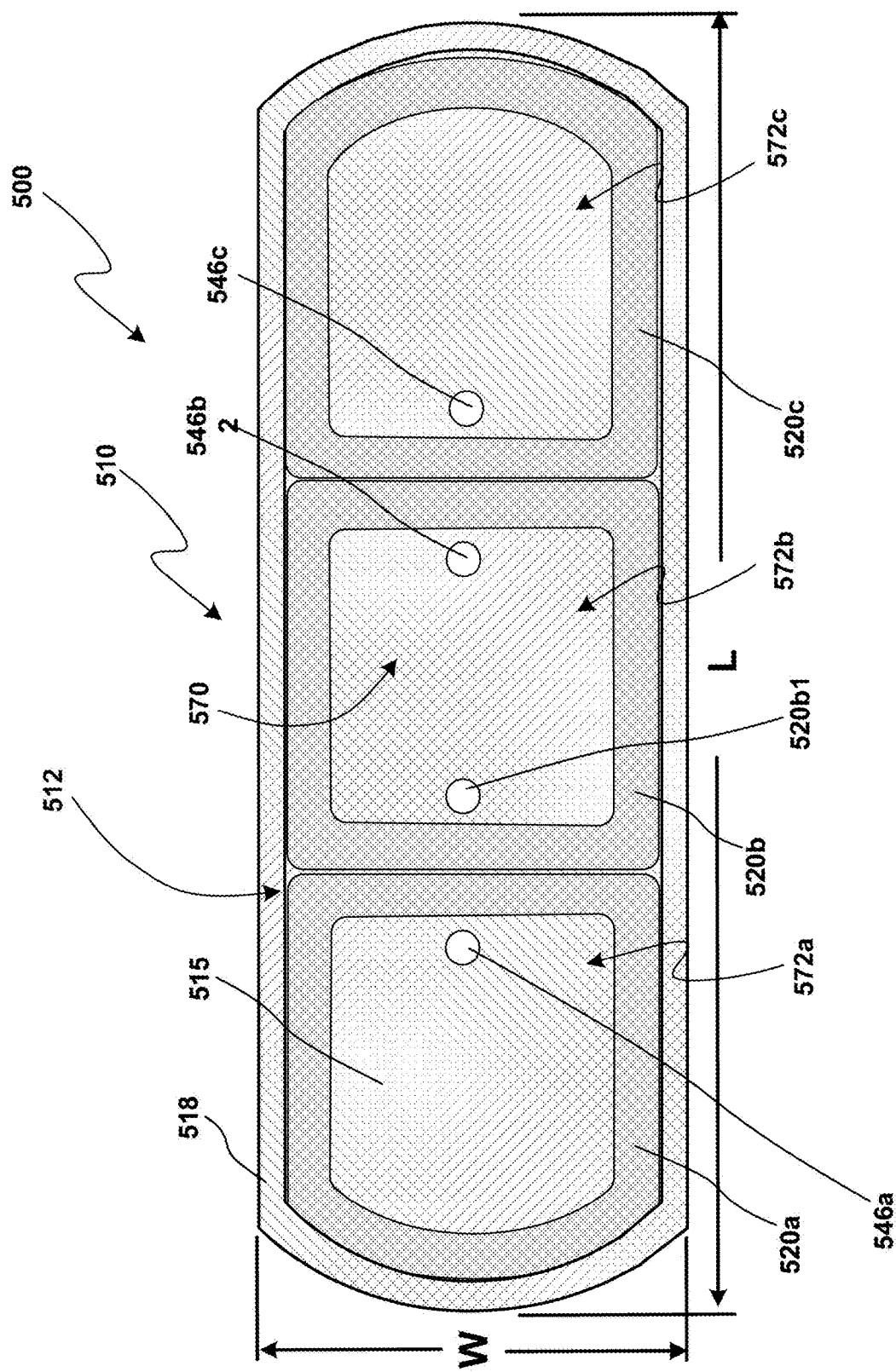
FIG. 11B is a plan view of the extended length portable vacuum grip device of FIGS. 11A & 11C shown from the perspective of a contact surface (not shown).
Figure 11C:
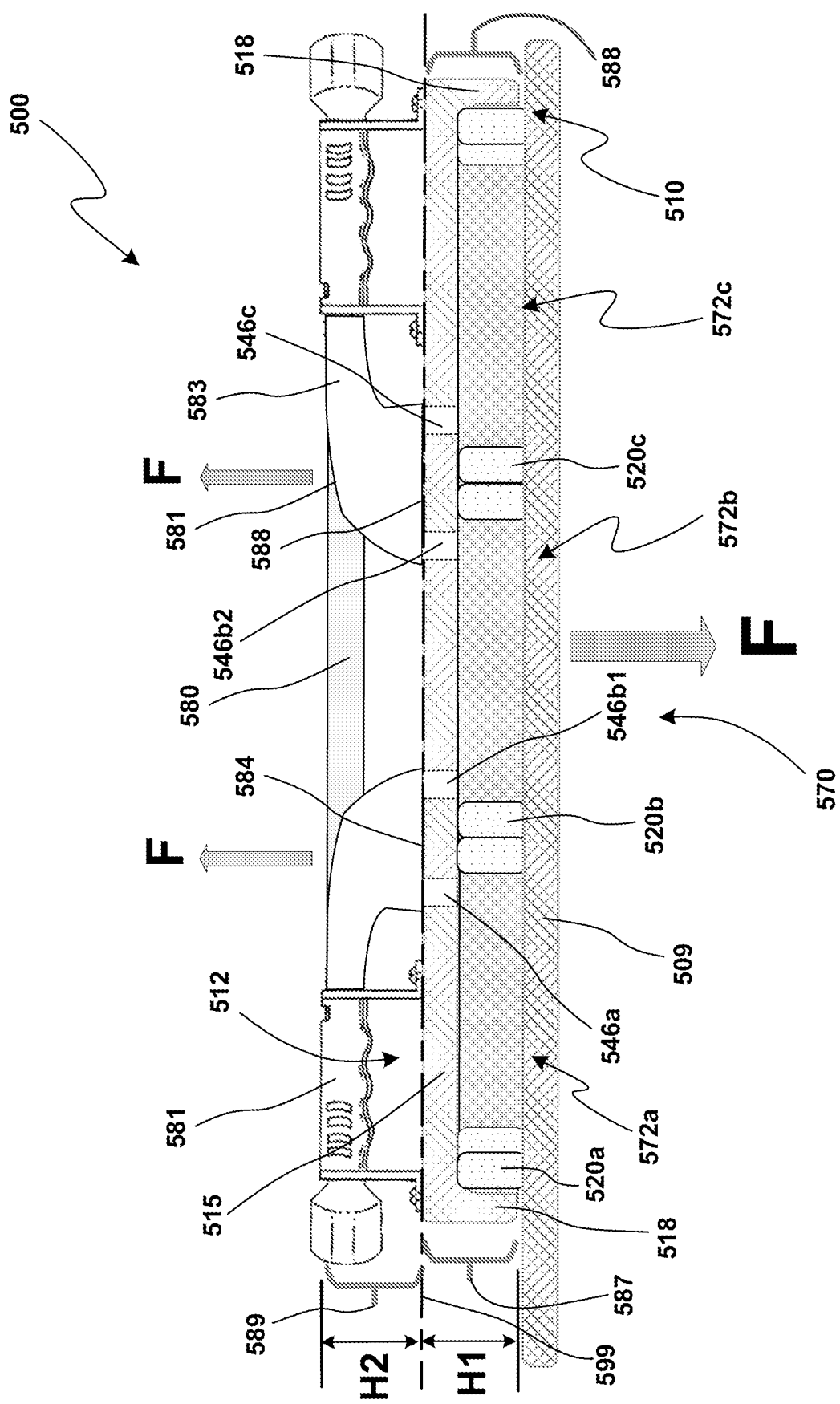

Integrated Lifting Profile (ILP)—Portable Extended Gripper Defining Elongate Open Chamber Having Multiple, Independently-Operable Grip Sub-Regions Referring now to FIGS. 11A to 11C, a schematic example of a portable extended length frame vacuum grip device 500 is generally shown according to the presently disclosed subject matter, which generally includes aspects and features of vacuum grip devices described above except as noted hereafter. The grip device 500 includes an extended length rigid support frame 510 having a rigid, high strength framework disposed at a contact interface with an object to be lifted and a plurality of independently operable vacuum grip regions 572 integrated therein along the extended length, which overall provides an extended length integrated lifting profile (ILP). The frame 510 has a length greater than its width as shown in FIG. 11B including having a length greater than the length or site of conventional, single grip vacuum devices. Further, the frame 510 can be formed as a unitary rigid structural support for the extended length of the grip device disposed at the contact interface with the object to be lifted, which avoids inducing stresses in the object to be lifted compared with conventional devices that connect multiple smaller, discrete grip devices via a structural support offset from the contact interface.

In addition, the grip device 500 sub-divides an overall vacuum chamber into a plurality of independently operable vacuum grip regions 572, which can provide enhanced overall gripping along with spanning any gaps or open regions of the object to be lifted compared with conventional industrial single chamber grip devices. As such, grip device 500 provides in a single grip device a high grip strength, object-adaptable, extended length vacuum gripper that integrates structural support directly at and with the contact interface with the object to provide an overall integrated lifting profile integrating extended structural support with high strength, adaptable, vacuum grip contact.

Frame 510 can be formed as a unitary impermeable rigid structure for providing robust support at or proximate the contact interface, and generally includes an extended frame base 515 having a support side 512 and an opposite vacuum grip side 514 and a support wall 518 projecting in the direction of the vacuum grip side away from the support side and extending around a perimeter of the frame base. In some implementations, the frame 510 can be formed from a rigid, robust injection molded plastic material, such as from a glass-filled polymer or high strength composite material, as well as from metal including iron, steel or aluminum. An inner side of the frame base 515 and an inner side of the support wall 518 define an open chamber at the vacuum grip side 514. A plurality of ports 546 are formed through the frame base for evacuating air and creating vacuum-based gripping forces with an object to be lifted.

The grip device 500 further includes a housing 530 on the support side 512 of the frame 510, a plurality of pumps 532 disposed therein for providing independent operability of the vacuum grip regions discussed below, and corresponding air channels for connecting the pumps with corresponding ports 546 and evacuating air. The housing 530 further includes a first handle 581 at a first end of the extended grip device 500 and a second handle 583 at an opposite second end of the extended grip device.

As best seen in FIG. 11B, the grip device 500 includes a plurality of gaskets 520 that each act as a seal device for an independent vacuum grip region 572. Each gasket 520 forms a closed loop and is configured to fit within a portion of the overall open chamber 570 defined by the frame, in which a gasket outer wall 525 abuts an inner side of the support wall 518 on outboard portions of the gasket, and an inboard portion or portions of the gasket abut an adjacent gasket. A base surface 521 of each gasket 520 is attached to the vacuum grip side of the frame base 515 and protrudes therefrom in the direction of the vacuum grip side 514 away from the support side 512 to a contact surface 522. The gasket 520 protrudes from the frame base 515 a greater distance D1 than the support wall 518, such that the protruding portion of the gasket can be compressed tightly against the surface of an object to be lifted and form a seal therewith. As depicted in FIG. 11A, the height D1 of the protruding portion of gasket 520 can be about the same or less than the distance that support wall 518 protrudes from the frame base 515, which can allow the gasket 520 to compress tightly against the support wall 518 for providing firm structural support at the contact interface with the object to be lifted.

As best seen in FIG. 11B, the plurality of gaskets 520 subdivide the open chamber 570 outlined by the frame 510 into a plurality of vacuum grip regions 570, each of which is connected with at least one port 546. As further shown in FIG. 11B for the center vacuum grip region, a plurality of ports 546 can be connected with one or more of the vacuum grip regions. The arrangement of pumps 532, ports 546 and gaskets 520 can be arranged for independent operation, such that an object could be lifted by the grip device 500 despite the loss of vacuum for individual vacuum grip region or the inability of individual grip regions to form a seal, like for an opening or discontinuity in the surface of the object to be lifted. In addition, an arrangement of individually operable vacuum grip regions 572 can provide greater overall gripping and lifting forces via separate pumps 532 each corresponding with an individual vacuum grip region or set of vacuum grip regions.

As best seen in FIG. 11C, in addition to having an integrated lifting profile (ILG) that reduces stress in lifted objects based on the arrangement of a rigid, structural frame 510 at the contact interface, the example ILG vacuum grip device 500 can further include an integrated force balancing structure that can further minimize stress in the surface of objects being lifted. Such a force balancing structure can be integrated primarily in the elongate base 510, or integrated into a combination of an elongate base and house 530 as in the present example. A rigid, high strength extended base disposed at the contact interface with an object can significantly reinforce the flat surface of a sheet material when lifting the same and avoid inducing stresses based on the rigid framework at the surface lacking induced stresses as in conventional offset framework lifts. However, when lifting heavy extended flat surface materials, potential flexural stresses can be induced in an extended base of a lift device even if disposed proximate the lift interface. The integrated force balancing structure of example extended length vacuum grip device 500 can counteract such flexural stresses and thereby further enhance the low-stress lift capability of lift device 500 and related devices described herein.

The integrated stress balancing (ISB) structure includes an arrangement for applying lift forces, such as from a handle and/or connector like an eyebolt, to a neutral lift interface on the support side of the grip device at low moment distances, and to offset related tensile stresses applied at the extended base 510 via a counterbalancing compression reaction force and moment on the support side. The ISB structure includes a counter-compression structure that extends further away from the contact interface than a neutral interface for providing reinforcement that can extend between handles or other lift connections and counteract flexural stresses transmitted during lifts, which can be integrated with the housing 130 and attached pair of handles. As shown, vacuum grip device 500 includes a pair of handles attached at opposite longitudinal ends of the grip device, which includes first handle 581 at a first end and second handle 583 at an opposite second end attached to the support side 512 of the grip device. Spaced apart pairs of lift connections can used included with extended length lift devices for spreading lift loads and provide enhanced control and maneuverability during lifts.

Forces applied to the extended base, contact interface, and surface of an attached object during lifts using such an ISR arrangement can be counteracted and reduced for reinforcement and reduction of potential stresses. In particular, downward forces applied to the extended base 510 when lifting an object can function as a downward force centered along the extended base 510 as denoted in FIG. 11C, which can create tension along the base. Further, opposing lift forces applied at the first and second handles 581, 583 disposed at opposite longitudinal ends of the device 500 and housing 530 create compression stresses across the housing 530.

Referring to FIG. 11C, the ISR structure for the present example includes a first lift offset 587 integrated with extended base 510 at a first end of the extended base 510, which projects a tensile-moment distance H1 from a distal end of the support wall 518 (i.e., contact surface-object interface) toward the support side 512 to a first lift interface 584 attached to the first handle 581. The first lift interface 584 receives lift forces applied from the first handle 581 along a neutral stress plane 599. The IFB structure further includes a parallel second lift offset 588 that is also integrated with the extended base 510 at an opposite second end of the extended base 510 and likewise projects the tensile-moment distance H1 in parallel with the first lift offset first lift offset from a distal end of the support wall 518 toward the support side 512 to a second lift interface 591 attached to a second handle 583. The second lift interface 591 receives lift forces applied from the second handle 583 along the neutral stress plane 59. The stress reduction frame 589 projects in the same direction away from the vacuum grip side from each of the first lift interface 584 and the second lift interface 588 for a counter-compression distance, H2, that is equal to the tensile-moment distance H1.

As such, the stress reduction frame 589 projects from the object-contact surface interface as measured from the distal end of the support wall 518 for an overall offset distance of H1 plus H2, in which the neutral plane 599 is located midway. The stress reduction frame 589 includes a longitudinal strut extending between the first and second lift interfaces 584, 588 for counteracting and resisting tensile forces exerted on the extended frame in a longitudinal direction during lifts with counter-compression reinforcement through the strut 580, in which the strut is offset from the lift interfaces in opposite direction from the contact interface by the same distance as the contact interface. Thus, tensile forces applied to the extended frame 510 during lifting are counteracted by compression reaction forces along the strut for further minimizing effective stresses applied to an object during lifts.

Discrete Brace Reinforcement—Portable Extended ILP Vacuum Gripper

Figure 11D:
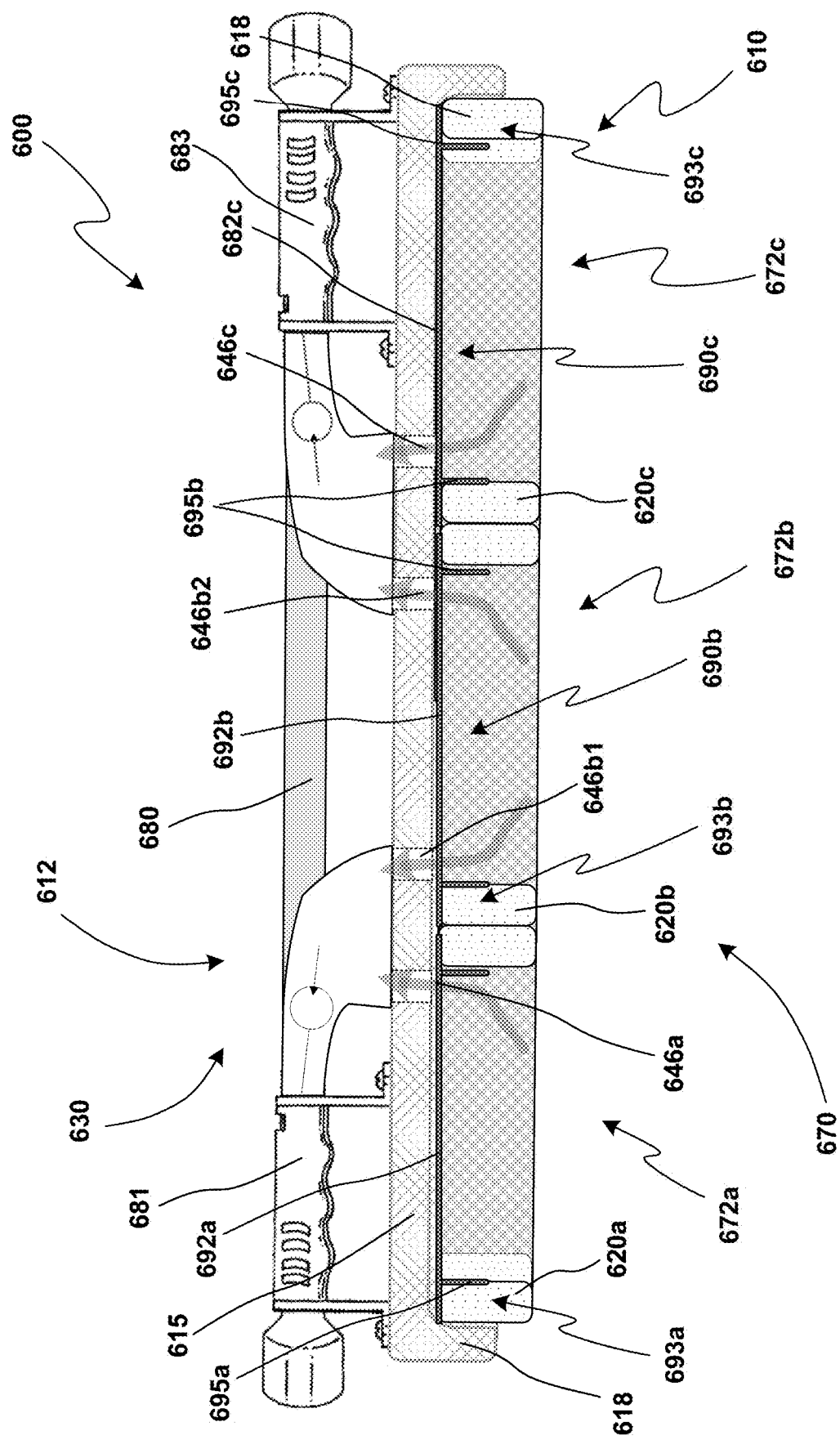
FIG. 11D is a cross-sectional view of another schematic example arrangement of an extended length portable vacuum grip device according to the presently disclosed subject matter.
Figure 11E:
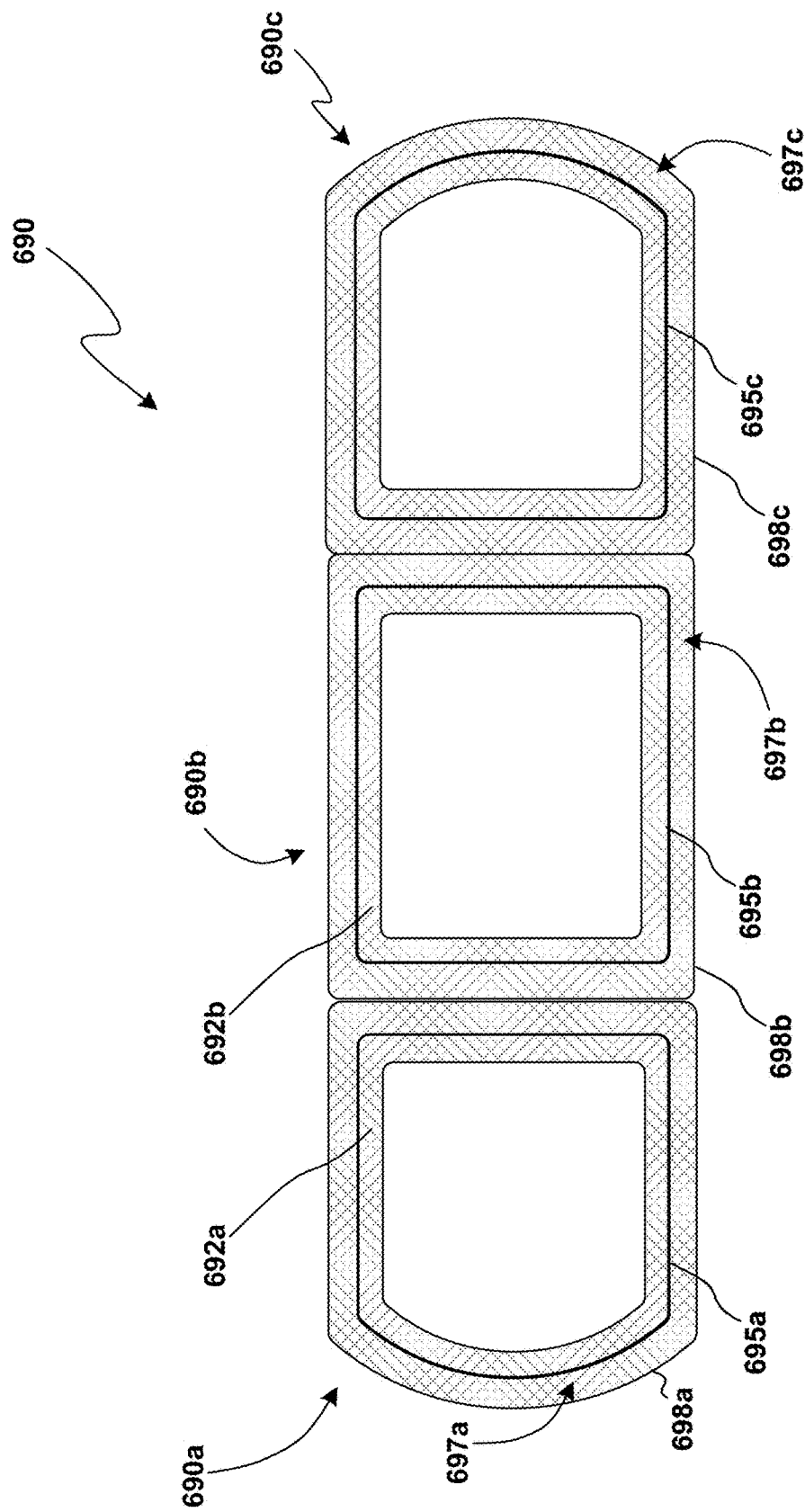
FIG. 11E is a contact surface plan view of the extended length portable grip device of FIG. 11D.
Figure 11F:
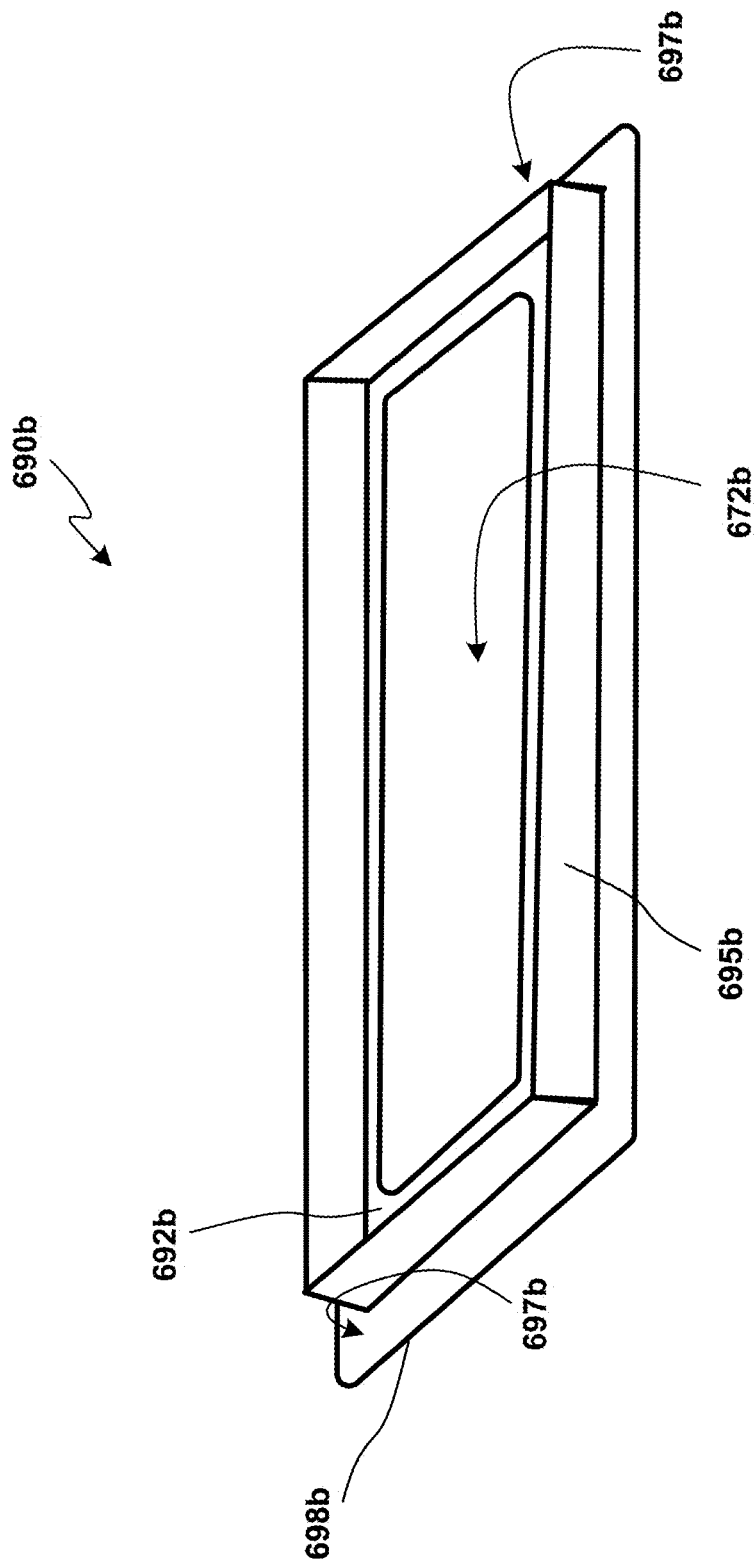
FIG. 11F is a perspective view of the center brace for the grip device of FIG. 11D.

Referring now to FIGS. 11D to 11F, another schematic example of a portable extended length frame vacuum grip device 600 is generally shown according to the presently disclosed subject matter, which generally includes the aspects and features of vacuum grip device 500 described above except as noted hereafter. As such, like numbers refer to like features. Grip device 600 differs from grip device 500 in that the grip device shown in FIG. 11D includes a plurality of optional, discrete brace units 690 located within the open chamber 670, for which each brace 690 corresponds with a single gasket 620 and vacuum grip region 670. Further, grip device 600 also includes varying arrangements and relationships for the number of pumps associated with a vacuum grip region 670 and the number and arrangement of evacuation ports.

FIG. 11E shows the arrangement of discrete brace units 690 included with grip device 600. The example grip device subdivides the overall open chamber 670 of the extended base 610 into three vacuum grip regions 670a, 670b and 670c. Three corresponding brace units 690a, 690b and 690c fit within the open chamber 670 for each of the vacuum grip regions 670a, 670b and 670c. Each brace unit includes a corresponding brace base 692a, 692b and 692c that can be generally flat and include a large central opening corresponding with an interior of the corresponding gasket 620 and the corresponding vacuum grip region or optionally one or more openings formed through the brace base corresponding with port(s) 646 for the corresponding vacuum grip region 670. Each brace base mates with the corresponding inner side of the frame base 615 as shown in FIG. 11E in a serial arrangement adjacent to each other and extending along the length of the open chamber defined within the extended base 610. An outer edge of each brace base 692a, 692b and 692c can be placed against a corresponding portion(s) of the inner side of the support wall 618 and corresponding outer edge(s) of an adjacent brace base(s) for firmly fixing the position of each within the open chamber.

Each brace base 692a,b,c can be fixedly attached to the frame base 615, such as via an adhesive, clamped arrangement, and bolts, screws or other fasteners, and/or can be removably attached, via such as via a reversible fasteners, snap fit, and an interference fit with inner portions of the support wall 618 or other features. The use of a removal attachment for braces 690a,b,c can allow for the optional use of the braces, and can also allow for selectively switching different types of braces. Braces 692a,b,c can cooperate with gaskets 620a,b,c for enhancing an airtight seal with the surface of the object 609 being lifted and modifying grippability therewith. Further, the use of various types of braces and/or use of the device with or without braces can provide a wide range of options for customizing performance of the vacuum device and grippability for lifting diverse types of object and objects with different surface textures and types.

Each brace 690a,b,c includes a brace wall 695a,b,c that protrudes away from the brace base 692a,b,c in the shape of a closed loop. The brace base 692a,b,c can protrude the same distance, D1, as the brace wall 618 for cooperating with the support wall for enhancing overall firm structural support provided by the extended base 610 and the support wall 618 disposed at the contact interface. Optionally, the brace wall 695a,b,c can protrude a slightly greater distance than the support wall 618, such that the brace wall 695a,b,c can be configured for interfering contact with a surface of the object 609 being lifted. Alternatively, the brace wall 695a,b,c can protrude a smaller distance than the support wall 618.

The brace wall 695a,b,c can be located on the brace base 692a,b,c such that it is inboard from an inner side of corresponding portions of the support wall 618 and from corresponding adjacent brace(s) for defining a brace track 697 along a perimeter portion of each brace. As depicted in FIG. 11D, the brace wall 695a,b,c of each brace 690a,b,c can be spaced inboard such that the brace track 697 matches a width and profile of the corresponding gasket 620 for structurally supporting the gasket therein between inner sides of the support wall and the brace wall. Optionally, the brace wall can be spaced inboard a greater distance than the gasket width and profile for allowing the gasket to expand within the brace track during compression when forming a seal with the surface of an object being lifted. Alternatively, one or more of the braces 690a,b,c can include multiple brace walls including or more additional brace wall loops as described further below.

Each brace base 690 can be arranged as a discrete, separate unitary device versus the unitary extended base 610, and further can be formed from a material that is more flexible than the rigid, structural material for the extended frame. Further, each frame 690 can be formed from a material more rigid than the material for the gasket 620. For instance, the gasket 620 can be formed from a compressible elastomeric material or a closed cell foam material, for example, and braces 690 can be formed from a less flexible and more rigid material, such as an injection molded thermoplastic material. As such, the braces 690 can cooperate with the extended base 610 including the support wall 618 for enhancing support provided by the open chamber 620 and further improve support for and sealability of the gasket 620 through retention of gasket within the brace track 697. In addition, the braces 690 can help define each of the vacuum grip regions 682.

Flexible & Adaptable Independent Grip Operations (ILP)

Figure 12A:
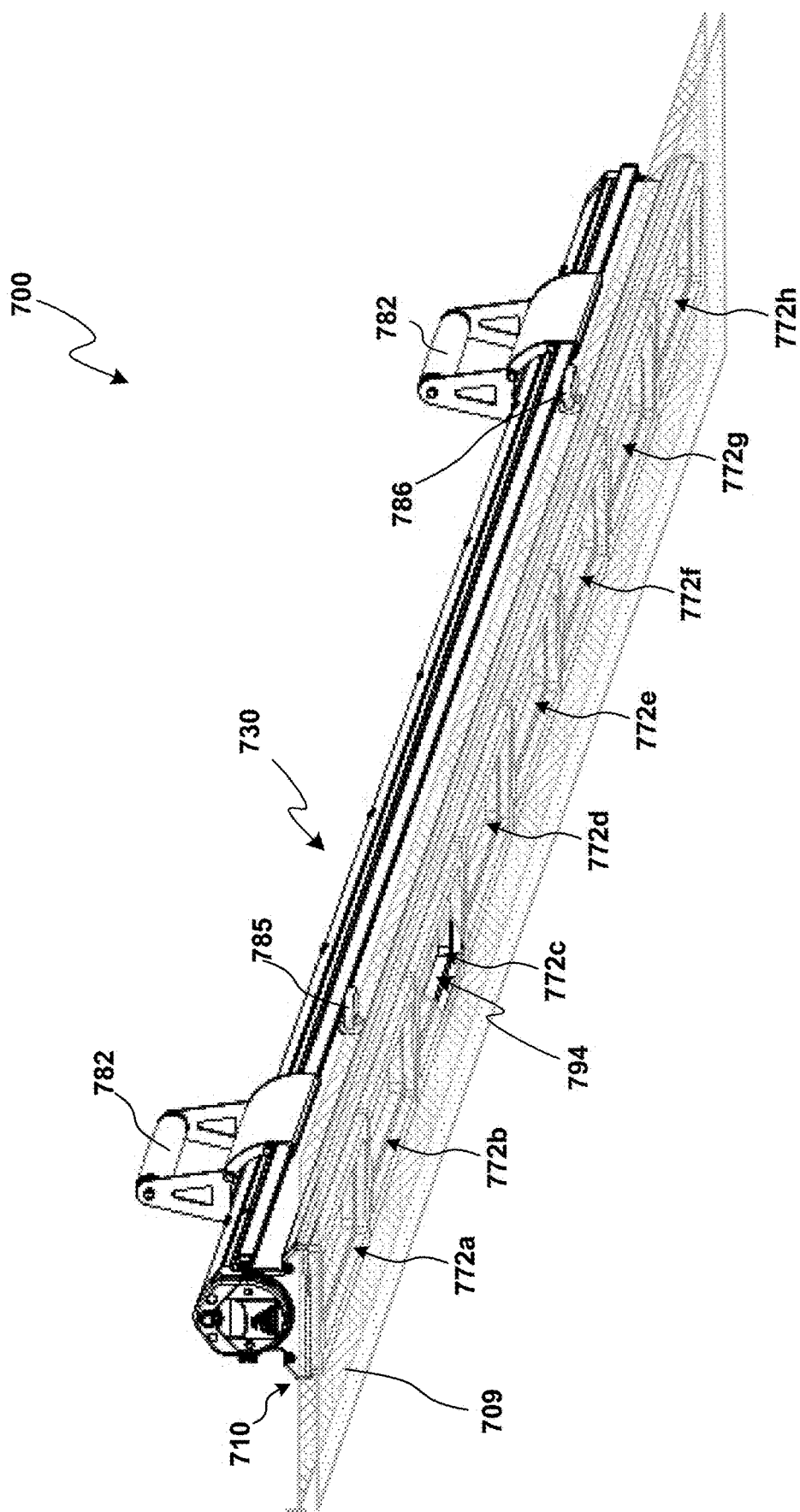
FIG. 12A is a perspective view of an example extended length portable vacuum grip device according to the presently disclosed subject matter, which is shown connected to a surface of an example object having an extensive surface area, such as a flat sheet material object, and depicted from a lower perspective view with the example object partially transparent.
Figure 12B:
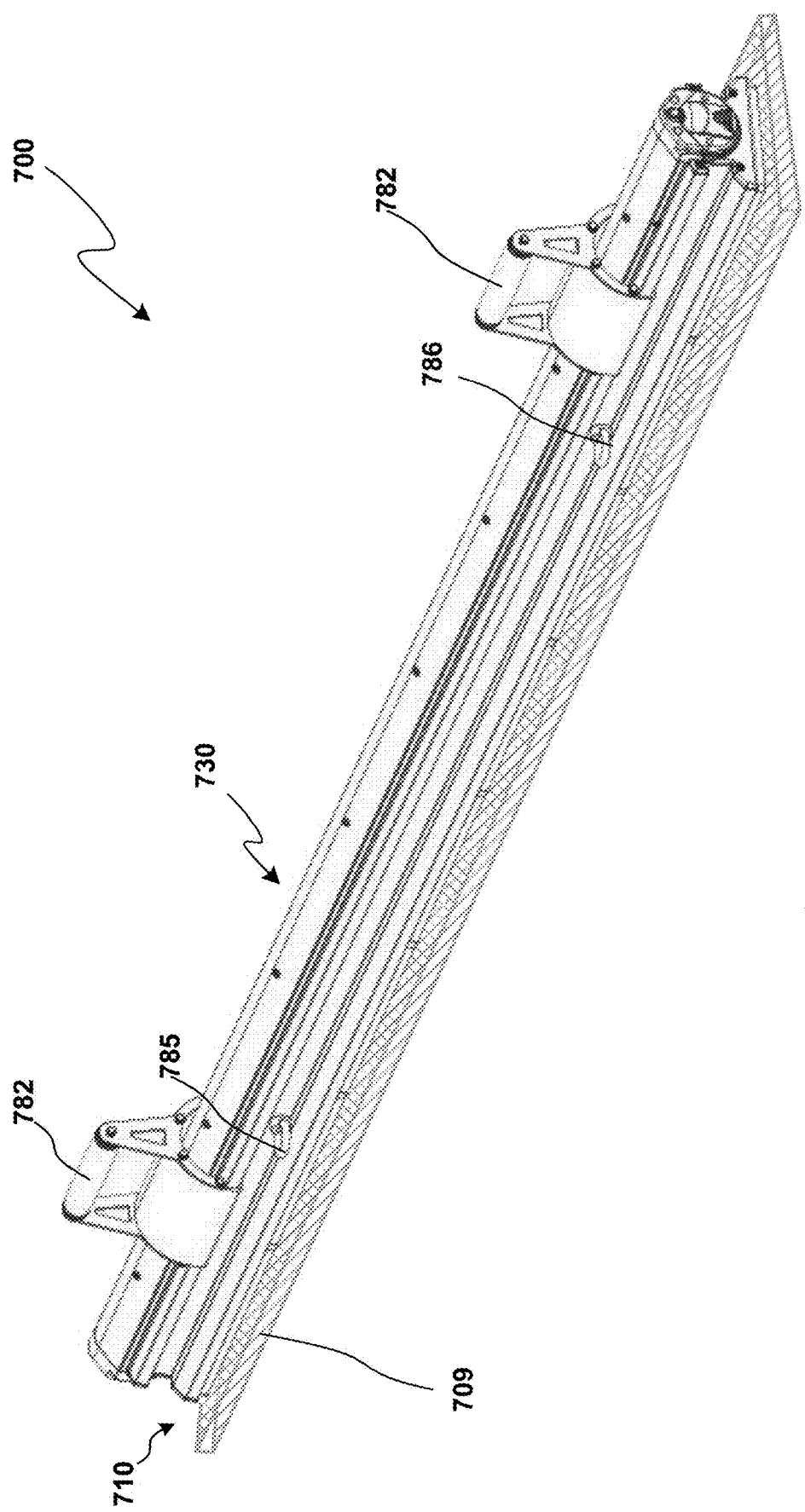
FIG. 12B is an upper perspective view of the example extended length portable vacuum grip device of FIG. 12A.
Figure 12C:
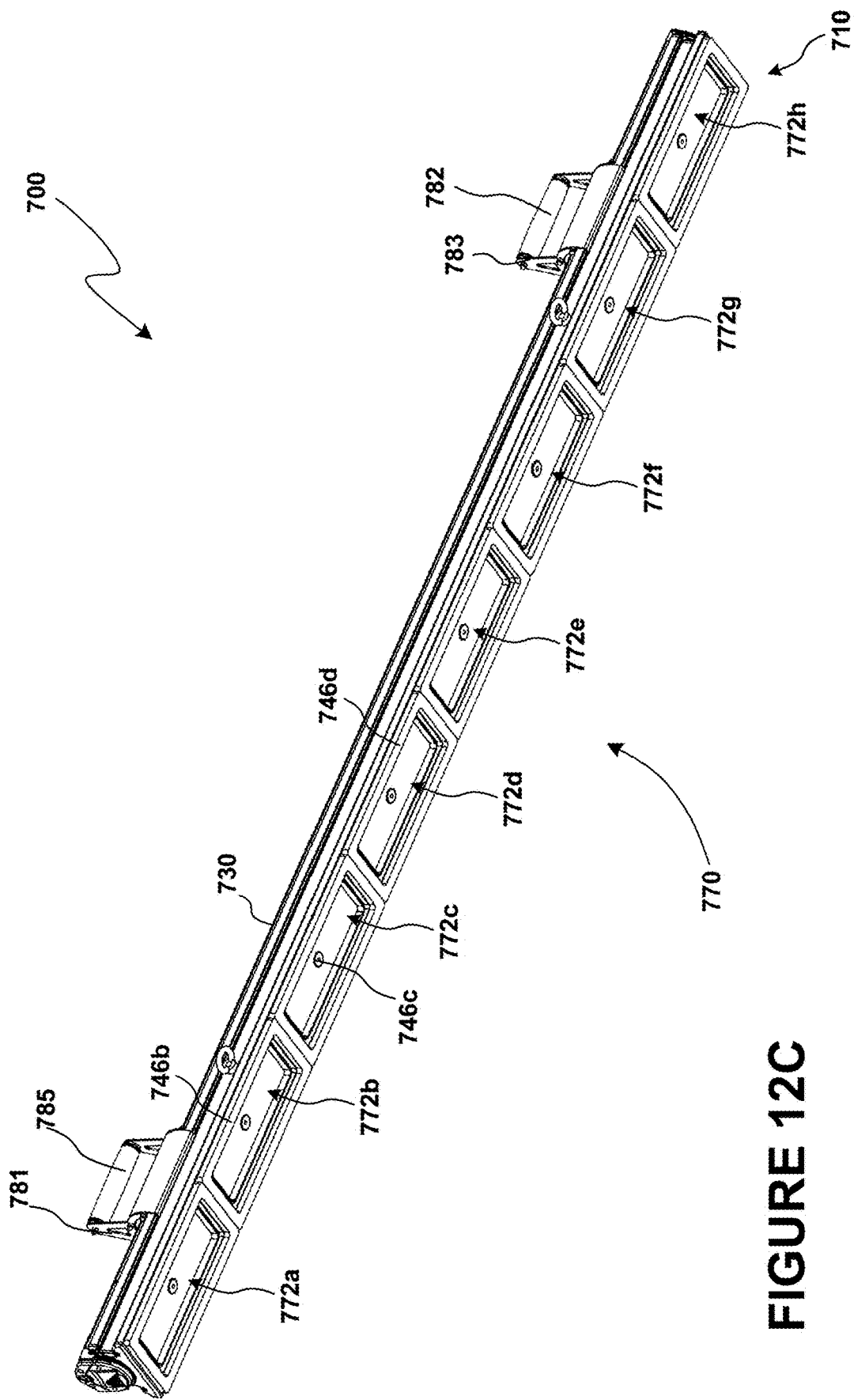
FIG. 12C is a lower perspective view of the example extended length portable vacuum grip device of FIG. 12A, which is depicted similar to the view for FIG. 12A without being attached to an example lift object.

Referring now to FIGS. 12A to 12C, another schematic example of a further example portable extended length frame vacuum grip device 700 is shown according to the presently disclosed subject matter, which generally includes aspects and features of the vacuum grip devices described above except and, in particular, includes the aspects and features described herein for vacuum grip devices 500 and 600, except as noted hereafter. As such, like numbers refer to like features.

The grip device 700 includes an extended length rigid support frame 710 and a plurality of independently operable vacuum grip regions 772 integrated therein, which as shown in FIGS. 12A to 12C can have a much greater length than its width and define an open chamber 770 that is subdivided into a series of many smaller vacuum grip regions 772. The extended length rigid support frame 710 has a rigid, high strength framework disposed at a contact interface with an object to be lifted, and each of the integrated vacuum grip regions 572 that extend along the length of the frame, such that grip device 700 includes an extended length integrated lifting profile (ILP) for providing many advantageous features and benefits for lifting objects having an extended surface size compared with its overall size. The vacuum grip regions 772 can be sized such that each of the vacuum grip regions induces high grip forces during usage, and can do so for a portable vacuum grip arrangement. Further, as discussed in greater detail below, each of the vacuum grip regions can be independently powered by a separate pump for enhancing suction operations and for allowing flexibility such that the device can grip an object 709 having surface irregularities including openings or discontinuities 794 therein that prevents or interferes with forming a vacuum seal at one or more vacuum grip regions.

As with grip devices 500 & 600, grip device 700 subdivides an overall vacuum chamber into a plurality of independently operable vacuum grip regions 572, which as shown in FIGS. 12A to 12C can have a significantly extended length for gripping objects having large surface regions compared with their overall size, such as sheet materials that are often comparatively sensitive to bending stresses perpendicular to the surface region. As such, the grip device 700 is arranged for providing enhanced overall grip that uniformly spans the length of the extended base 710, firmly grips an attached object at each vacuum grip region 772 being sized for ensuring portable high grip strength at each region, and firmly retains the attached object surface against the high structural strength, rigid extended frame 710 disposed at the lifting interface. Further, the series of subdivided vacuum grip regions 772 are sized and arranged as independently operable grip regions that can span any gaps or open regions 794 and maintain overall grip for the object despite lack of vacuum at one or more of the discrete vacuum grip regions.

Frame 710 can be formed as a unitary impermeable rigid structure for providing robust support at or proximate the contact interface that is generally located at a distal end of a rigid support wall 718 of the grip device 700 along a perimeter of an extended frame base 710, which has a support side 712 and an opposite vacuum grip side 714 that the support wall 718 projects from on the vacuum grip side oriented away from the support side. For the example shown, the frame 710 can be formed a lightweight, high strength aluminum extrusion assembly, which further includes geometric reinforcement features for high structural frame integrity in the longitudinal direction as well as across its width. An inner side of the frame base 715 and an inner side of the support wall 718 define an extended length open chamber 770 at the vacuum grip side 714 subdivided into the series of independent vacuum grip regions 772, through with a plurality of ports 746 are formed through the frame base 715 for vacuum operations therethrough for each of the grip regions.

The grip device 700 further includes a housing 730 on the support side 712 of the frame 710, a plurality of pumps 732 disposed therein for providing independent operability of the vacuum grip regions, and corresponding air channels for connecting the pumps with corresponding ports 746 and evacuating air. The housing 730 further includes a first handle 781 at a first end of the extended grip device 700 and a second handle 783 at an opposite second end of the extended grip device.

As best seen in FIG. 12C, the grip device 700 includes a plurality of gaskets 720 that each function as a seal device for a corresponding independent vacuum grip region 772. Each gasket 720 forms a closed loop and is configured to fit within a portion of the overall open chamber 770 defined by the frame, in which a gasket outer wall 725 abuts an inner side of the support wall 718 on outboard portions of the gasket, and an inboard portion or portions of the gasket abut an adjacent gasket. A base surface 721 of each gasket 720 is attached to the vacuum grip side of the frame base 715 and protrudes therefrom in the direction of the vacuum grip side 714 away from the support side 712 to a contact surface 722. The gasket 720 protrudes from the frame base 715 a greater distance D1 than the support wall 718, such that the protruding portion of the gasket can be compressed tightly against the surface of an object to be lifted and form a seal therewith. Similar to vacuum grip devices 500 & 600, the height D1 of the protruding portion of gasket 720 can be about the same or less than the distance that support wall 718 protrudes from the frame base 715, which can allow the gasket 720 to compress tightly against the support wall 718 for providing firm structural support at the contact interface with the object to be lifted.

As further seen in FIG. 12C, the plurality of gaskets 720 subdivide the open chamber 770 outlined by the frame 710 into a plurality of vacuum grip regions 770, each of which is connected with at least one port 746. As further shown in FIG. 12C, at least one port 746 can be connected with each one of the vacuum grip regions. The arrangement of pumps 732, ports 746 and gaskets 720 can be arranged for independent operation, such that an object could be lifted by the grip device 700 despite the loss of vacuum for one or more individual vacuum grip regions during lift operations or the inability of individual grip regions to form a seal, like for an opening or discontinuity 794 in the surface of the object to be lifted as indicated in FIG. 12A. In addition, an arrangement of individually operable vacuum grip regions 772 can provide greater overall gripping and lifting forces via separate pumps (not shown) as discussed further below that each correspond with an individual vacuum grip region or set of vacuum grip regions.

Integrated Stress Balancing Structure (ILP) & Unitary Frame Construction (ILP)

Referring now to FIGS. 13 to 20, an additional example vacuum grip device 800 is schematically shown that generally includes the aspects and features of grip devices discussed above, and in particular includes the aspects and features of schematic example vacuum grip device 700 except as described below. As such, like numbers refer to like features.

Figure 13:
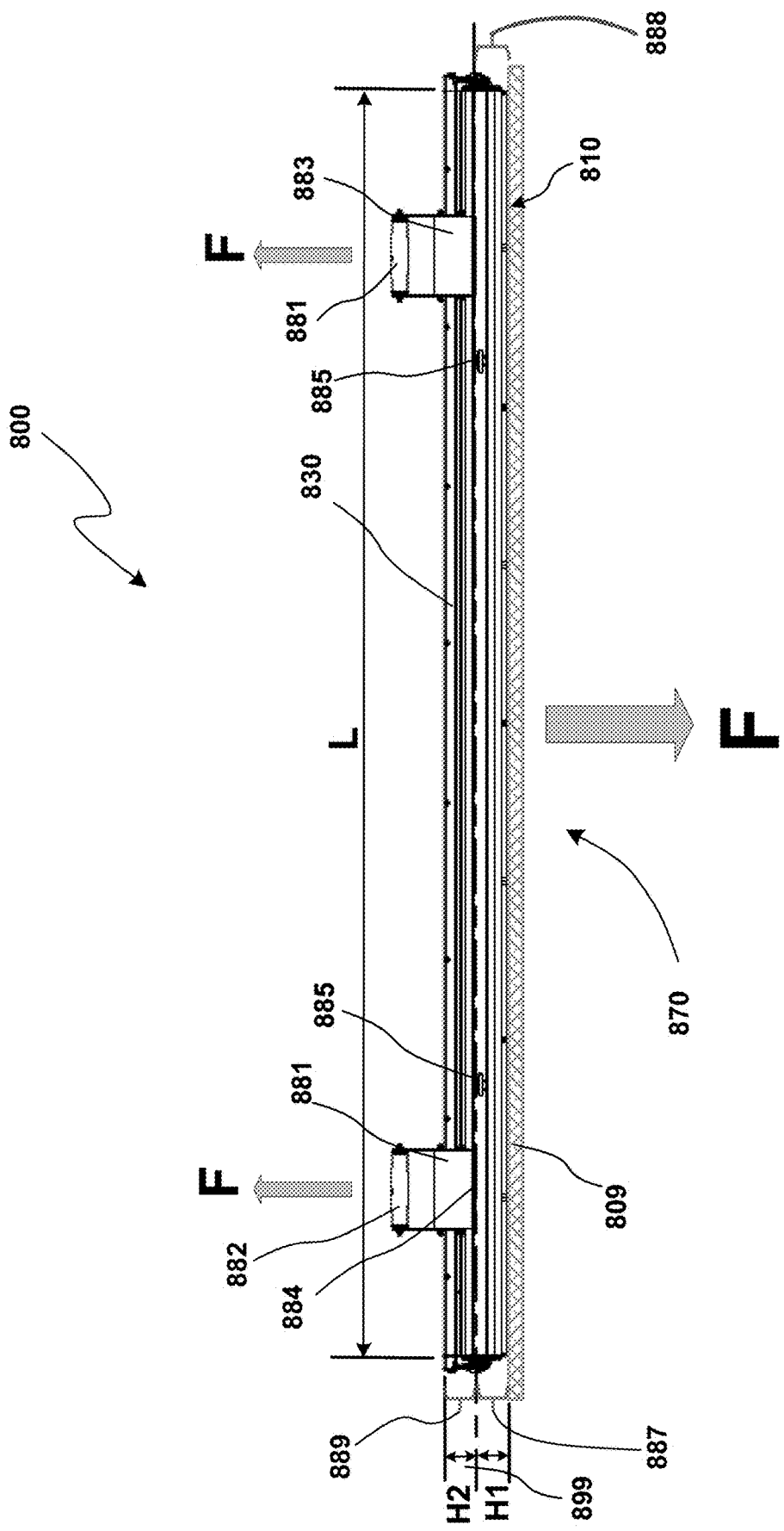
FIG. 13 is a side view of a further example extended length portable vacuum grip device according to the presently disclosed subject matter, which is shown connected to a surface of an example object having an extensive surface area, such as a flat sheet material object, which further includes force balancing features and depicts example features related to the same along with schematic force representations.
Figure 14:
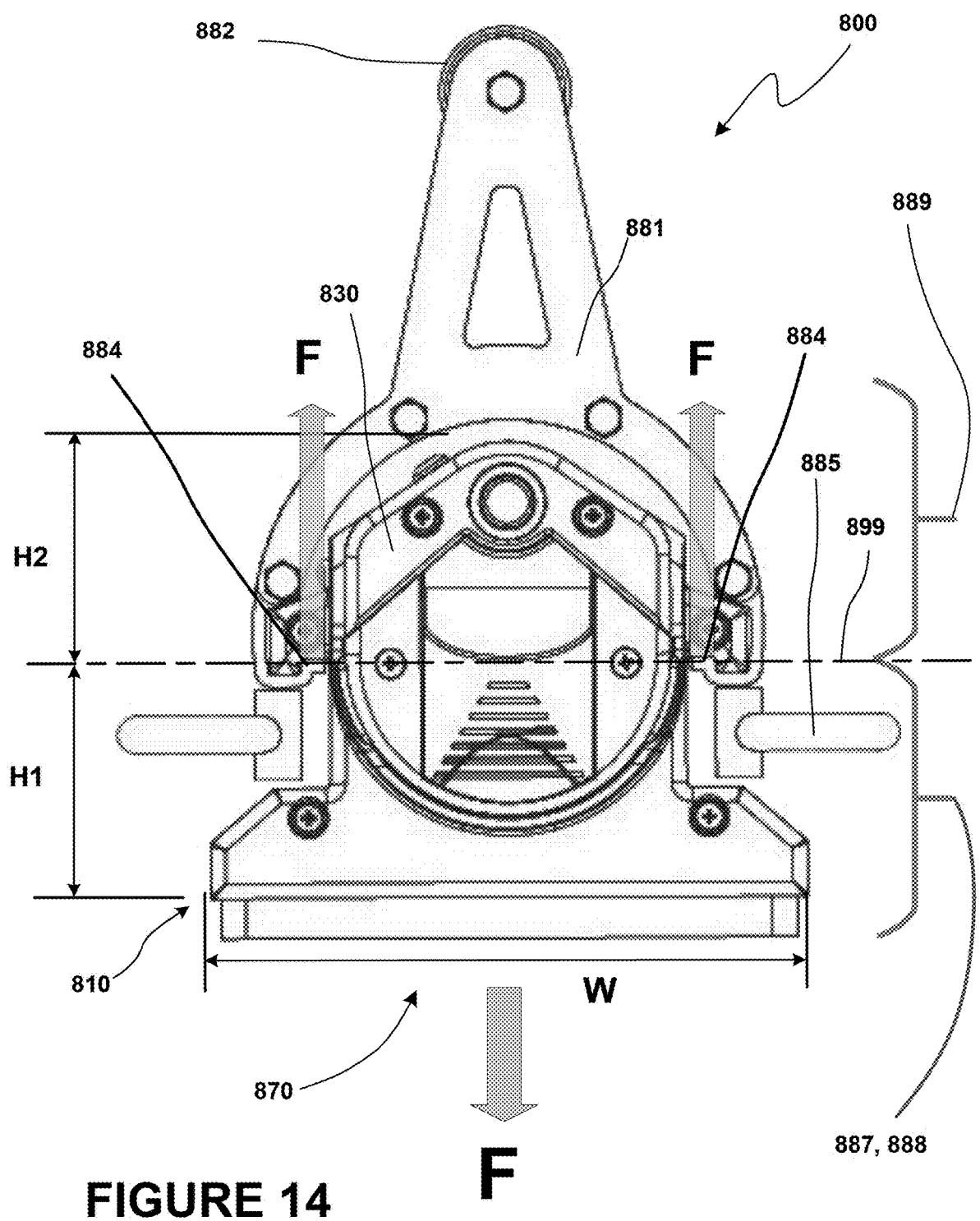
FIG. 14 is an end view of the device of FIG. 13 shown without an example object attached to the contact surface.
Figure 17:
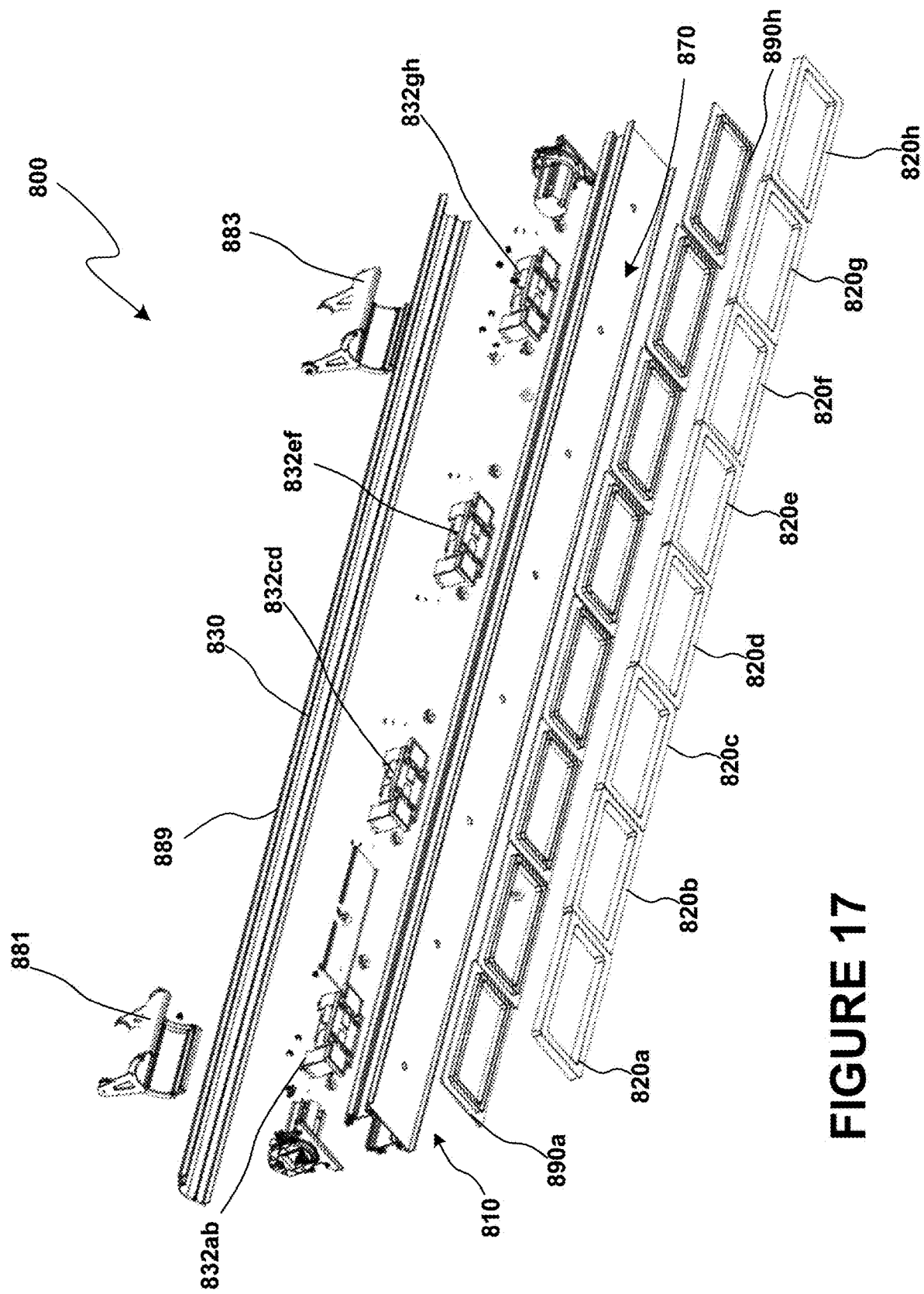
FIGS. 17 and 18 are exploded side and end perspective views of the example device of FIG. 13 shown without an example object attached to the contact surface.
Figure 18:
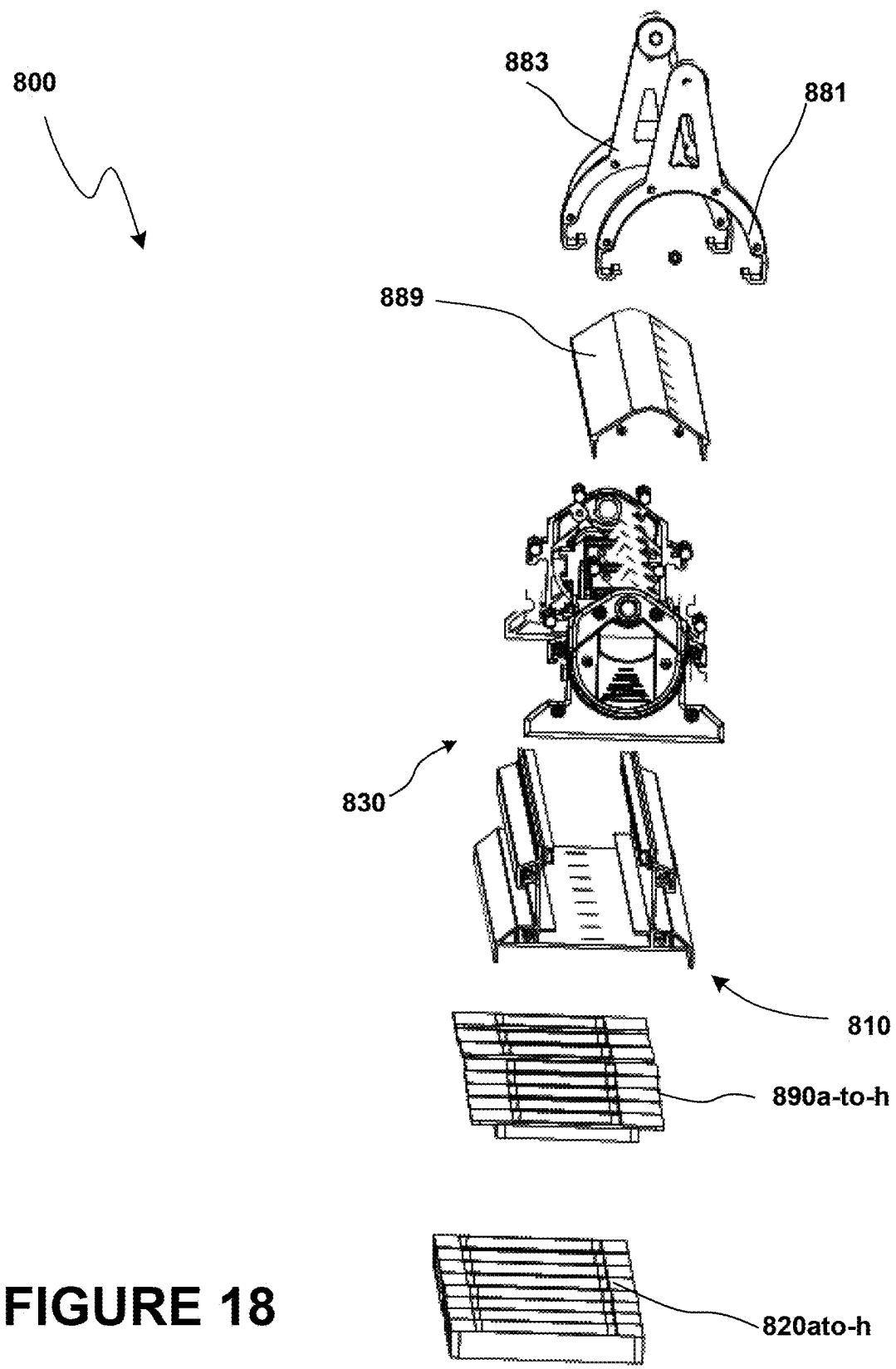

As best seen in FIGS. 13 & 14 along with FIGS. 15 to 20, in addition to having an integrated lifting profile (ILP) as discussed above along with device 700 that reduces stress in lifted objects based on the arrangement of a rigid, structural frame 810 at the contact interface, the example ILP vacuum grip device 800 can further include an integrated force balancing (ISR) structure that can additionally minimize stress in the surface of objects being lifted. Such an integrated stress reducing (ISR) structure can be integrated primarily in the elongate base 810, but can also be integrated into a combination of an elongate base and housing 830 as shown in the present example. A rigid, high strength extended base disposed at the contact interface with an object can significantly reinforce the flat surface of a sheet material when lifting the same and avoid inducing stresses based on the rigid framework at the surface lacking induced stresses as in conventional offset framework lifts. However, when lifting heavy extended flat surface materials, potential flexural stresses can be induced in an extended base of a lift device even with the structural supporting base 810 disposed proximate the lift interface. The integrated stress reduction structure of example extended length vacuum grip device 800 can counteract such flexural stresses and thereby further enhance the low-stress lift capability of lift device 800 and related devices described herein.

The integrated stress reducing (ISR) structure includes an arrangement for applying lift forces, such as from a handle and/or connector like an eyebolt, to a neutral lift interface on the support side of the grip device at low moment distances, and to offset related tensile stresses applied at the extended base 810 via a counterbalancing compression reaction force and moment on the support side. The ISR structure includes a counter-compression structure that extends further away from the contact interface than a neutral interface for providing reinforcement that can extend between handles or other lift connections in the form of a strut 880 for counteracting flexural stresses transmitted during lifts, which can be integrated with the housing 830 and attached pair of handles. As shown, vacuum grip device 800 includes a pair of handles 881, 883 attached at opposite longitudinal ends of the grip device along with two pairs of opposing eyebolts 885, 886, which includes first handle 881 and first set of eyebolts 885 at a first end and second handle 883 and second set of eyebolts 886 at an opposite second end attached to the support side 812 of the grip device. Spaced apart pairs of lift connections can be included with the extended length lift device 800 for spreading lift loads and providing enhanced control and maneuverability during lifts.

As shown in FIGS. 12 & 13, forces applied to the extended base 810, the contact interface at a distal end of the support wall 818, and the surface of an attached object 809 during lifts using such an ISR arrangement can be counteracted and reduced for further reinforcing and reducing potential stresses. In particular, downward forces applied to the extended base 810 when lifting an object can function as a downward force centered along the extended base 810 as denoted in FIGS. 12 & 13, which can induce tension along the base during lifts even though reinforced with structural support base 810. Further, opposing lift forces applied at the first and second handles 881, 883 and/or sets of eyebolts 885, 886 disposed at opposite longitudinal ends of the device 800 and housing 830 create compression stresses across the housing 830.

The ISR structure for the present example as best seen in FIGS. 12 & 13 includes a first lift offset 887 integrated with extended base 810 at a first end of the extended base 810, which projects a tensile-moment distance H1 from a distal end of the support wall 818 (i.e., from the contact interface) toward the support side 812 to a first lift interface 884 attached to the first handle 881. The first lift interface 884 receives lift forces applied from the first handle 881 along a neutral stress plane 899. The ISR structure further includes a parallel second lift offset 888 that is also integrated with the extended base 810 at an opposite second end of the extended base 810 and likewise projects the tensile-moment distance H1 in parallel with the first lift offset from a distal end of the support wall 818 toward the support side 812 to a second lift interface 891 attached to a second handle 883. The second lift interface 891 receives lift forces applied from the second handle 883 along the neutral stress plane 889. The integrated stress reduction structure 889 projects in the same direction away from the vacuum grip side from each of the first lift interface 884 and the second lift interface 888 for a counter-compression distance, H2, that is equal to the tensile-moment distance H1 to a strut 880 extending longitudinally therebetween.

As such, the stress reduction frame 889 projects from the object-contact surface interface as measured from the distal end of the support wall 818 for an overall offset distance of H1 plus H2, in which the neutral plane 899 is located midway. The stress reduction frame 889 includes a longitudinal strut extending between the first and second lift interfaces 884, 888 for counteracting and resisting tensile forces exerted on the extended frame in a longitudinal direction during lifts with counter-compression reinforcement through the integrated strut 880, in which the strut is offset from the lift interfaces in opposite direction from the contact interface by the same distance as the contact interface. Thus, tensile forces applied to the extended frame 810 during lifting are counteracted by compression reaction forces along the strut for further minimizing effective stresses applied to an object during lifts.

Figure 19A:
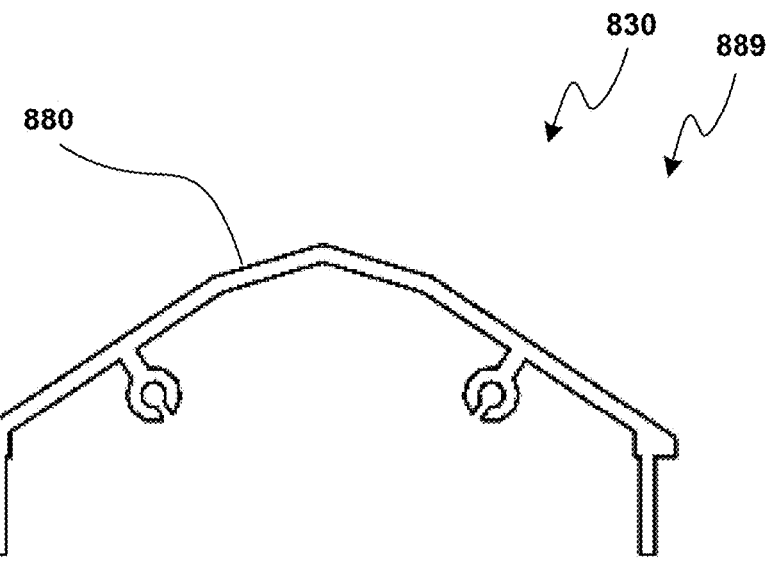
FIGS. 19A and 19B are end views of an example unitary frame and support arrangement for an additional example extended length vacuum grip device according to presently disclosed subject matter.
Figure 19B:
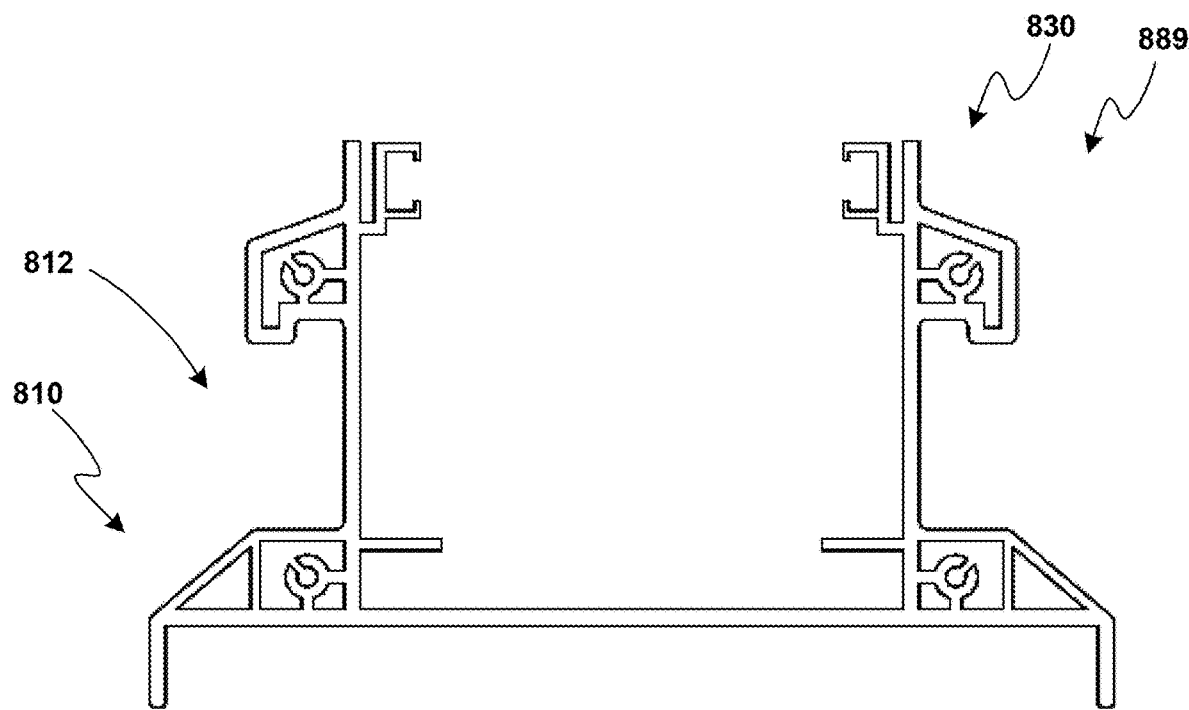
Figure 20:
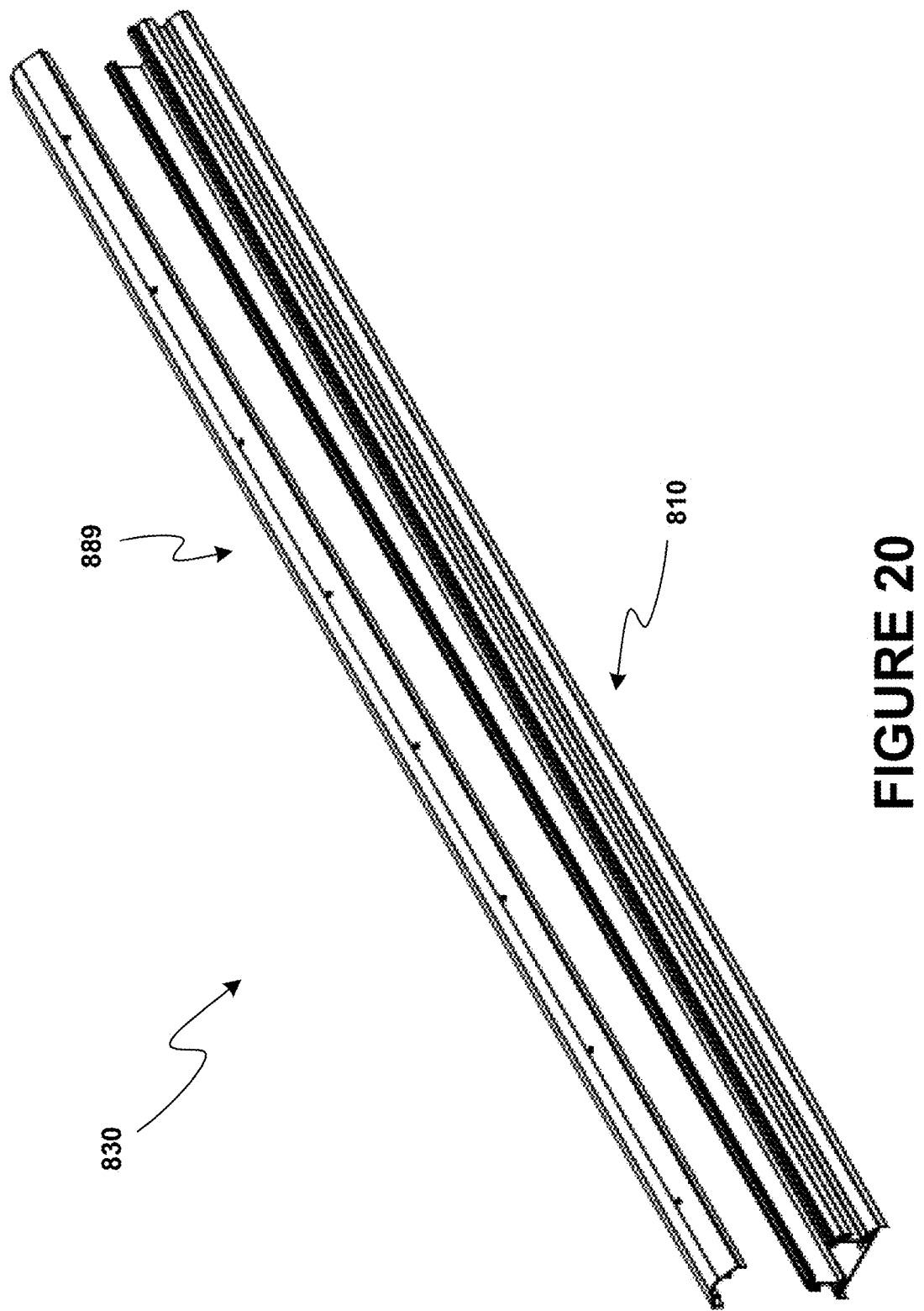
FIG. 20 is a perspective of the components depicted in FIGS. 19A and 19B.
Figure 21:
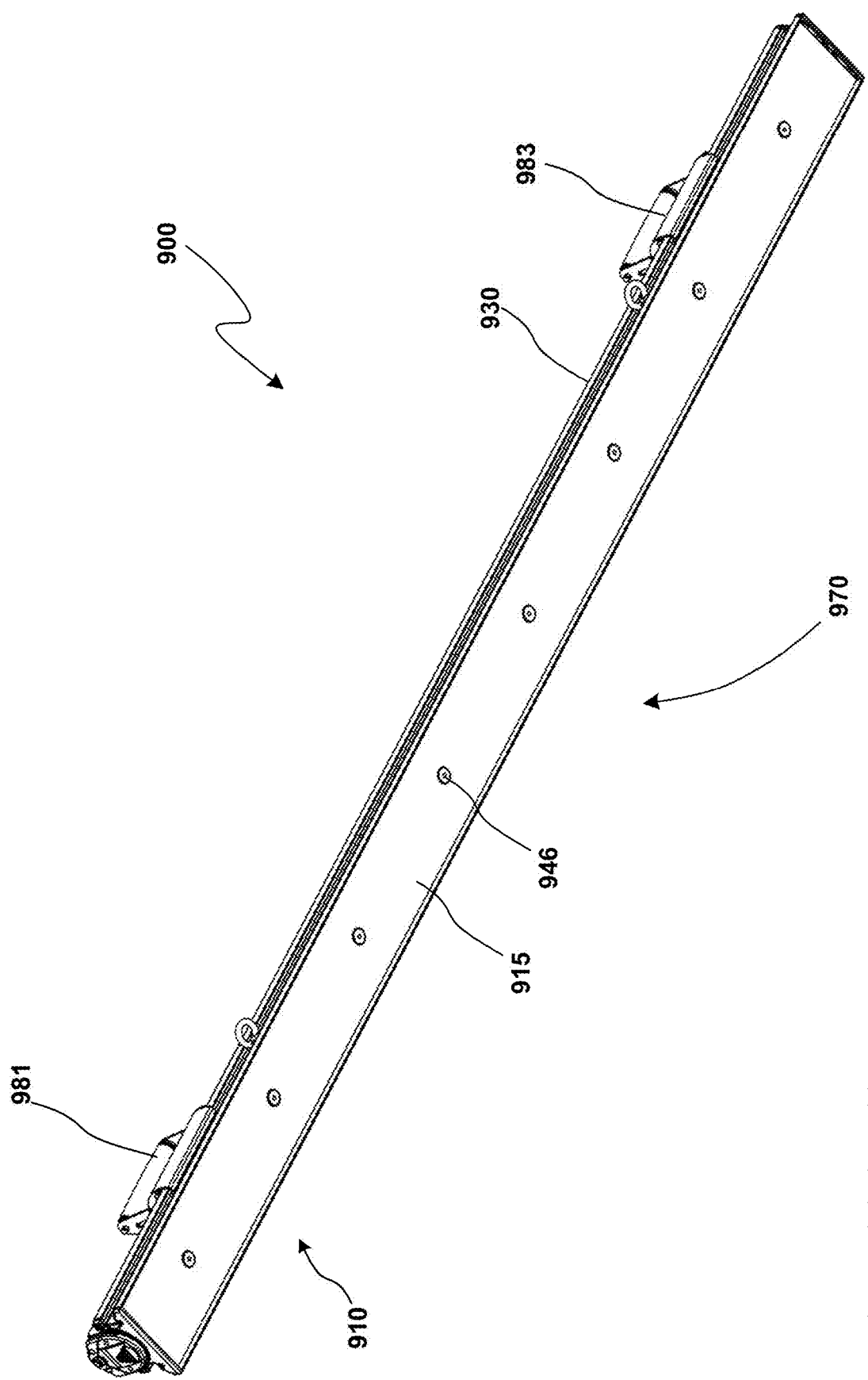
FIG. 21 shows a bottom perspective view of a further example expended length portable vacuum grip device according to the presently disclosed subject matter, which example device includes the example components depicted in FIGS. 19A and 19B.
Figure 22:
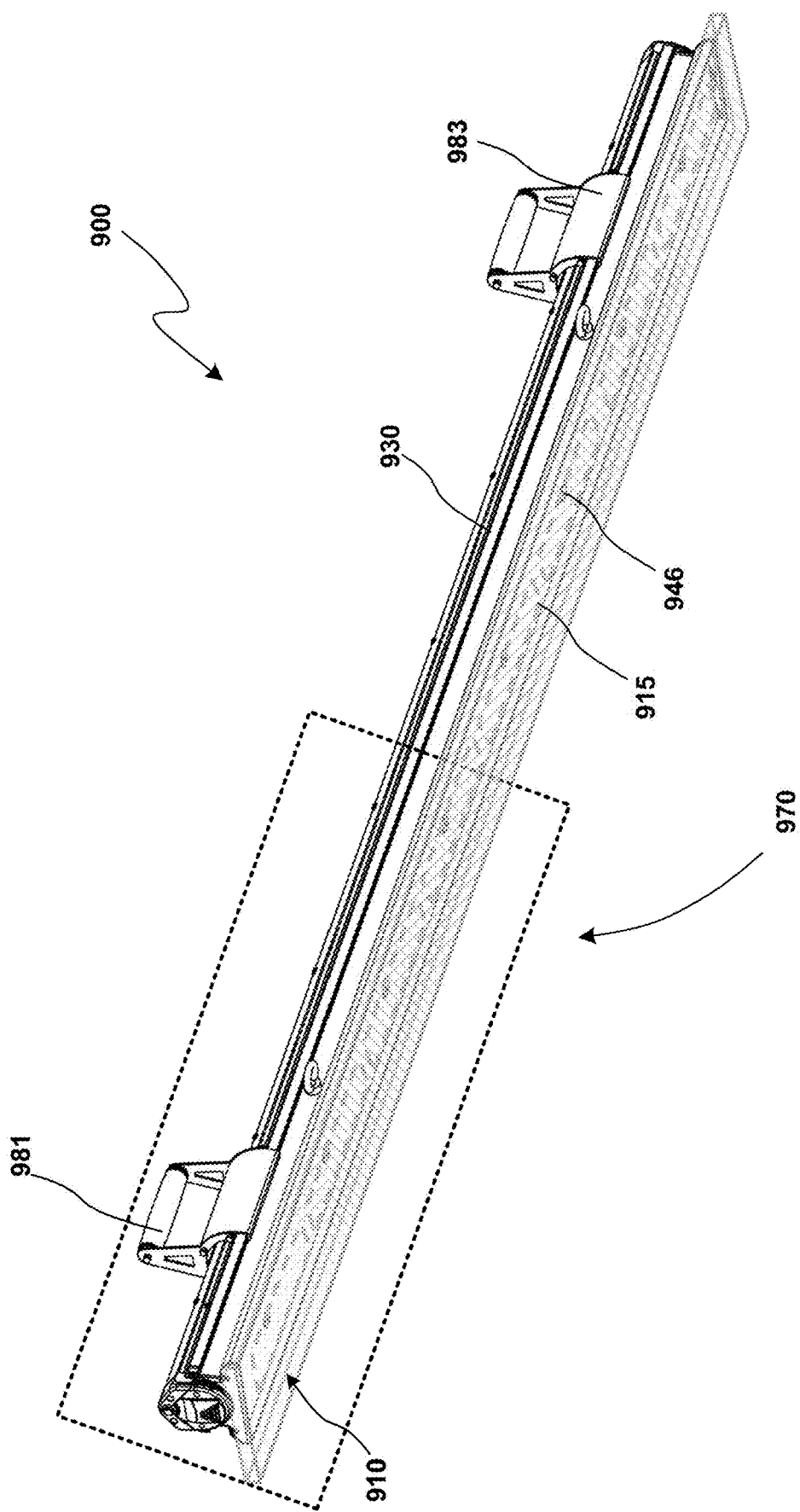
FIG. 22 is a bottom perspective view of yet another example expended length portable vacuum grip device according to the presently disclosed subject matter, which is shown connected to a portion of a top surface of an object along with indications for independent grip regions within the open cavity extending along the length of the extended frame.
Figure 23:
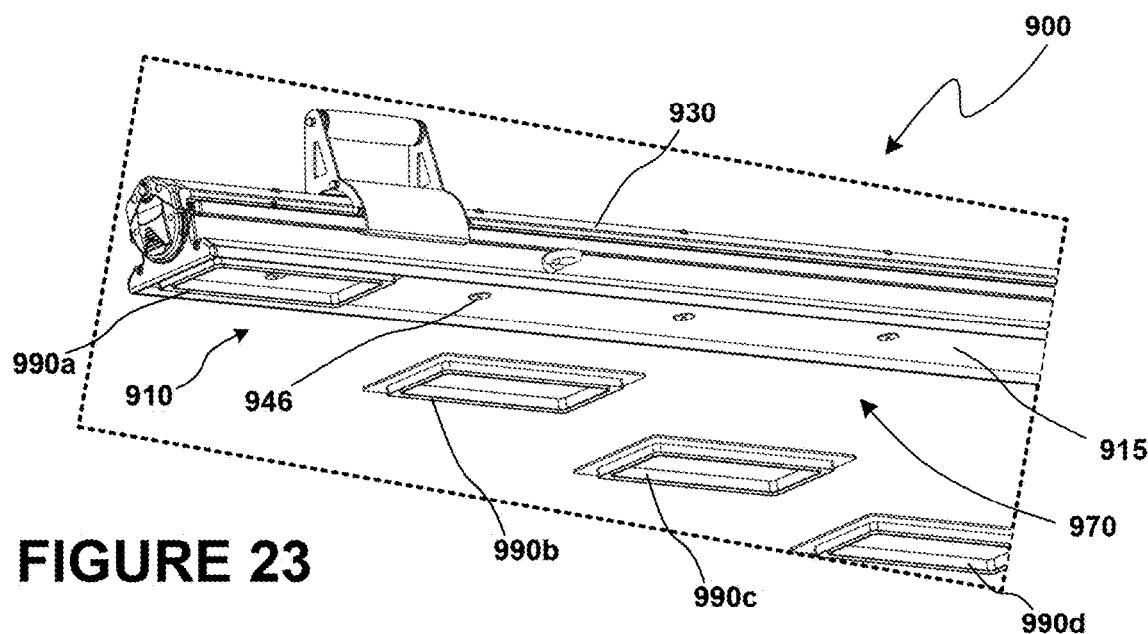
FIGS. 23 and 24 are bottom perspective view of the grip device of FIG. 22 shown without an object attached and depicting an example arrangement of support braces and gaskets corresponding with the grip regions of FIG. 22.
Figure 24:
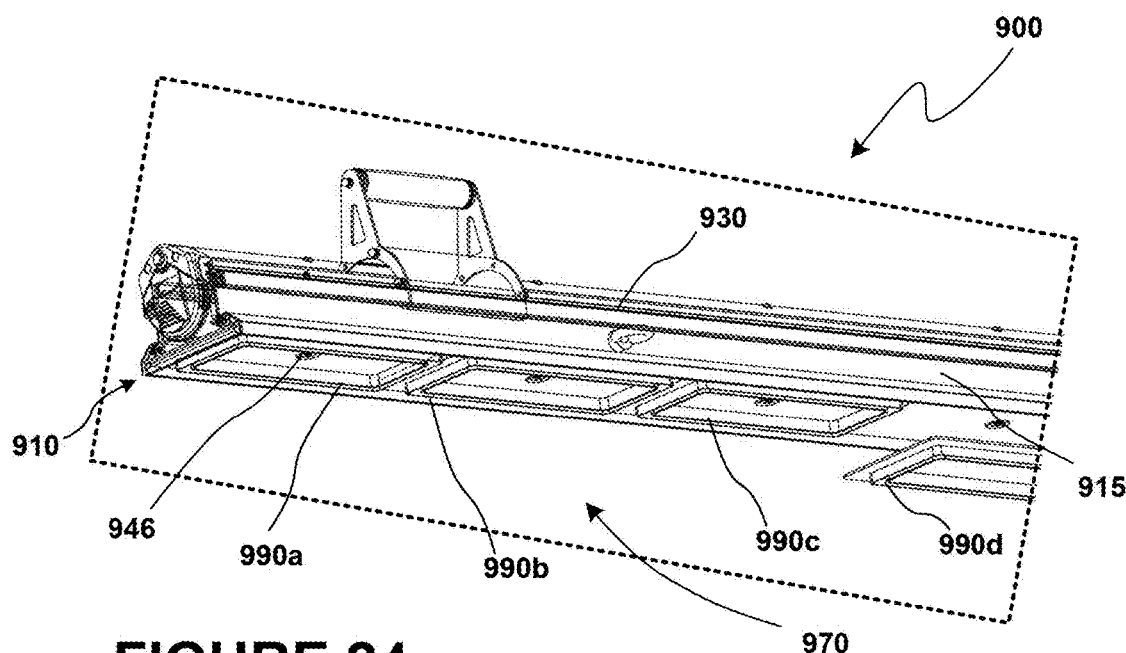

Further details of the ISR for the example implementation of device 800 can be seen in FIGS. 19A, 19B and 20. As shown therein, primary features of both the integrated lifting profile (ILP) and the integrated stress reduction (ISR) structure can be formed by a rigid, unitary aluminum extrusion construction as shown in the schematic example of FIGS. 19A, 19B & 20. Such a construction can provide significant benefits and advantages in combination with various other beneficial aspects and features described herein. Further, aspects and features pertaining to the example housing 830 and extended base 810 constructions can synergistically enhance many of the inventive concepts described herein.

For instance, as best seen in FIG. 19B along with FIG. 20, extended base 810 can be formed as a unitary, lightweight and high strength aluminum extrusion structure. Such a construction can ensure that the extended base 810 has an impermeable, single unit foundation structure that primarily forms the open chamber 870 including the frame base 815 and opposing, lateral portions of the support wall 818. Forming the structural foundation for the extended base 810 from a single, unitary construction can significantly improve the structural integrity and strength of the extended base 810 by virtue of being formed as a single unit. Further, use of an aluminum extrusion construction enables the base 810 to be formed as a lightweight construction along with having high strength, and along with providing a highly impermeable foundation for the base and the vacuum grip regions subdivided therein.

In addition, the use of an extruded aluminum construction allows for the formation of integrated structural reinforcements for the base 810 along the extent of the base. As best seen in FIG. 19B, reinforcement structures can include lateral ribs or channels defined in the support side 812 along with integrated stress reduction (ISR) features including a pair of longitudinal channel features that form the lift interface 884 to which lift forces from handles 881, 882 and eyebolts 885, 886 are applied as described below. Further, the use of an aluminum extrusion construction can also integrally form primary portions of the housing 830 within the same unitary structure that forms the extended base 810. As such, assembly gaps and weaknesses along with various holes and openings that can impact impermeability can be avoided in comparison with having an assembly construction as used with conventional implementations of vacuum lift devices and other non-extruded implementations described herein. In addition, such a construction can create internal space within portions of the integrally formed housing for installation of a plurality of pumps 832 and other operating components for the device within the integrated construction.

As best seen in FIG. 19A, a brace 880 for the ISR can be formed as an extruded aluminum cap portion of the housing, which can readily be attached to an upper portion of the integrated extended base 810/housing 830 extrusion of FIG. 19B. The extruded housing cap and strut 880 can be attached as a separate component without impacting the many benefits and advantages discussed above for having a unitary base 810/housing walls 830 construction, and without impacting ISR benefits provided via the unitary extrusion construction as discussed hereafter. Nonetheless, the unitary extruded aluminum housing cap construction can function well as strut 880, which performance can be enhanced through formation of the same as a unitary construction. In addition, the combination of extruded components shown in FIGS. 19A & 19B provides for compact, efficient space for storage of internal operational components of the grip device 800.

Discrete Braces; Selective Performance Options Including Gasket Tracks

Referring now to FIGS. 21 to 27B, another schematic example of a portable extended length frame vacuum grip device 900 is generally shown according to the presently disclosed subject matter, which generally includes the aspects and features of vacuum grip devices described above, and more particularly includes the aspects and features of vacuum grip devices 700 and 800 discussed above except as noted hereafter. As such, like numbers refer to like features.

Grip device 900 differs from grip device 900 in that grip device 900 includes a plurality of optional, discrete brace units 990 located within the open chamber 970, for which each brace 990 corresponds with a single gasket 920 and vacuum grip region 970. Further, grip device 900 also includes varying arrangements and relationships for the number of pumps associated with a vacuum grip region 970 and the number and arrangement of evacuation ports.

Figure 25:
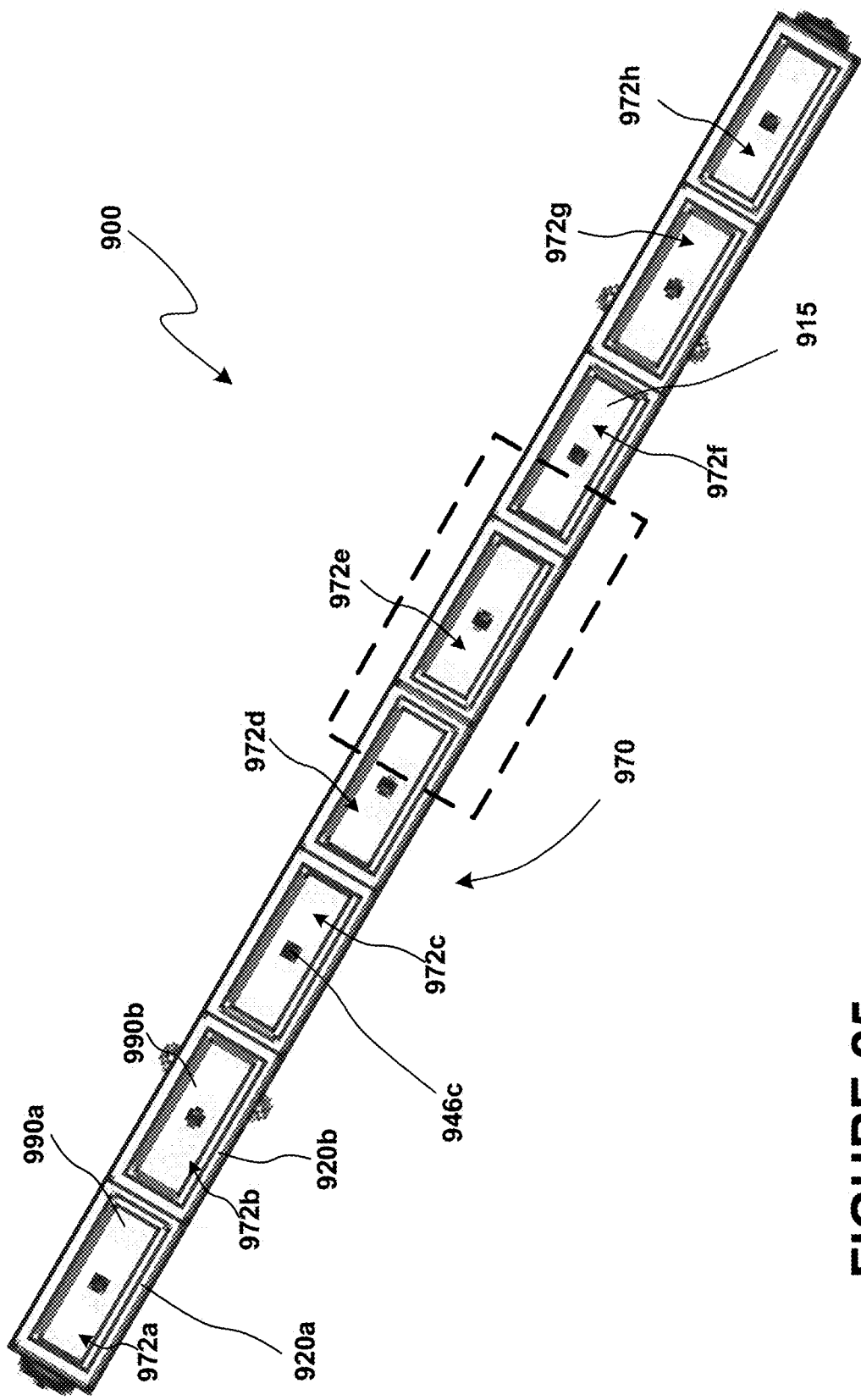
FIG. 25 is a bottom view of the example grip device of FIG. 22 shown without an object attached.
Figure 26B:
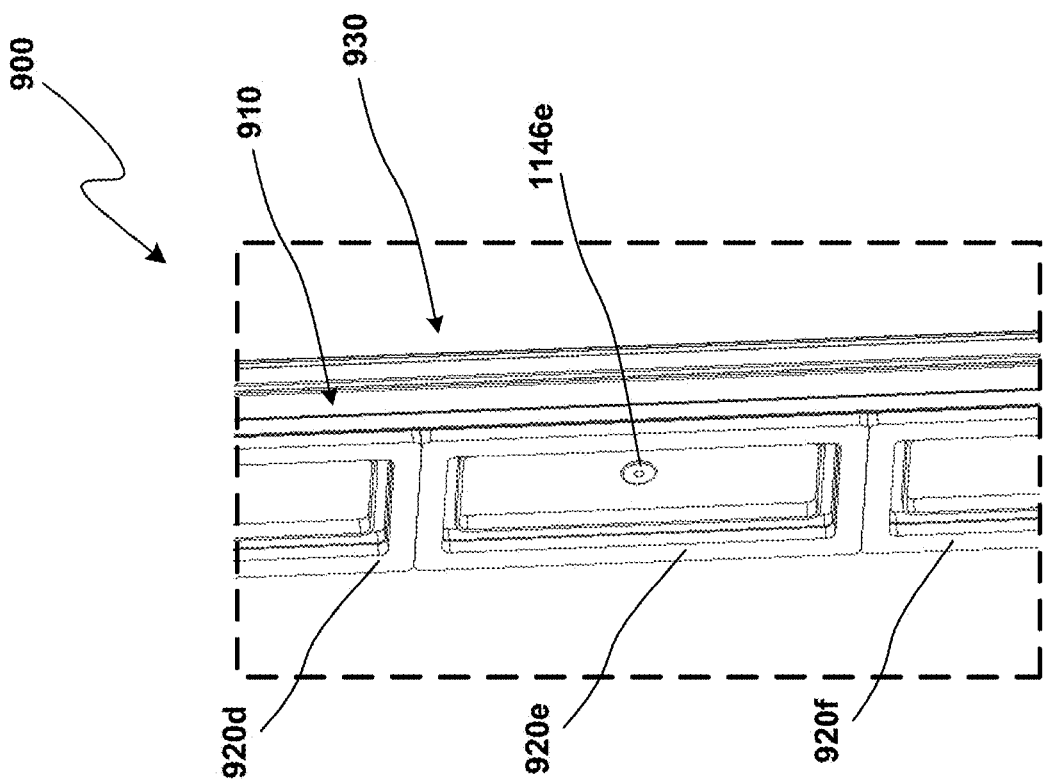
FIG. 26B shows a bottom perspective view for the highlighted region of FIG. 26A.
Figure 26A:
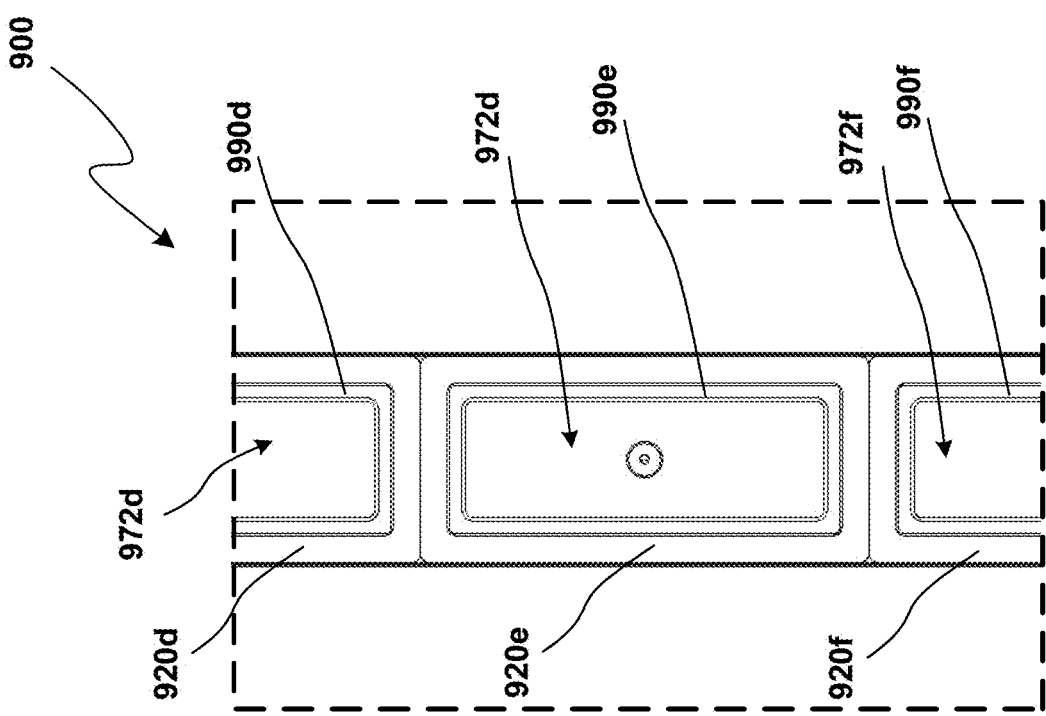
FIG. 26A is a close view of the highlighted region shown in FIG. 22.

FIGS. 21 to 27B show an arrangement of discrete brace units 990 included with grip device 900. The example grip device subdivides the overall open chamber 970 of the extended base 910 (FIG. 21) into eight (8) vacuum grip regions 970a to 970h, for instance. Eight (8) corresponding brace units 990a to 990h within the open chamber 970 for each of the vacuum grip regions 970a to 970h. Each brace unit includes a corresponding brace base 992a to 992h that can be generally flat and include a large central opening corresponding with an interior of the corresponding gasket 920 and the corresponding vacuum grip region or optionally one or more openings formed through the brace base corresponding with port(s) 946 for the corresponding vacuum grip region 970. Each brace base mates with the corresponding inner side of the frame base 915 as shown in FIG. 25 in a serial arrangement adjacent to each other and extending along the length of the open chamber defined within the extended base 910. An outer edge of each brace base 992a to 992h can be placed against a corresponding portion(s) of the inner side of the support wall 918 and corresponding outer edge(s) of an adjacent brace base(s) for firmly fixing the position of each within the open chamber.

Each brace base 992a-to-h can be fixedly attached to the frame base 915, such as via an adhesive, clamped arrangement, and bolts, screws or other fasteners, and/or can be removably attached, via such as via a reversible fastener, snap fit, and an interference fit with inner portions of the support wall 918 or other features. The use of a removal attachment for braces 990a-to-h can allow for the optional use of the braces, and can also allow for selectively switching between several different types of braces. Braces 992a-to-h can cooperate with gaskets 920a-to-h for enhancing an airtight seal with the surface of the object (not shown) being lifted and for modifying grippability therewith. Further, the use of diverse types of braces and/or use of the device with or without braces can provide a wide range of options for customizing performance of the vacuum device and grippability for lifting various types of object and objects with different surface textures and types.

Figure 27B:
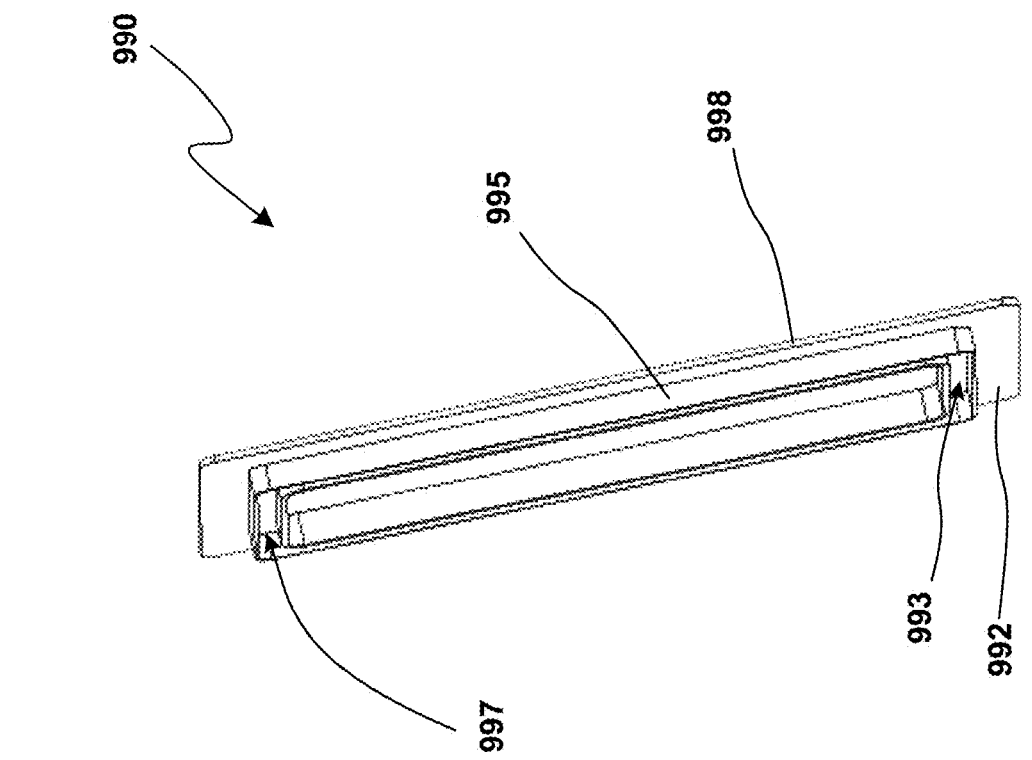
FIG. 27B shows a perspective view of the example brace depicted in the exploded portion of FIG. 27A.
Figure 27A:
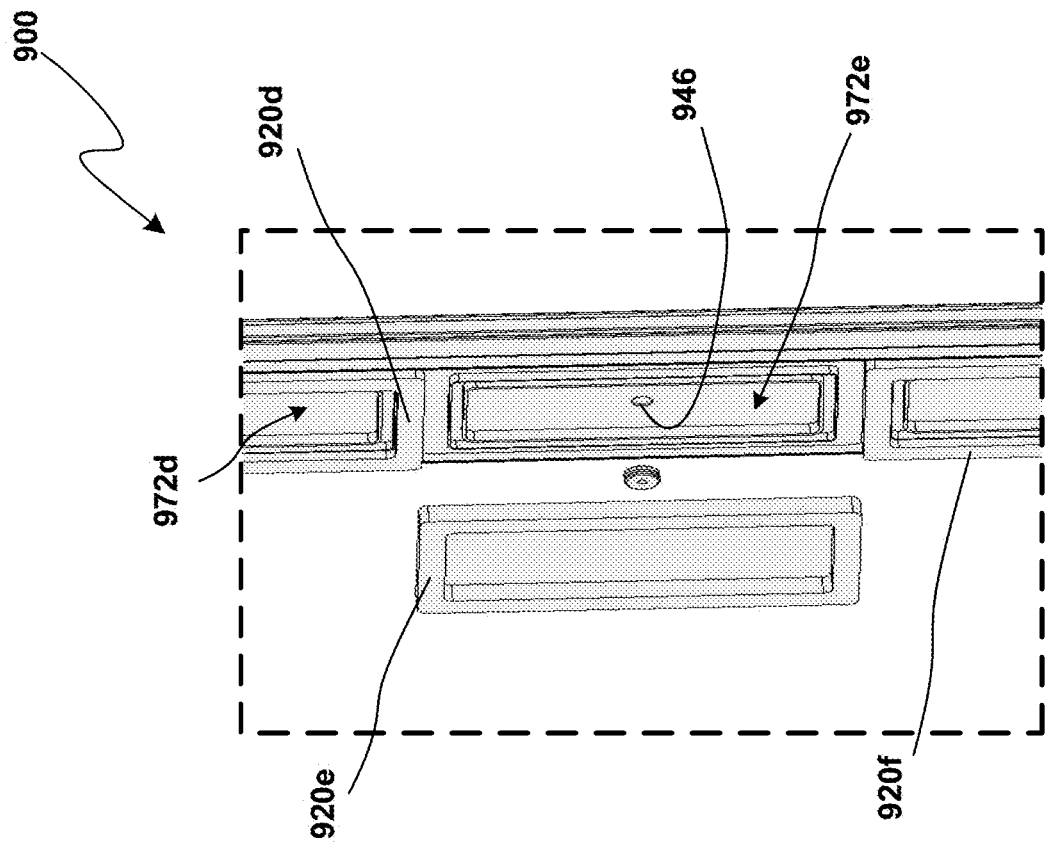
FIG. 27A shows a partially exploded view of FIG. 26B.
Figure 29:
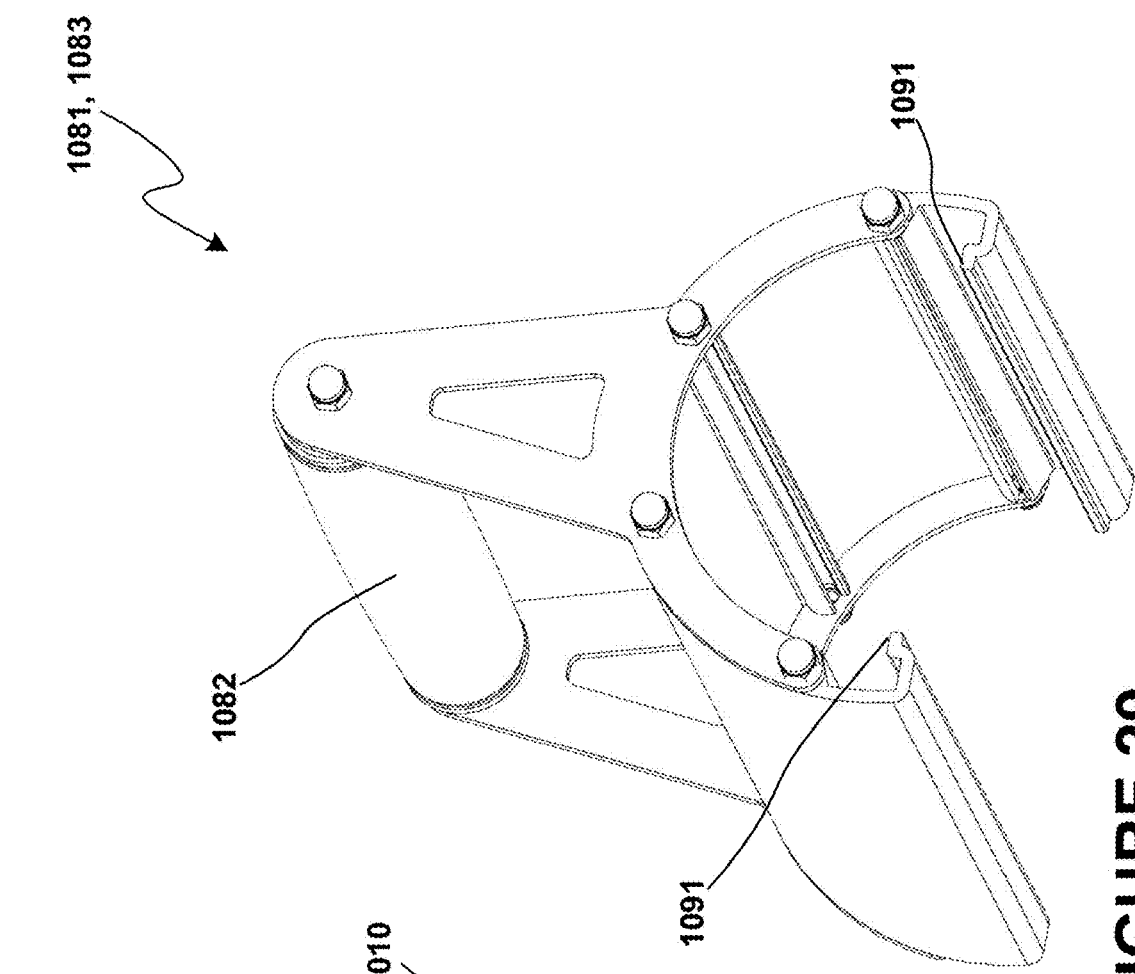
FIG. 29 is a perspective view of an example adjustable handle of the grip device of FIG. 28.

As best seen in FIG. 27B, each brace 990a-to-h includes a brace wall 995a-to-h that protrudes away from the brace base 992a-to-h in the shape of a closed loop. The brace base 992a-to-h can protrude the same distance, D1, as the brace wall 918 for cooperating with the support wall for enhancing overall firm structural support provided by the extended base 910 and the support wall 918 disposed at the contact interface. Optionally, the brace wall 995a-to-h can protrude a slightly greater distance than the support wall 918, such that the brace wall 995a-to-h can be configured for interfering contact with a surface of the object 909 being lifted. Alternatively, the brace wall 995a-to-h can protrude a smaller distance than the support wall 918.

The brace wall 995a-to-h can be located on the brace base 992a-to-h such that it is inboard from an inner side of corresponding portions of the support wall 918 and from corresponding adjacent brace(s) for defining a brace track 997 along a perimeter portion of each brace. As depicted in FIG. 11D, the brace wall 995a-to-h of each brace 990a-to-h can be spaced inboard such that the brace track 997 matches a width and profile of the corresponding gasket 920 for structurally supporting the gasket therein between inner sides of the support wall and the brace wall. Optionally, the brace wall can be spaced inboard a greater distance than the gasket width and profile for allowing the gasket to expand within the brace track during compression when forming a seal with the surface of an object being lifted.

Further, one or more of the braces 990a-to-h can include multiple brace walls including or more additional brace wall loops as depicted for the example grip device 900 and brace 990 as best seen in FIG. 27B. As shown therein, each of the braces 990a-to-h can further include a second brace wall 996 extending from brace base 992 and forming a second closed loop, which can be s spaced inboard from the first brace wall 995 and define a second, inboard track 998. The second wall 996 along with the gap formed by the second inboard track 998 can provide supplemental reinforcement and support for the gasket 920, and particularly for a high compression lifting state of the gasket, and/or along with a low rigidity, high compressibility arrangement for the gasket. Such a combination can be appropriate for and work well with rough or irregular contact surfaces for objects, which can allow significant deformation of the gasket for forming a seal therewith along with the second inboard wall providing reinforcement for compression of the same. As noted above, grip device 900 and other grip devices described herein can allow for selective replacement of various configurations of braces 990 along with selective replacement of gaskets having different properties including compressibility and rigidity, which can modify performance of the vacuum grip regions 972 as desired or appropriate for lifting distinct types of objects having various surface characteristics.

Handle/Lift Interfaces; Efficient Independent & Group Pump Arrangements

Referring now to FIGS. 28 to 34 along with FIGS. 35 to 41, another schematic example of a portable extended length frame vacuum grip device 1000 is generally shown according to the presently disclosed subject matter, which generally includes the aspects and features of vacuum grip devices described above, and more particularly the aspects and features of vacuum grip devices 700 to 1000 discussed above except as noted hereafter. As such, like numbers refer to like features.

Figure 28:
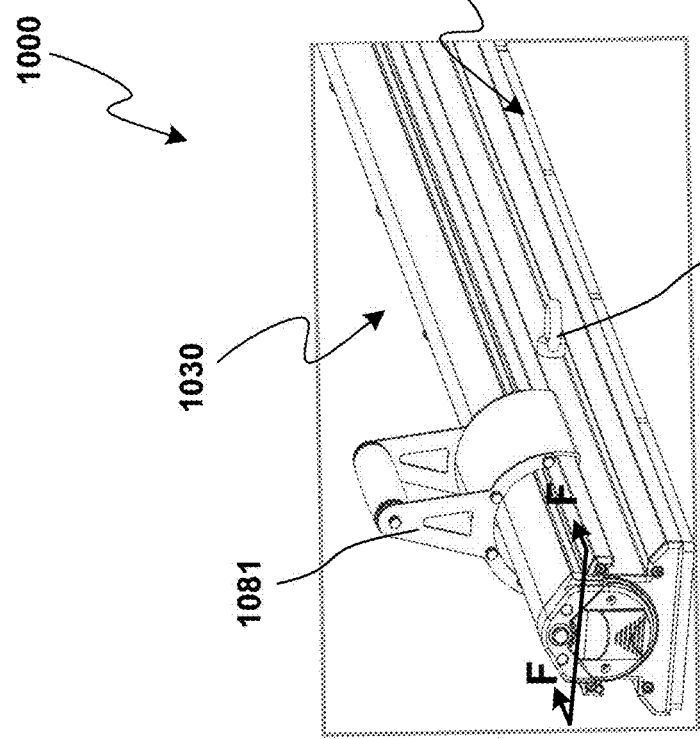
FIG. 28 shows a perspective top view of an end portion of an additional example extended length portable grip device in accordance with the presently disclosed subject matter.
Figure 31:
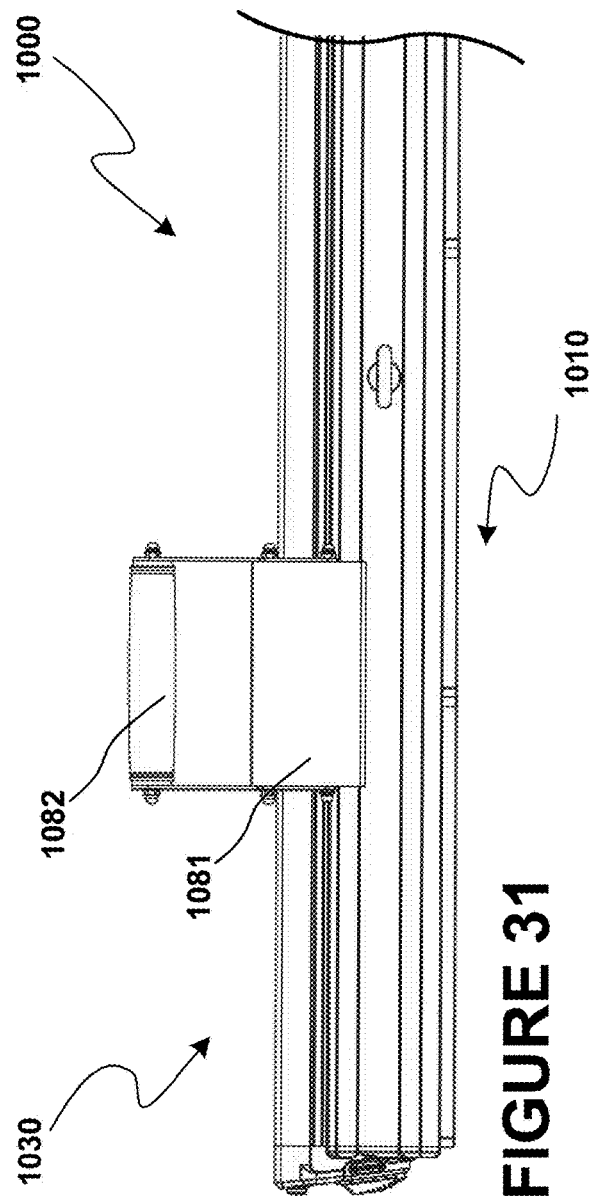
FIG. 31 is a side view of the grip device of FIG. 28.
Figure 32:
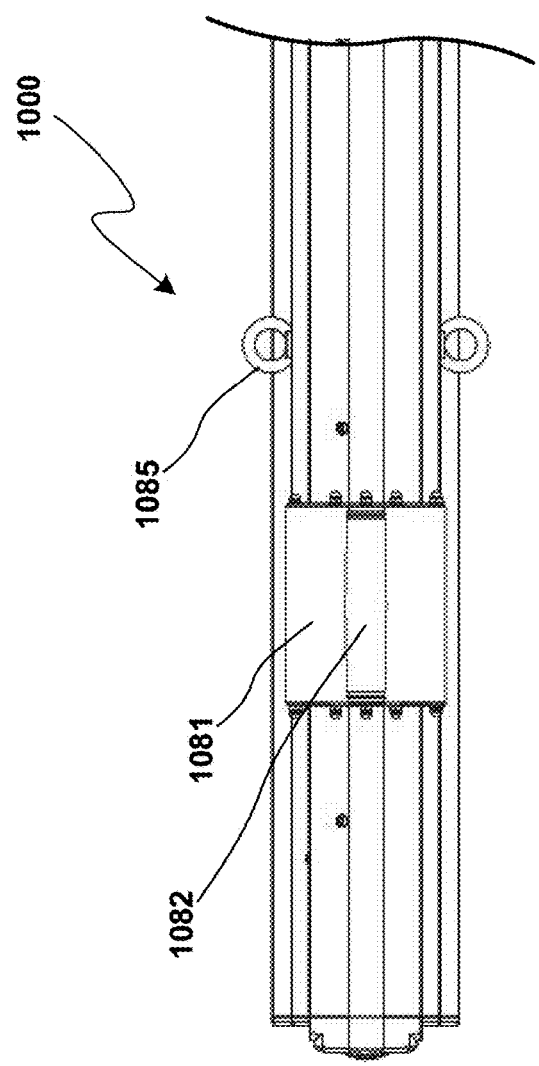
FIG. 32 is a top view of the same.

Vacuum grip device 1000 primarily differs from previous grip devices described above with respect to aspects and features described herein for the lift interfaces including a pair of handles 1081, 1083, each of which is attached at opposite longitudinal end portions of device 1000, as well as two pairs or sets of eyebolt lift interfaces 1085, 1086, in which a first eyebolt set 1085 is attached at the first longitudinal end and the second set of eyebolts 1086 is attached at an opposite second end. As best seen in FIG. 28 and the corresponding cross-sectional view shown in FIG. 33, each of the handles 1081, 1083 and also each of the eyebolts in the first and second sets 1085, 1086 are attached to side portions of the housing 1030. Further, lift device includes example unitary aluminum extrusions to form the extended base 1010 and the housing 1030 as discussed above for lift device 1000, such that each of the handles and eyebolts are attached to side wall portions of the lower aluminum extrusion that forms the extended handle 1010 along with side wall portions of the housing 1030. As such, the handle and eyebolt lift interfaces are each attached directly to the integrated load-bearing aluminum extrusion.

Figure 33:
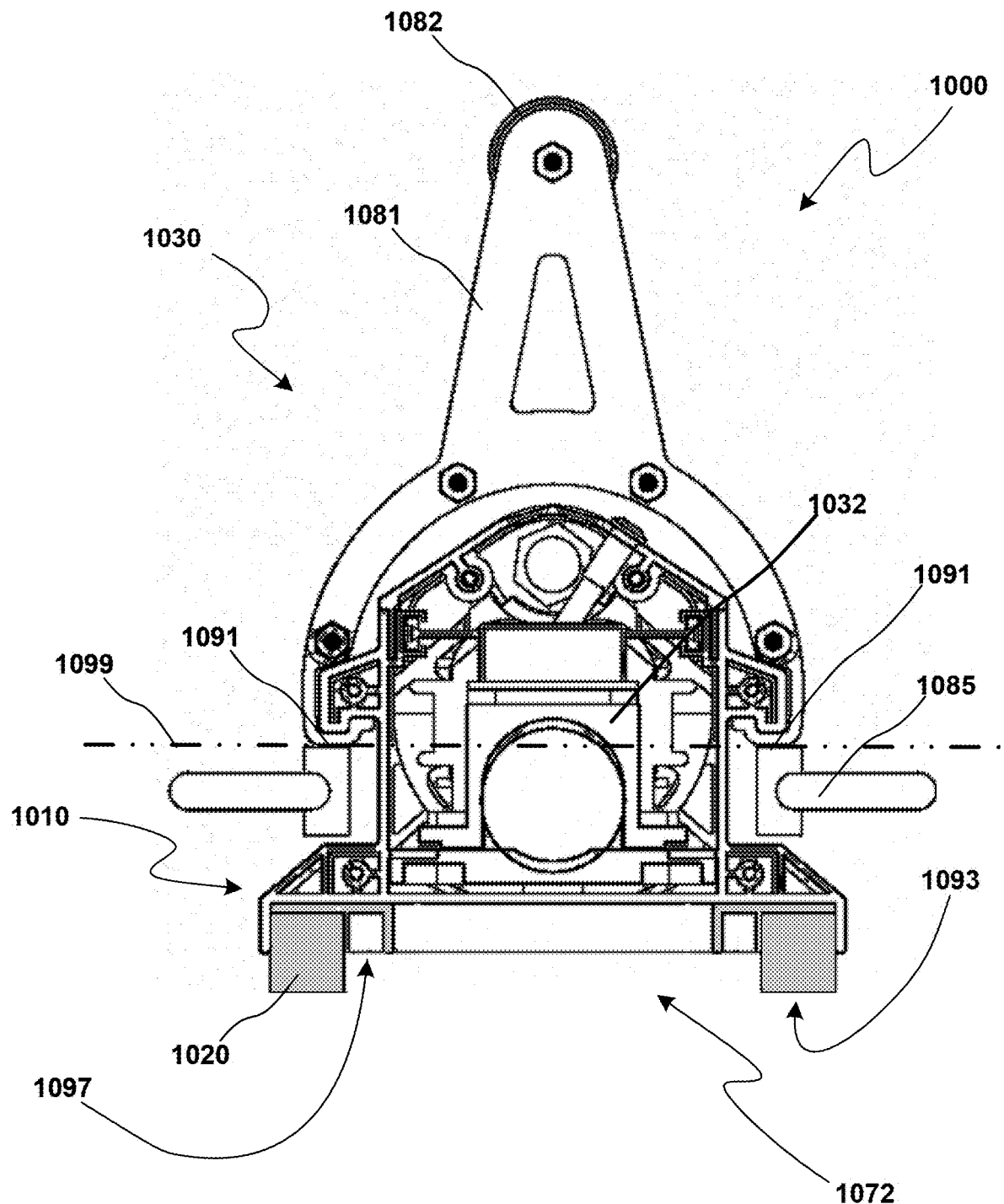
FIG. 33 is a cross-sectional view of the grip device of FIG. 28 taken through the adjustable handle of FIG. 29.

Further, as best seen in FIG. 33, each of the handles 1081, 1083 and each of the eyebolts are attached to each lateral side of the housing and side walls of the extrusion in a laterally centered arrangement. For instance, each of the handles 1081, 1083 include have a central grip 1082 centered above the housing 1030 and with respect to the lateral attachments of the handles. Similarly, each of the pairs of eyebolts 1085, 1086 include matching, opposing pairs of eyebolts, such that cable, chain, rope of other lift attachments to the opposing sets of eyebolts for applying lift forces thereto can apply balanced, centered lift forces via the eyebolts similar to the balanced lift arrangement of the centered grips 1082. Further, an upper engagement surface of each of the handle attachments and the each of the eyebolt interfaces directly engages one of the first lift interface 1084 disposed at the first end and the second lift interface 1091 disposed at the opposite second end for applying upward lift forces transmitted through the handles 1081, 1083 and/or through the eyebolts 1085, 1086, which is located along the neutral plane of the lift device 1000. Notably, as can be seen in FIG. 33, each of the lift interfaces 1084, 1091 are located at underside portions of a pair of reinforced side channels formed in the lower, load-bearing unitary aluminum extrusion that also forms the extended base 1010, each of which extends the length of the lift device and are formed on neutral plane 1099 at a distance H1 from the contact interface and corresponding distance H2 from strut 1080.

Thus, not only are upward lift forces transmitted from the handles and/or the eyebolts directly applied to lift interfaces 1084, 1091 along the neutral plane for taking advantage of integrated stress reducing features described above along with device 1000, but the lift forces applied to the handles 1081, 1083 and/or the eyebolts 1085, 1086 can generally be applied as balanced, centered upward forces. As such, grip device 1000 can further avoid having twist or torsional stresses being applied to objects being lifted at the attachment surface based on balanced arrangements of eyebolts and a centered grip 1082 for each of the handles disposed above the lift device, as well as reducing or mitigating applications of tension stresses at the surface of objects in the longitudinal direction of the extended lift device as discussed above. Accordingly, lift device 1000 can reinforce lift surfaces of lifted objects including stress-sensitive sheet materials directly against the rigid, high-strength rigid frame of the extended base 1010 along with reducing and mitigating applied tension stresses on the same during lift operations and avoiding induced twist or torsional stresses occurring from lift forces. In other words, lift device 1000 provides a robust, high structural strength lift interface that can firmly retain extended materials being lifted and do so in a balanced, stress-neutral manner.

Figure 34:
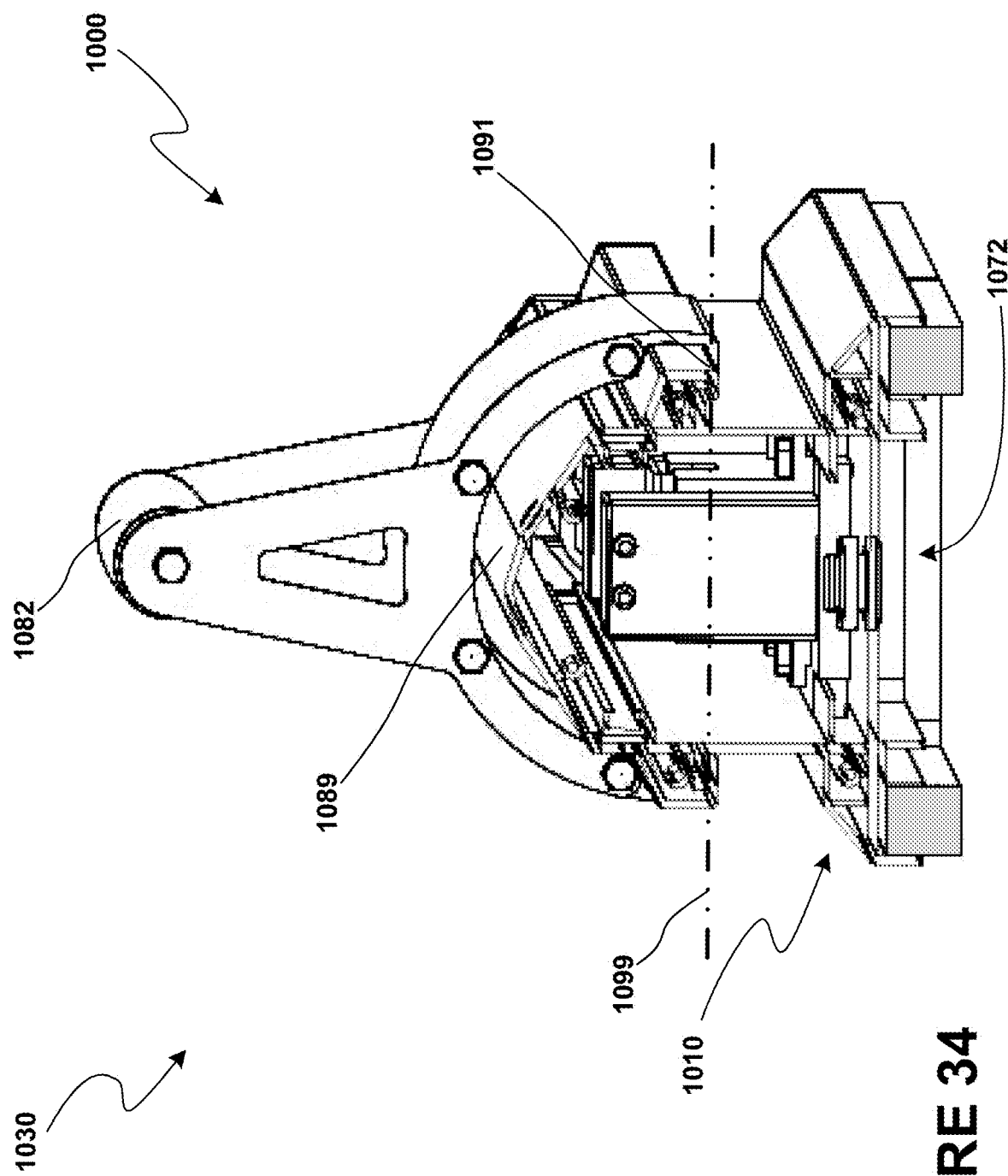
FIG. 34 is a perspective view of the same.
Figure 35:
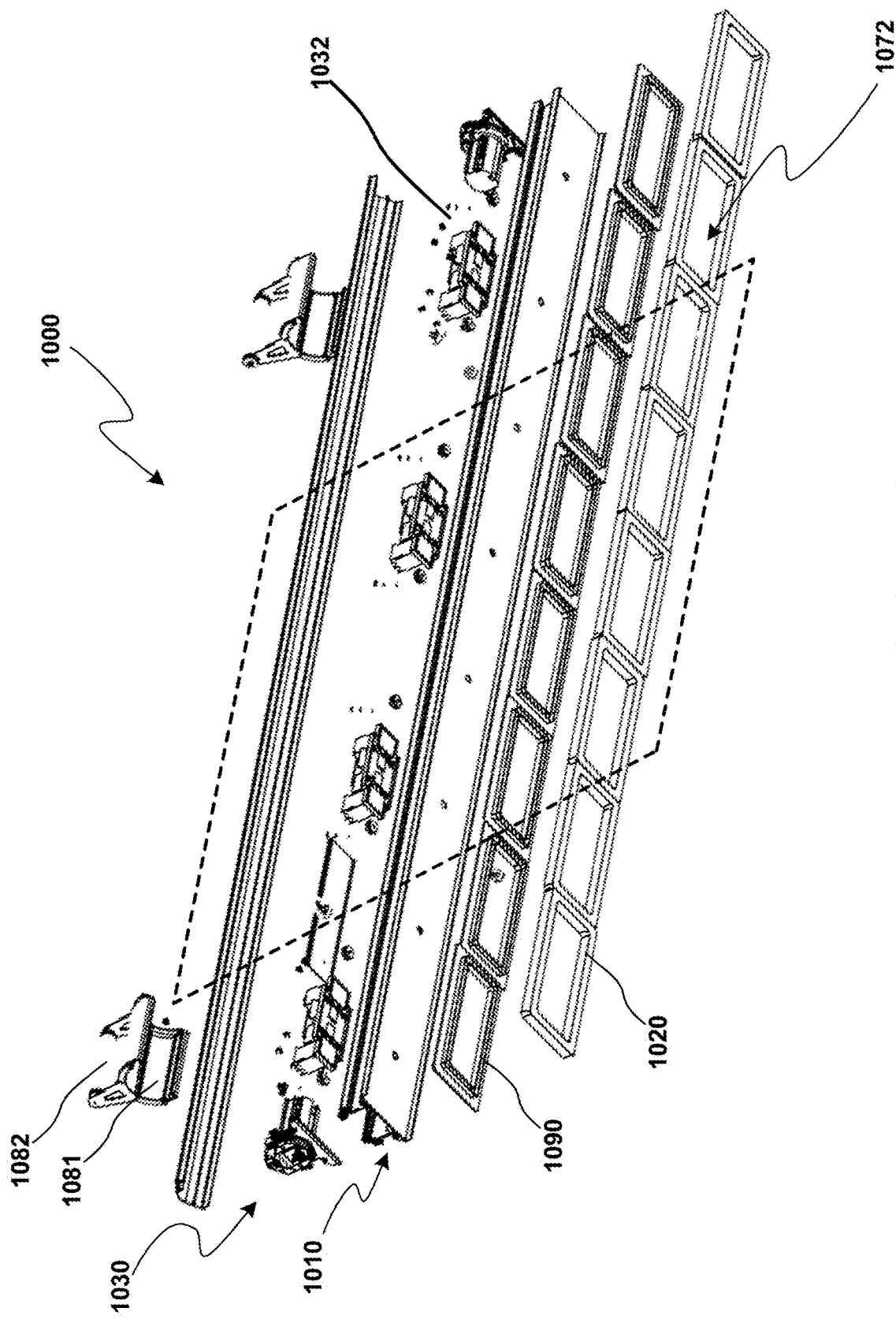
FIG. 35 shows a perspective partial exploded view of a further example extended length portable vacuum grip device in the presently disclosed subject matter.
Figure 36:
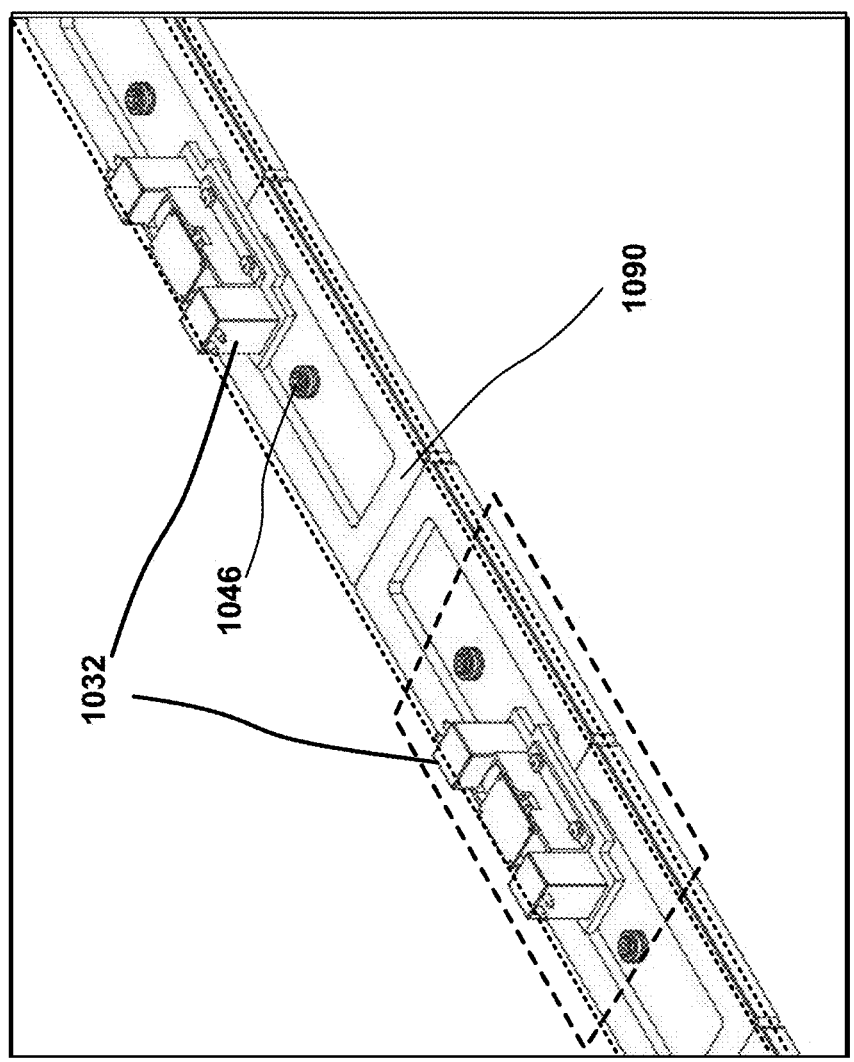
FIG. 36 is a top perspective view of a region of the grip device of FIG. 35 generally indicated by the dashed rectangle shown in FIG. 35, which is depicted without structural frame components other than including small, dashed lines that generally outline an extended length open channel defined by a portion of the extended frame and shows example arrangements for sets of pump pairs corresponding with adjacent grip regions.
Figure 37:
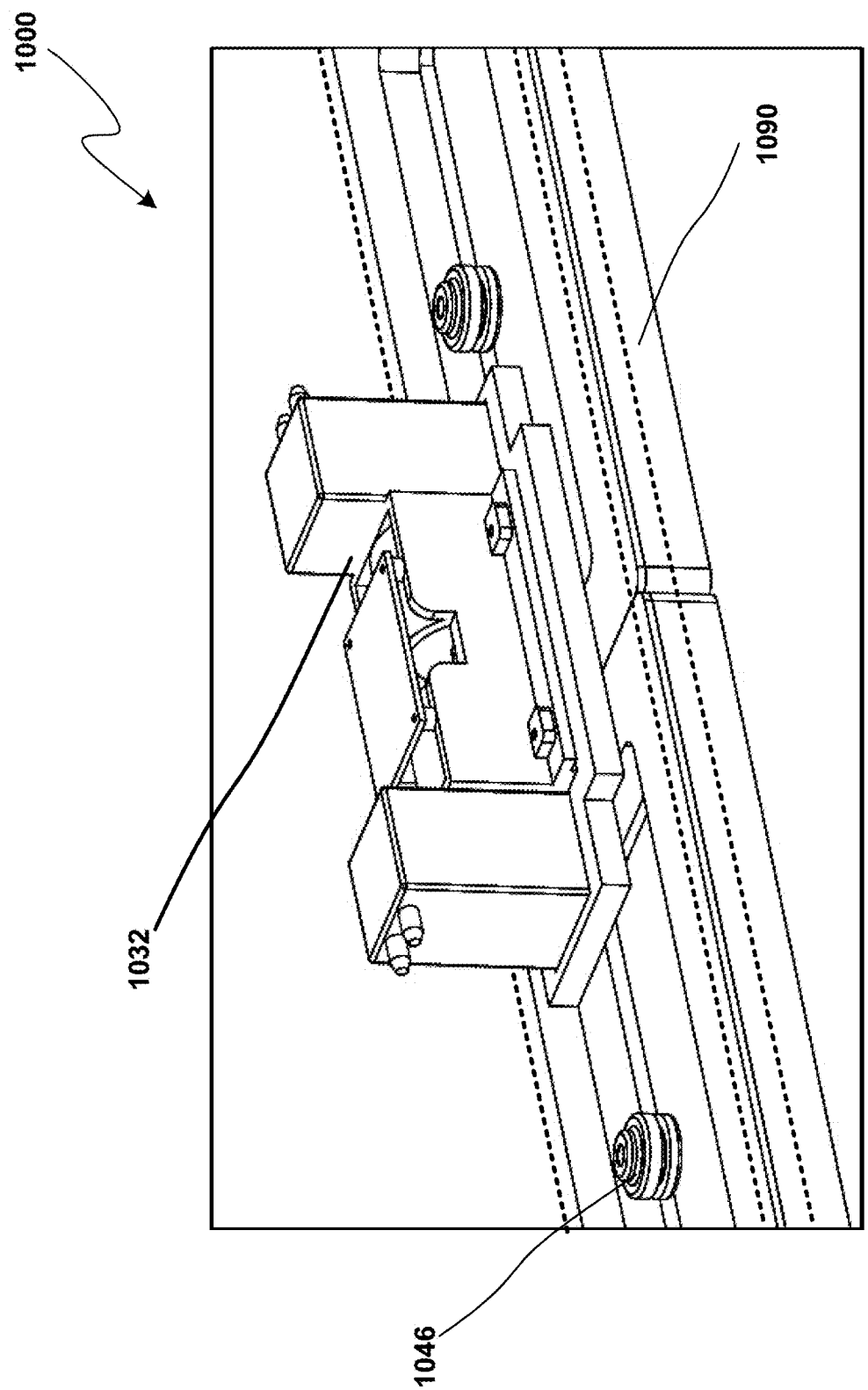
FIG. 37 shows a close perspective view of the portion of FIG. 36 including a set of the pump pairs located within the dashed line rectangle of FIG. 36.
Figure 38:
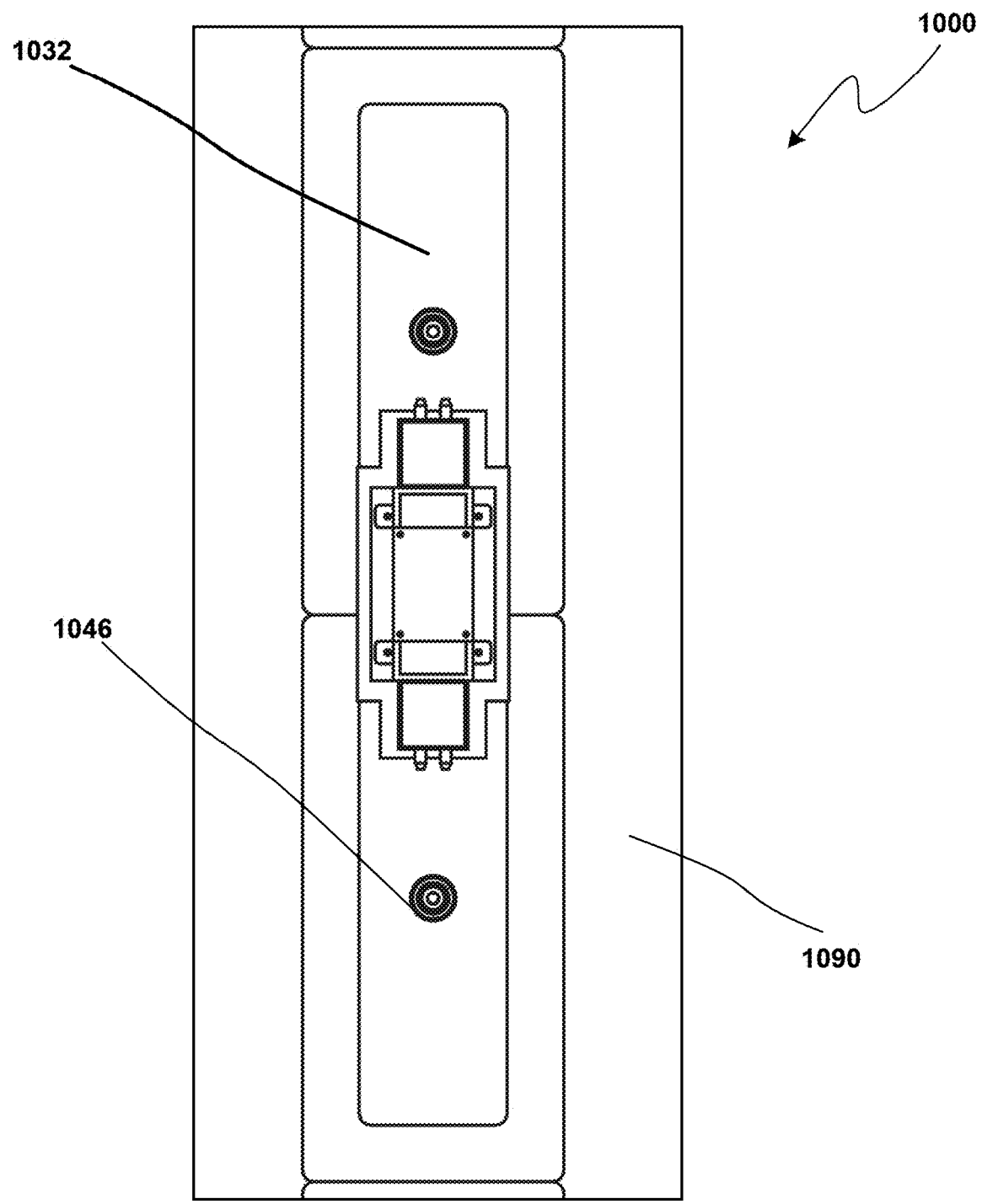
FIG. 38 is a top view depiction of the adjacent grip regions corresponding with the set of pump pairs of FIG. 37.
Figure 41:
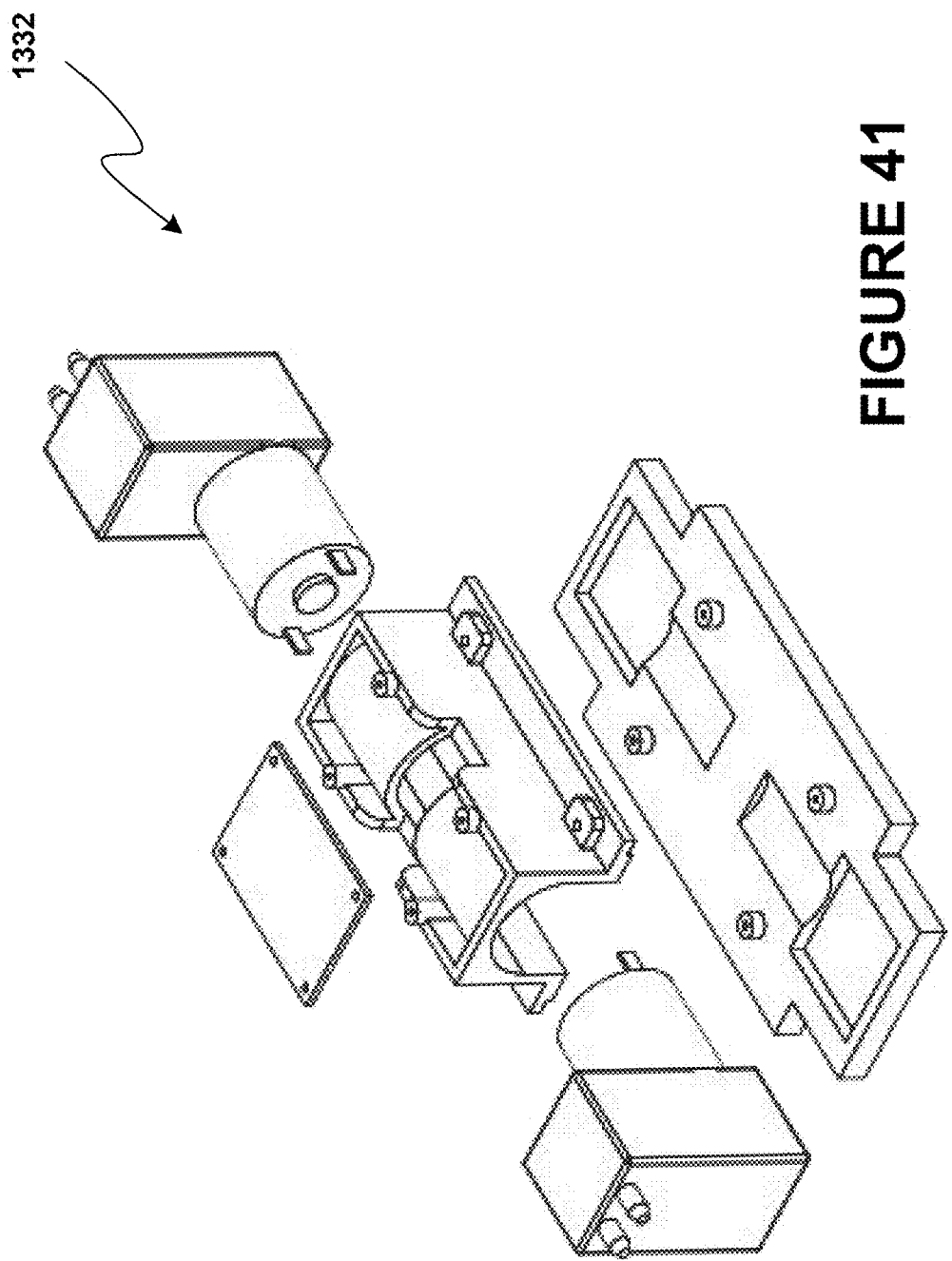
FIG. 41 shows an exploded view of the example set of pump pairs of FIG. 37.

In addition, as best seen in FIGS. 35-41, lift device 1000 can be formed as a high-strength, flexible application, portable lift device having a balanced arrangement along its length and also a surprising compact, efficient arrangement and profile. As shown in FIGS. 34 and 35, the open chamber 1070 of lift device 1000 can be subdivided into an even number of vacuum grip regions (e.g., eight (8) regions) evenly spaced along the length of the extended base 1010. Similarly, individual pumps 1032 can be evenly spaced along the length the housing 1030 and disposed within the hollow structure provided by the extrusion construction, for example. In the example shown in FIGS. 34 and 35, the pumps 1032 can further be efficiently grouped as corresponding pairs or sets of pumps 1032 evenly spaced within the housing and placed a central location between corresponding vacuum grip regions 1072 in a compact, opposed-pump set arrangement, which can reduce the amount of support brackets and other components for the pumps for providing the vacuum grip device 1010 as an extremely lightweight, yet high-strength lift device.

Further, as best seen in FIG. 34, the lift device 1000 can be arranged as a longitudinally symmetrical extended length device as noted above for the arrangements of vacuum grip regions, arrangements of pumps, and handles as opposing longitudinal end portions. Additionally, opposite end portions of the lift device 1010 can include balanced sets of batteries and control components for powering the pumps and operating the lift device. The arrangement of ports can further have a balanced, symmetrical arrangement along the length of the control device including at least one port 1046a-to-h being formed at a middle portion of each vacuum grip region 1072, such that grip forces are equally applied along the length and width of the extended base 1010. Thus, almost every aspect and feature of vacuum grip device 1010 can be arranged and provided in symmetrical and highly balanced arrangement, which can further minimize potential stresses being applied to the surface of objects being lifted along with providing high structural reinforcement and support for the same during lift operations.

Flexible Port Arrangements (ILP)

Figure 42:
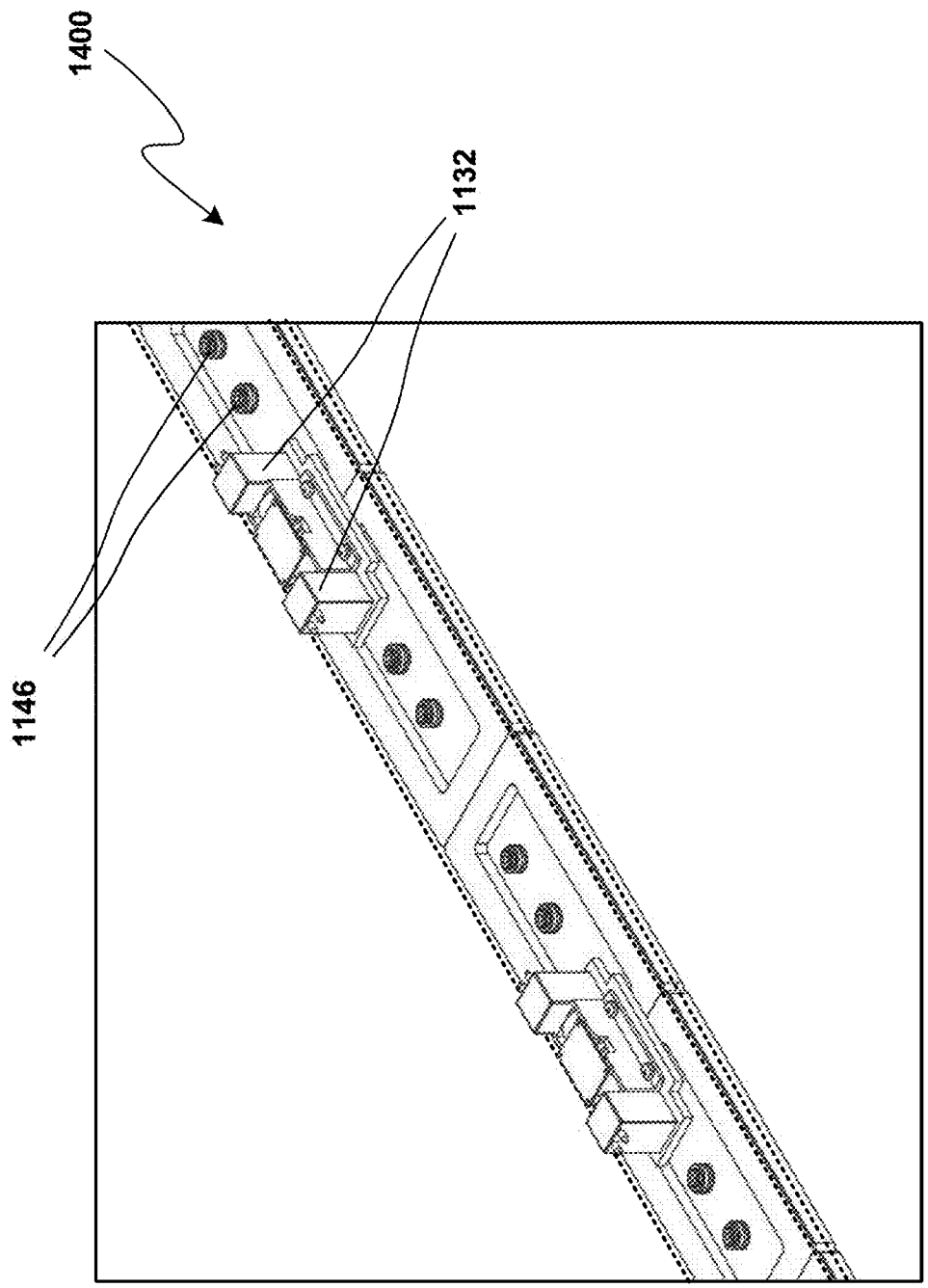
FIG. 42 is a top perspective view depiction of an alternative arrangement of the grip device of FIG. 35 having more than one port corresponding with each grip region.

Referring now to FIG. 42, yet another example vacuum grip device 1100 is shown, which includes the aspects and features of vacuum grip devices described above, and in particular, includes the aspects and features of vacuum grip devices 700, 800, 900 and 1000 except as described hereafter. As such, like numbers refer to like features.

As depicted in FIG. 42, vacuum grip device 1100 includes a plurality of ports 1146 defined through the extended base 1110 and particularly through the frame base 1115, which further demonstrates the significant flexibility and range of customization options that can be provided via vacuum lift device 1100. As such, vacuum grip device 1100 and related example arrangements described herein provide portable high-strength, adaptable extended lift functions for sheet materials; do so in structurally reinforced low stress manner for an extended length arrangement: impart minimal stresses along the surface of sheet materials during lift operations; and permit modifiable and customizable lift characteristics for the vacuum grip regions and characteristics of materials being lifted along with corresponding surface features. Further, as depicted in FIG. 42, characteristics of vacuum flow levels and arrangements can also be customized as appropriate according to lifting needs, materials and desired features and operations.

The subject matter described above is provided by way of illustration only and should not be construed as limiting. Various modifications and changes can be made to the subject matter described herein without following the example embodiments and applications illustrated and described, and without departing from the true spirit and scope of the embodiments of the concepts and technologies disclosed herein. Although various embodiments have been described as having particular features and/or combinations of components, other embodiments are possible having a combination of any features and/or components from any of embodiments as discussed above.

We claim:

1. An extended frame portable vacuum grip device comprising:
    a rigid support frame defining an open chamber, the support frame comprising:
        an impermeable elongate base having a vacuum grip side, an opposite support side, a width, and an extended length that is larger than the width, the impermeable elongate base defining at least one port therethrough; and
        an impermeable support wall connected to a perimeter of the impermeable elongate base and extending around the impermeable elongate base, the support wall protruding a first distance from the impermeable elongate base in a vacuum grip direction away from the opposite support side, the support wall having an inner side and an opposite outer side, the inner side and the vacuum grip side of the impermeable elongate base defining the open chamber of the support frame;
    at least one closed-loop gasket coupled with the elongate base, the at least one port, and the support wall for defining a vacuum grip region configured to form a seal with a surface of a lift object, the at least one closed-loop gasket comprising:
        a base surface connected to the impermeable elongate base at the vacuum grip side, the gasket protruding from the impermeable elongate base in the vacuum grip direction a second distance greater than the support wall first distance;
        a contact surface at an opposite end from the base surface;
        an inner wall between the base surface and the contact surface forming a closed-loop and defining a hollow space therein; and
        an outer wall between the base surface and the contact surface, the outer wall adjacent to the support wall and engaging the inner side thereof for the first distance;
    at least one brace connected to the base portion at the vacuum grip side, the at least one brace comprising:
        a brace base connected to the vacuum grip side of the impermeable elongate base; and
        a brace wall protruding a third distance from the brace base, the third distance less than the second distance of the corresponding closed-loop gasket; and
    at least one air extraction pump operatively connected with the at least one closed-loop gasket, the hollow space therein, and the at least one port;
    wherein the at least one closed-loop gasket, the hollow space therein, the inner side of the support wall, the at least one brace, the at least one port, and the at least one air extraction pump form at least one independently operable vacuum grip region integrated within the open chamber of the extended support frame; and the brace wall is made of a material that is less rigid than the support frame and the brace wall is more rigid than the at least one gasket.

2. The extended frame portable grip vacuum device of claim 1, wherein the brace wall is positioned with respect to the gasket inner wall at one of:
    an adjacent position adjacent to the gasket inner wall for firmly supporting the gasket between the brace wall on an inboard side of the gasket and the inner side of the support wall portion on an outboard side of the gasket; and
    a spaced-apart position spaced apart from the gasket inner wall in an inboard direction.

3. The extended frame portable grip vacuum device of claim 2, wherein the brace wall is a first brace wall disposed at the adjacent position and the brace wall is made of a material that is less rigid than the support frame.

4. The extended frame portable grip vacuum device of claim 2, wherein the brace wall is a first brace wall disposed at the adjacent position, the at least one brace further comprising:
    a second brace wall disposed at the spaced-apart position.

5. The extended frame portable grip vacuum device of claim 4, wherein the second brace wall is free of contact with the at least one gasket.

6. The extended frame portable grip vacuum device of claim 4, wherein the second brace wall is made of a material that is less rigid than the support frame.

7. The extended frame portable vacuum grip device of claim 1, wherein the at least one brace is removable for optional use at the vacuum grip region.

8. The extended frame portable grip vacuum device of claim 1, wherein one of the at least one closed-loop gasket or the at least one brace is replaceable with an alternative closed-loop gasket or an alternative brace.

9. The extended frame portable vacuum grip device of claim 1 further comprising:
    an integrated force balancing structure for reducing stresses at the impermeable elongate base when lifting an attached object, the force balancing structure comprising:
        a first lift offset at a first lengthwise end of the vacuum grip device formed in at least the impermeable elongate base and projecting from a distal end of the support wall toward the opposite support side for a lift interface distance, H1, to a first lift interface, the first lift interface attached to one of a first handle and a first lift connector;

a second lift offset at a second lengthwise end of the vacuum grip device opposite the first lengthwise end formed in at least the impermeable elongate base and projecting from a distal end of the support wall toward the opposite support side for the lift interface distance, H1, to a second lift interface, the second lift interface attached to one of a second handle and a second lift connector; and a stress reduction frame projecting from each of the first and the second lift interfaces for a countercompression distance, H2, offset from the distal end of the support wall a distance H1 plus H2 including a strut extending in a lengthwise direction of the impermeable elongate base between the first and second lift interfaces;

wherein:

the first and the second lift offsets and the stress reduction frame define a neutral plane therebetween for receiving lift forces through the first and the second lift interfaces; and the stress reduction frame and strut resist compressive forces for counteracting tensile forces at the impermeable elongate base.

10. An extended frame portable vacuum grip device comprising:

a rigid support frame defining an open chamber, the support frame comprising:

an impermeable elongate base having a vacuum grip side, an opposite support side, a width, and an extended length that is larger than the width, the impermeable elongate base defining a plurality of ports therethrough spaced apart along the length of the impermeable elongate base; and an impermeable support wall connected to a perimeter of the impermeable elongate base and extending around the impermeable elongate base, the support wall protruding a first distance toward the vacuum grip side away from the opposite support side, the support wall having an inner side and an opposite outer side, the inner side and the vacuum grip side of the impermeable elongate base defining the open chamber;

a plurality of closed-loop gaskets each coupled with a corresponding portion of the impermeable elongate base, a corresponding port of the plurality of ports, and a corresponding portion of the support wall for defining a vacuum grip region each configured to form an independent seal with a surface of a lift object, each closed-loop gasket comprising:

a base surface connected to the base portion at the vacuum grip side, each gasket protruding from the impermeable elongate base in the vacuum grip direction a second distance greater than the support wall first distance;

a contact surface at an opposite end from the base surface;

an inner wall between the base surface and the contact surface forming a closed-loop and defining a hollow space therein; and an outer wall between the base surface and the contact surface, the outer wall adjacent to the corresponding support wall portion and engaging the inner side thereof for the first distance; and a plurality of air extraction pumps each operatively connected with a corresponding one of the closed-loop gaskets, the hollow space therein, and the corresponding port for independent operation of each vacuum grip region;

wherein a plurality of independently operable vacuum grip regions are integrated within the open chamber along a length of the extended support frame.

11. The extended frame portable vacuum grip device of claim 10, wherein the rigid support frame is formed as a unitary frame.

12. The extended frame portable vacuum grip device of claim 10, further comprising:

a plurality of braces each corresponding with one of the plurality of closed-loop gaskets, each brace connected to the base portion at the vacuum grip side, each brace comprising:

a brace base connected to the vacuum grip side of the base portion; and a brace wall protruding a third distance from the brace base, the third distance less than the second distance of the corresponding closed-loop gasket.

13. The extended frame portable vacuum grip device of claim 12, wherein for each brace of the plurality of braces:

the brace wall is positioned with respect to the corresponding gasket inner wall at one of:

an adjacent position adjacent to the corresponding gasket inner wall for firmly supporting the gasket between the brace wall on an inboard side of the gasket and the inner side of the corresponding support wall portion on an outboard side of the gasket; and a spaced-apart position spaced apart from the gasket inner wall in an inboard direction.

14. The extended frame portable vacuum grip device of claim 13, wherein each of the plurality of braces is made from a material which is more rigid than that of the corresponding closed-loop gasket and less rigid than that of the support wall.

15. The extended frame portable vacuum grip device of claim 13, wherein each of the plurality of braces are removable for optional use for the corresponding vacuum grip region, and are replaceable with an alternative brace arrangement for customizing performance of the corresponding vacuum grip region.

16. The extended frame portable vacuum grip device of claim 10, wherein each of the plurality of closed-loop gaskets are replaceable with an alternative closed-loop gasket arrangement for customizing performance of the vacuum grip region.

17. The extended frame portable vacuum grip device of claim 10, the rigid support frame further comprising an integrated force balancing structure for reducing stresses at the impermeable elongate base when lifting an object, the force balancing structure comprising:

a first lift offset at a first lengthwise end of the vacuum grip device formed in at least the impermeable elongate base and projecting from a distal end of the support wall toward the opposite support side for a lift interface distance, H1, to a first lift interface, the first lift interface attached to one of a first handle and a first lift connector;

a second lift offset at a second lengthwise end of the vacuum grip device opposite the first lengthwise end formed in at least the impermeable elongate base and projecting from a distal end of the support wall toward the opposite support side for the lift interface distance, H1, to a second lift interface, the second lift interface attached to one of a second handle and a second lift connector; and a stress reduction frame projecting from each of the first and the second lift interfaces for a counter-compression distance, H2, offset from the distal end of the support wall a distance H1 plus H2 including a strut extending in a lengthwise direction of the impermeable elongate base between the first and second lift interfaces;

wherein:

the first and the second lift offsets and the stress reduction frame define a neutral plane therebetween for receiving lift forces through the first and the second lift interfaces; and the stress reduction frame and strut resist compressive forces for counteracting tensile forces at the impermeable elongate base.

18. The extended frame portable vacuum grip device of claim 17, wherein:

the rigid support frame is formed as a unitary frame;

the first and the second lift offsets and the first and the second lift interfaces are integrally formed with the unitary support frame;

the stress reduction frame is formed as a unitary frame separate from the rigid support frame; and the stress reduction frame is attached to the rigid support frame proximate the neutral plane; and.

19. The extended frame portable vacuum grip device of claim 18, wherein:

the rigid support frame is formed as an aluminum extrusion defining the impermeable open chamber; and the stress reduction frame is formed as an aluminum extrusion, the strut is formed as a peaked cover of the extrusion, and the extrusion defines a hollow enclosure with the rigid support frame for retaining the plurality of air extraction pumps therein along the length of the impermeable elongate base.

20. The extended frame portable vacuum grip device of claim 17, wherein:

the first lift interface and the second lift interface include a pair of handles located at an opposite side of the grip device from the impermeable elongate base, each of the pair of handles centered across a width of the rigid support frame and attached to the rigid support frame at opposite sides of the frame and proximate the neutral plane for preventing inducement of torsional stresses when lifting an object.

* * * * *